US011131331B2

(12) United States Patent
Stanley et al.

(10) Patent No.: US 11,131,331 B2
(45) Date of Patent: Sep. 28, 2021

(54) COMPLEMENTARY FLUIDIC LOGIC AND MEMORY DEVICES

(71) Applicant: Facebook Technologies, LLC, Menlo Park, CA (US)

(72) Inventors: Andrew Arthur Stanley, Seattle, WA (US); Erik Roby, Redmond, WA (US); Casey Glick, Redmond, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 127 days.

(21) Appl. No.: 16/507,788

(22) Filed: Jul. 10, 2019

(65) Prior Publication Data

US 2021/0010495 A1   Jan. 14, 2021

(51) Int. Cl.
*F15C 1/10* (2006.01)
*B06B 1/18* (2006.01)
(Continued)

(52) U.S. Cl.
CPC .................. *F15C 1/10* (2013.01); *B06B 1/18* (2013.01); *G06F 3/016* (2013.01); *G06T 19/006* (2013.01);
(Continued)

(58) Field of Classification Search
CPC ..... F15C 1/10; F15C 3/00; B06B 1/18; G06F 3/016; G06T 19/006; F16K 31/1223;
(Continued)

(56) References Cited

U.S. PATENT DOCUMENTS 3,070,295 A    12/1962  Glättli
3,122,313 A    2/1964   Glättli
(Continued)

FOREIGN PATENT DOCUMENTS

CH          376688 A       4/1964
DE     102012013594 A1 *   1/2014    .............. F16K 11/07
(Continued)

OTHER PUBLICATIONS

Non-Final Office Action received for U.S. Appl. No. 16/451,964 dated Nov. 16, 2020, 17 pages.
(Continued)

*Primary Examiner* — Minh Q Le
(74) *Attorney, Agent, or Firm* — FisherBroyles, LLP

(57) ABSTRACT

A fluidic device may include inlet ports, control input ports, one or more output channels, inlet channels that are each configured to convey fluid from one of the inlet ports to one of the one or more output channels, and pistons. In some examples, each piston may include (1) a restricting gate transmission element configured to inhibit, when the piston is in a first position, and uninhibit, when the piston is in a second position, one of the inlet channels, (2) a control gate configured to interface with a first control pressure that, when applied to the control gate, forces the piston towards the first position, and (3) an additional control gate configured to interface with a second control pressure that, when applied to the additional control gate, forces the piston towards the second position. Various other related devices, systems, and methods are also disclosed.

20 Claims, 51 Drawing Sheets

(51) Int. Cl.
*G06F 3/01* (2006.01)
*G06T 19/00* (2011.01)
*F15C 3/00* (2006.01)
*F16K 31/122* (2006.01)
*F16K 1/12* (2006.01)
*F16K 11/07* (2006.01)

(52) U.S. Cl.
CPC .............. *F15C 3/00* (2013.01); *F16K 1/126* (2013.01); *F16K 11/07* (2013.01); *F16K 31/1223* (2013.01)

(58) Field of Classification Search
CPC ...... F16K 31/363; F16K 31/383; F16K 11/07; F16K 99/0055; F16K 99/0059; F16K 2099/0069; F16K 2099/009; F16K 1/126; G05D 7/0193; G05D 7/00
USPC .... 137/837, 488, 538, 625.2, 625.6, 625.26, 137/625.49, 627.5, 596.14, 885, 489.5, 137/565.19, 596.18, 115.07, 802, 599.03
See application file for complete search history.

(56) References Cited

U.S. PATENT DOCUMENTS

| | | | | |
|---|---|---|---|---|
| 3,319,654 | A | * | 5/1967 | Faldi .................. F01B 25/02 137/624.13 |
| 3,402,737 | A | * | 9/1968 | Goldstein ................ F15B 9/16 137/596.14 |
| 3,447,566 | A | | 6/1969 | Hayner et al. |
| 3,596,560 | A | | 8/1971 | Butterworth |
| 3,605,811 | A | | 9/1971 | Lovell |
| 3,805,840 | A | * | 4/1974 | Byers, Jr. ................ F16K 11/14 137/627.5 |
| 4,026,193 | A | | 5/1977 | Olmsted |
| 4,204,458 | A | | 5/1980 | Kononov et al. |
| 4,226,543 | A | | 10/1980 | Schlüter |
| 4,630,645 | A | | 12/1986 | Spa |
| 5,492,149 | A | * | 2/1996 | Loschelder ......... F16K 11/0716 137/625.4 |
| 6,237,635 | B1 | | 5/2001 | Nambu |
| 9,611,943 | B2 | * | 4/2017 | Chen ...................... F16K 11/02 |
| 2005/0012058 | A1 | | 1/2005 | Medina |
| 2007/0075286 | A1 | | 4/2007 | Tanner |
| 2019/0145542 | A1 | | 5/2019 | Rehhoff et al. |
| 2019/0249789 | A1 | | 8/2019 | John et al. |

FOREIGN PATENT DOCUMENTS

| | | |
|---|---|---|
| GB | 878697 A | 10/1961 |
| GB | 1 217 496 A | 12/1970 |
| WO | 2021/007220 A1 | 1/2021 |

OTHER PUBLICATIONS

International Search Report and Written Opinion received for PCT Application Serial No. PCT/US2020/041027 dated Oct. 26, 2020, 12 pages.
Telepneumatic, "Pneumatic Logic & Controls", URL: https://www.parker.com/literature/Literature%20Files/pneumatic/Literature/Telepneumatic/PCC-4.pdf, Jun. 30, 2017, 104 pages.
Glick et al., "Complementary Fluidic Valves and Systems", U.S. Appl. No. 16/451,964, filed Jun. 25, 2019, 139 pages.
Stanley et al., "Complementary Fluidic Valves, Logic Gates, and Latches", U.S. Appl. No. 16/408,413, filed May 9, 2019, 146 pages.
Click et al., "Complementary Fluidic Valves and Logic Gates", U.S. Appl. No. 16/408,412, filed May 9, 2019, 118 pages.
Non-Final Office Action received for U.S. Appl. No. 16/408,413 dated Jan. 7, 2021, 40 pages.
Non-Final Office Action received for U.S. Appl. No. 16/408,412 dated Jan. 6, 2021, 42 pages.

* cited by examiner

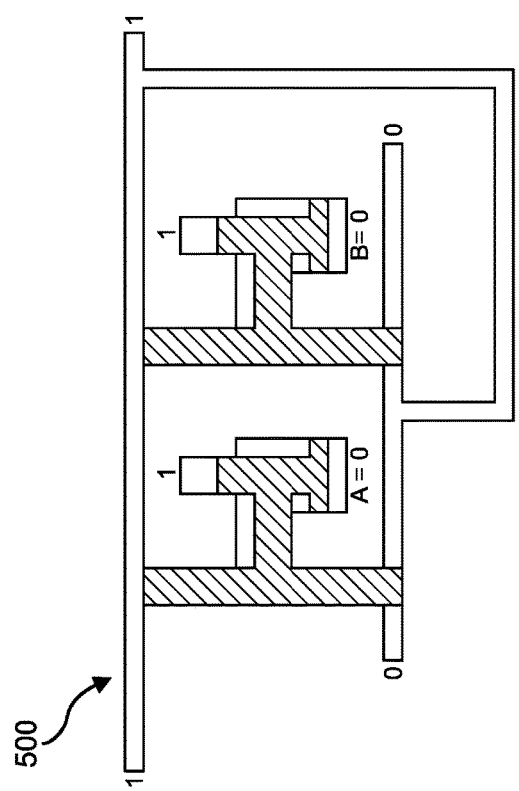
FIG. 7A
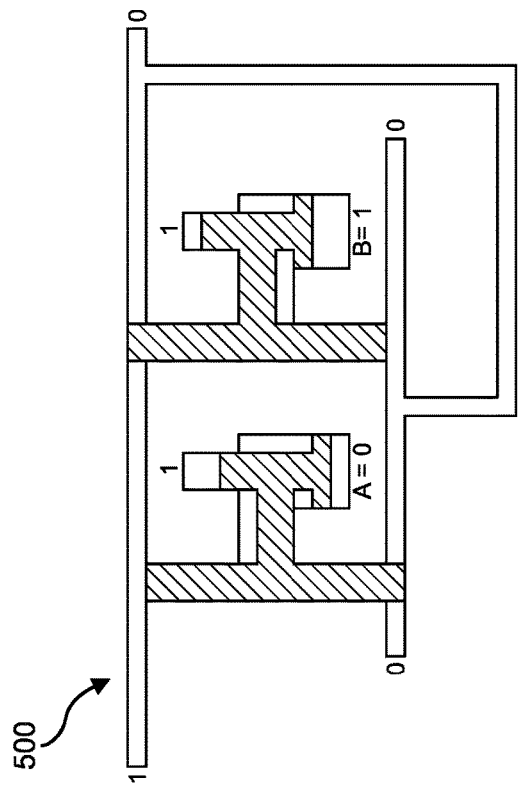
FIG. 7B
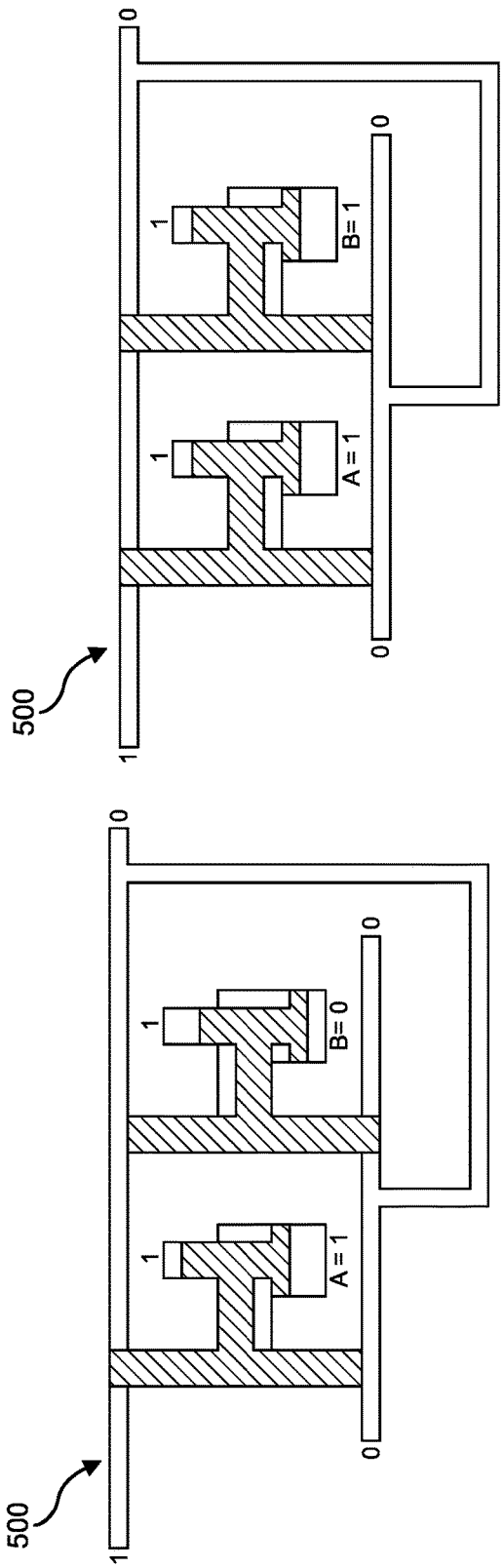
FIG. 7C
FIG. 7D

NOR Truth Table

| Inputs | | Output |
|---|---|---|
| A | B | |
| 0 | 0 | 1 |
| 0 | 1 | 0 |
| 1 | 0 | 0 |
| 1 | 1 | 0 |

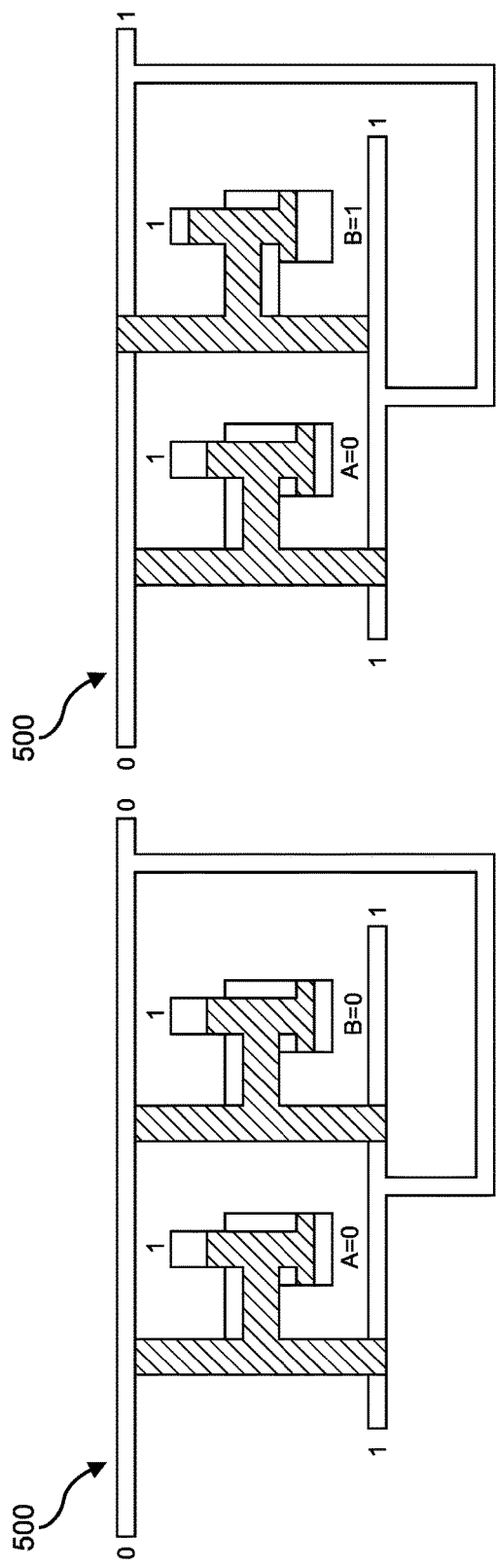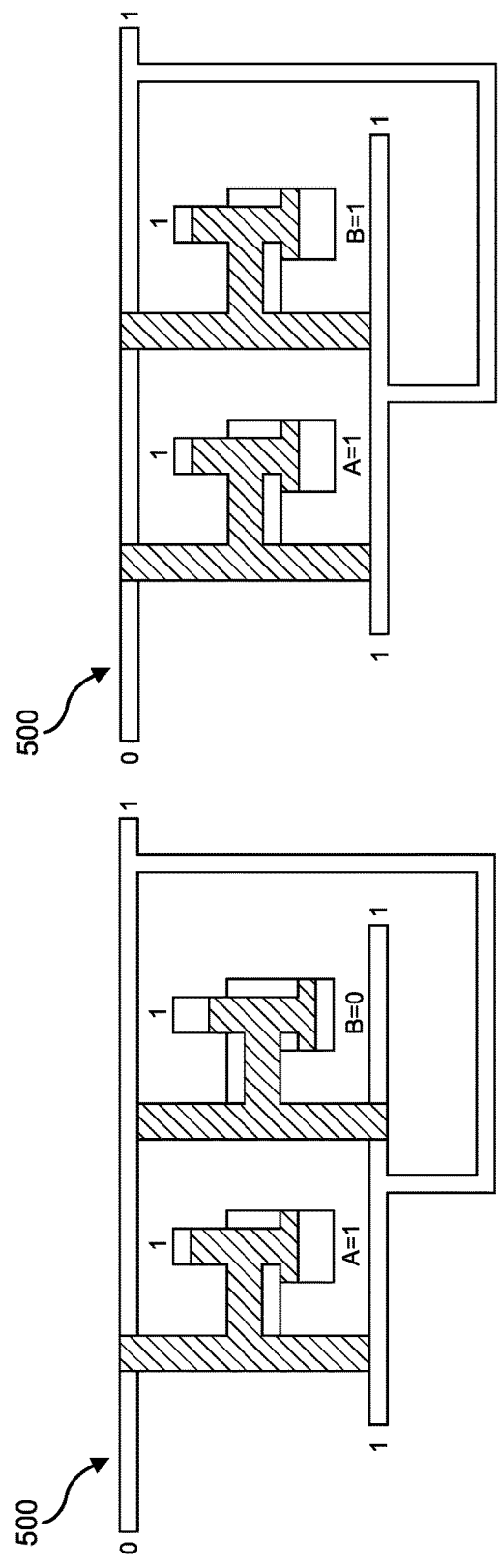

| OR Truth Table | | |
|---|---|---|
| Inputs | | Output |
| A | B | |
| 0 | 0 | 0 |
| 0 | 1 | 1 |
| 1 | 0 | 1 |
| 1 | 1 | 1 |

NAND Truth Table

| Inputs | | Output |
|---|---|---|
| A | B | |
| 0 | 0 | 1 |
| 0 | 1 | 1 |
| 1 | 0 | 1 |
| 1 | 1 | 0 |

| AND Truth Table | | |
|---|---|---|
| Inputs | | Output |
| A | B | |
| 0 | 0 | 0 |
| 0 | 1 | 0 |
| 1 | 0 | 0 |
| 1 | 1 | 1 |

LATCH Truth Table

| Inputs | | Output | |
|---|---|---|---|
| A | B | QA | QB |
| 0 | 0 | Hold | Hold |
| 0 | 1 | 1 | 0 |
| 1 | 0 | 0 | 1 |
| 1 | 1 | 0 | 0 |

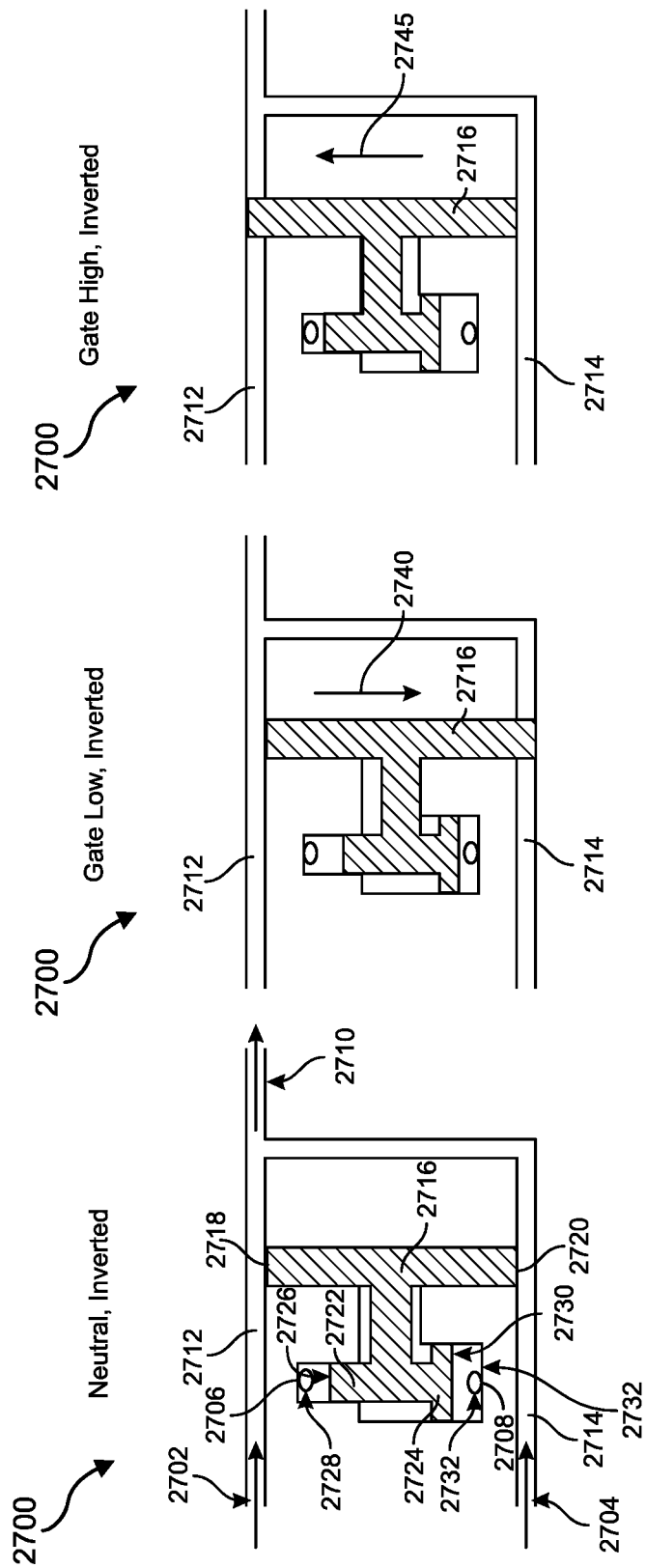

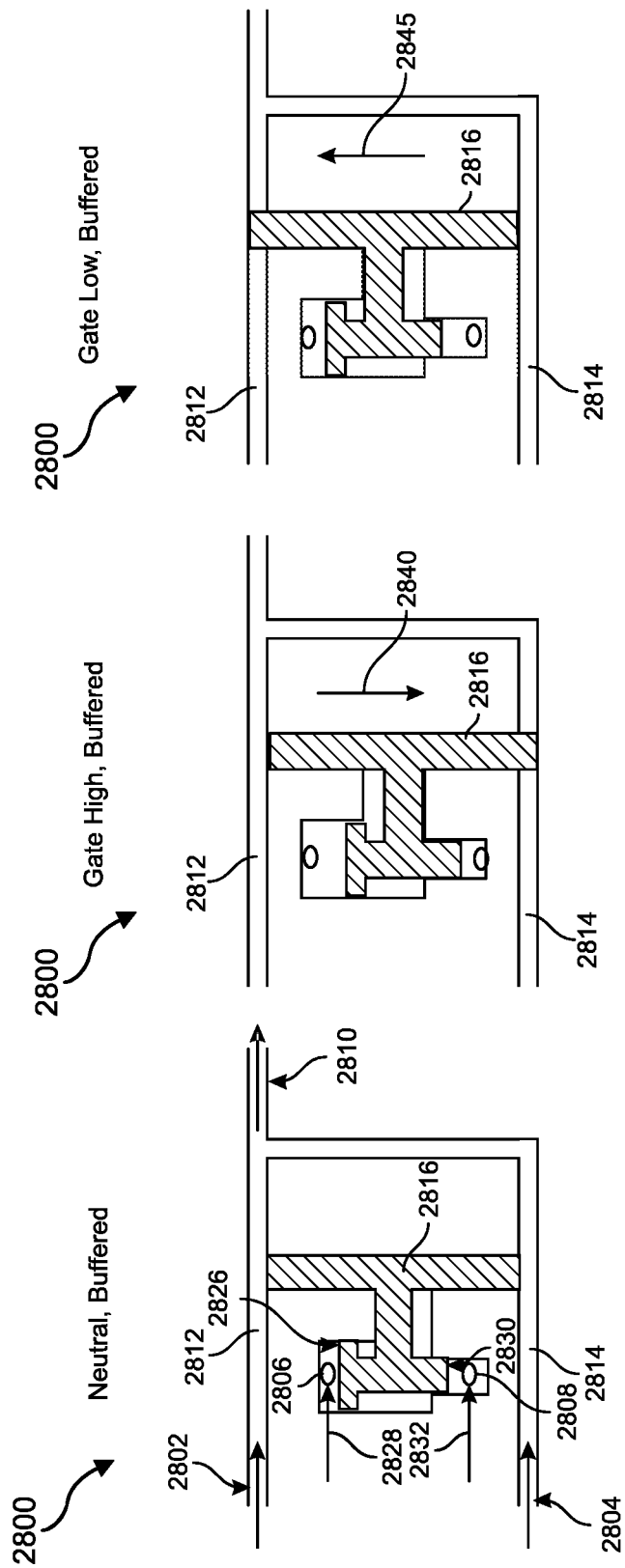

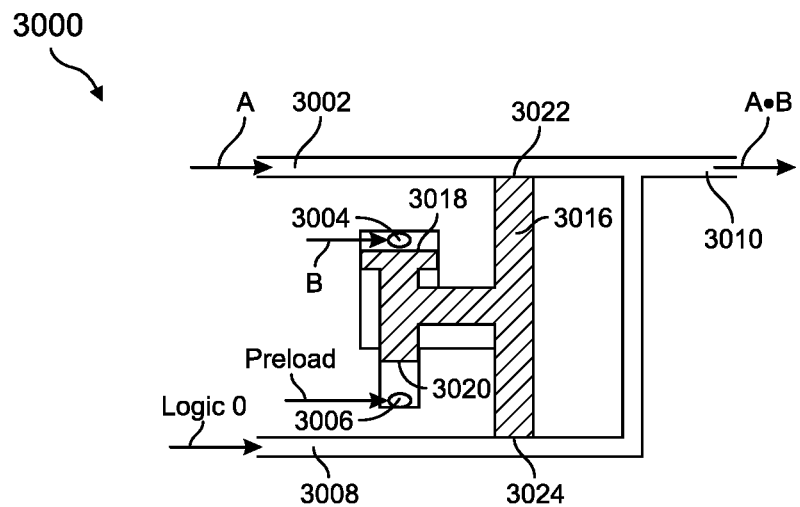
FIG. 30A
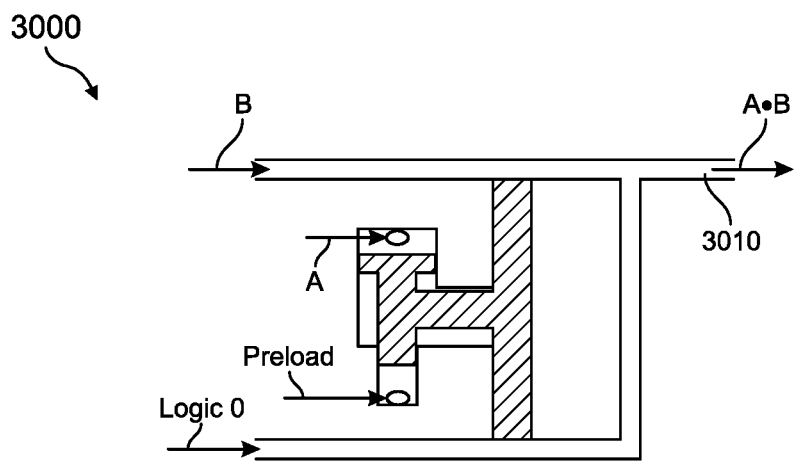
FIG. 30B
| AND Truth Table ||| 
| Inputs || Output |
| A | B | |
|---|---|---|
| 0 | 0 | 0 |
| 0 | 1 | 0 |
| 1 | 0 | 0 |
| 1 | 1 | 1 |
FIG. 30C

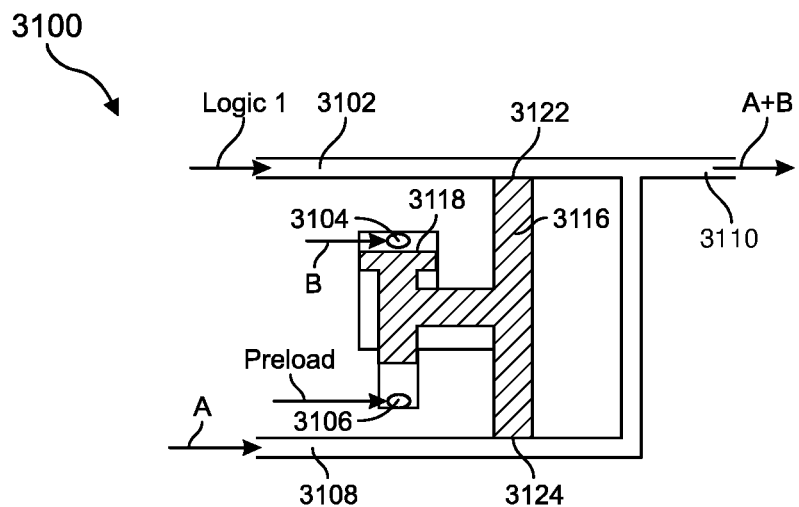
*FIG. 31A*
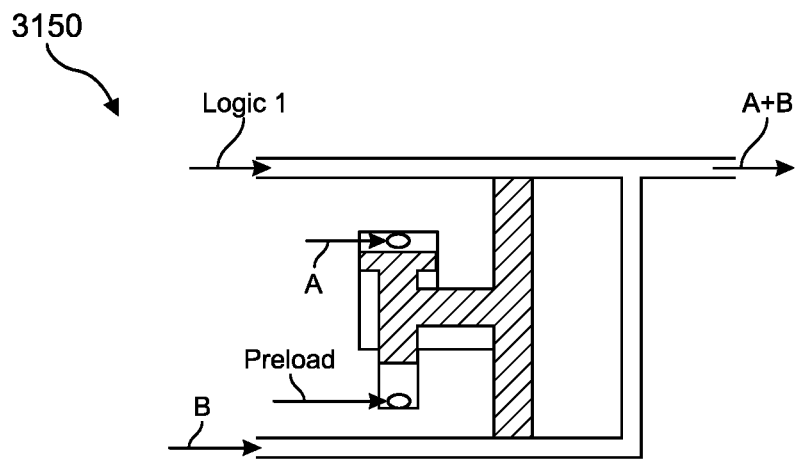
*FIG. 31B*
| OR Truth Table |||
| Inputs ||  Output |
| A | B | |
|---|---|---|
| 0 | 0 | 0 |
| 0 | 1 | 1 |
| 1 | 0 | 1 |
| 1 | 1 | 1 |
*FIG. 31C*

| XOR Truth Table ||| 
| Inputs || Output |
| A | B |  |
|---|---|---|
| 0 | 0 | 0 |
| 0 | 1 | 1 |
| 1 | 0 | 1 |
| 1 | 1 | 0 |

| XNOR Truth Table | | |
|---|---|---|
| Inputs | | Output |
| A | B | |
| 0 | 0 | 1 |
| 0 | 1 | 0 |
| 1 | 0 | 0 |
| 1 | 1 | 1 |

Fluidic Memory Device Truth Table

| Inputs | | Output |
|---|---|---|
| Data (1st Signal) | CLK (2nd Signal) | Q out |
| 0 | 0 to 1 | Hold |
| 1 | 0 to 1 | Hold |
| 0 | 1 to 0 | 0 |
| 1 | 1 to 0 | 1 |

FIG. 42

Truth Table

| Inputs | | | Outputs | |
|---|---|---|---|---|
| C-in | B | A | Sum | C-out |
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

COMPLEMENTARY FLUIDIC LOGIC AND MEMORY DEVICES

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIGS. 7A-7D are state diagrams of the example fluidic logic gate of FIG. 6, according to at least one embodiment of the present disclosure.

FIG. 8 is a diagram of a truth table corresponding to the example fluidic logic gate of FIG. 6, according to some embodiments.

FIGS. 10A-10D are state diagrams of the example fluidic logic gate of FIG. 9, according to at least one embodiment of the present disclosure.

FIG. 11 is a diagram of a truth table corresponding to the example fluidic logic gate of FIG. 9, according to some embodiments.

FIG. 15 is a diagram of a truth table corresponding to the example fluidic logic gate of FIG. 13, according to some embodiments.

FIG. 18 is a diagram of a truth table corresponding to the example fluidic logic gate of FIG. 16, according to some embodiments.

FIG. 26 is a diagram of a truth table corresponding to the example fluidic latch of FIG. 19, according to at least one embodiment of the present disclosure.

FIGS. 27A-27C are schematic diagrams of an example fluidic device in various respective states, according to at least one embodiment of the present disclosure.

FIGS. 28A-28C are schematic diagrams of an example fluidic device in various respective states, according to at least one embodiment of the present disclosure.

FIGS. 30A-30B are schematic diagrams of an example fluidic device, according to at least one embodiment of the present disclosure.

FIG. 30C is a diagram of a truth table corresponding to the example fluidic device of FIGS. 30A-30B, according to at least one embodiment of the present disclosure.

FIGS. 31A-31B are schematic diagrams of an example fluidic device, according to at least one embodiment of the present disclosure.

FIG. 31C is a diagram of a truth table corresponding to the example fluidic device of FIGS. 31A-31B, according to at least one embodiment of the present disclosure.

FIG. 42 is a truth table corresponding to the example fluidic device system of FIGS. 34-41, according to at least one embodiment of the present disclosure.

FIG. 44 is a truth table corresponding to the example fluidic device system of FIG. 43, according to at least one embodiment of the present disclosure.

DETAILED DESCRIPTION OF EXAMPLE EMBODIMENTS

Figure 1:
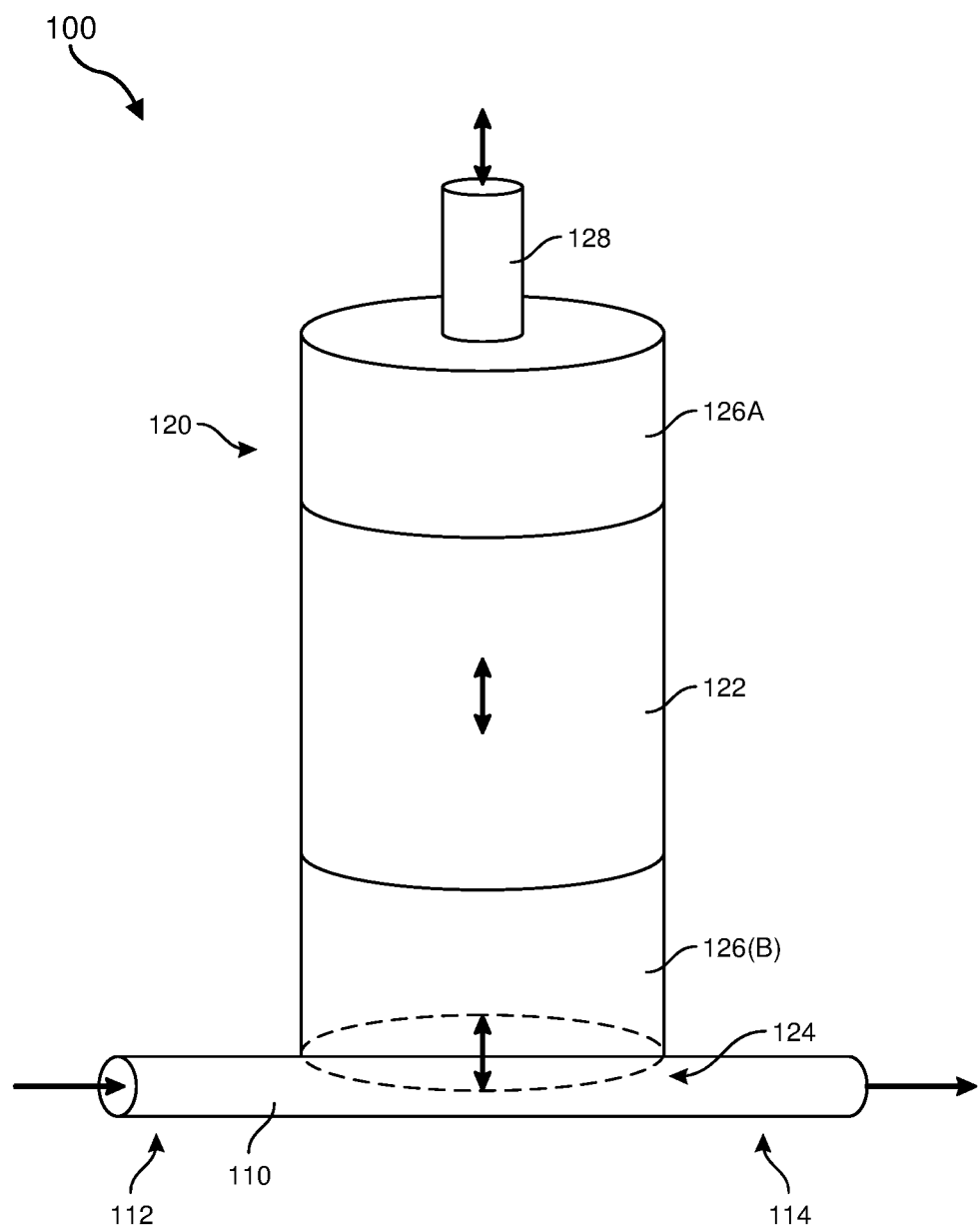
FIG. 1 is an illustration of an example fluidic control system that may be used in connection with embodiments of this disclosure.

Fluidic devices are fluid-manipulating devices, which may function in an analogous fashion to electronic devices. Fluidic devices, fluidic circuits, and fluidic systems may be used to perform tasks and operations that may be performed traditionally by conventional electronic circuits and systems. In some fields, fluidic systems may replace such electronic circuits and systems. Fluidic valves may be used to perform tasks and operations similar to conventional electrical transistors, such as performing control functions, performing logic operations (e.g., binary logical operations), and transmitting information. Accordingly, the present application recognizes a need and provides solutions thereto including improved fluidic valves, which may be used for controlling fluid flows in fluidic devices and systems.

Thus, the present disclosure is generally directed to fluidic devices, systems, and methods. As will be explained in greater detail below, embodiments of the present disclosure may include complementary fluidic valves (e.g., complementary fluidistors (cFETs)) as well as systems of cFETs that may perform a wide range of functions and logical operations, including Boolean algebra. Embodiments of the present disclosure may provide various features and advantages over traditional fluidic valves and systems. For example, embodiments of the present disclosure may provide, using only a single component or design, various logic functions with low-leakage control of output pressures. In additional examples, combinations of cFETs with inter-fluidic interconnections may provide advanced and complicated logic functions such as memory and full adder capabilities.

In an embodiment, a fluidic device may include (1) a first inlet channel configured to convey a first fluid at a first pressure into the fluidic device; (2) a second inlet channel configured to convey a second fluid at a second pressure into the fluidic device; (3) an output channel that is configured to convey at least one of the first fluid or the second fluid out of the fluidic device; and (4) a piston that may be moved between a first position that inhibits (e.g., reduces or blocks) fluid flow to the output channel from the second inlet channel and a second position that inhibits fluid flow to the output channel from the first inlet channel. Movement of the piston between the first and second positions may be determined by a difference in forces applied against a first control gate of the piston (e.g., a first force) and a second control gate of the piston (e.g., a second force). In some examples, the first force may be in the form of a first control pressure and/or the second force may be in the form of a second control pressure. In some examples, one of the first or second force may be produced by a mechanical or electro-mechanical component.

The first control gate may include a first surface area configured to interface with the first control pressure that, when applied to the first surface area through a first control input port, may tend to force the piston towards the first position, allowing the first inlet channel to convey the first fluid to the output channel and inhibiting fluid flow in the second inlet channel. The second control gate may include a second surface area configured to interface with the second control pressure that, when applied to the second surface area through a second control input port, may force the piston towards the second position, allowing the second inlet channel to convey the second fluid to the output channel and inhibiting fluid flow in the first inlet channel.

In some examples, the fluidic device may be a fluidic logic device. In such examples, the inlet ports and inlet channels may include a first inlet port/channel and a second inlet port/channel. In some examples, the fluidic logic device may optionally include a third inlet port/channel and/or a fourth inlet port/channel. Furthermore, the fluidic device may include a first piston with a first control gate and a second control gate, and a second piston with a third control gate and a fourth control gate. Each control gate may include a control input port through which a control pressure may be applied to a surface area of the control gate, which may tend to force the piston to move in a specific direction.

Each of the inlet channels may be configured to convey fluid to a first output port/channel. In some additional examples, a third inlet channel and a fourth inlet channel may be configured to convey fluid to a second output port/channel.

In some examples, the first output port/channel may be configured to convey a fluid to either the third fluid inlet port/channel and/or to the fourth inlet port/channel. Alternatively, the first output port/channel may be configured to convey a fluid to either a third control input port and/or a fourth control input port.

In some examples, the first piston may further include (1) a first restricting gate transmission element configured to inhibit, when the first piston is in the second position, fluid flow through the first inlet channel and, (2) a second restricting gate transmission element configured to inhibit, when the first piston is in the first position, fluid flow through the second inlet channel.

The second piston may include (1) a third restricting gate transmission element configured to inhibit, when the second piston is in a fourth position, fluid flow through the third inlet channel and, (2) a fourth restricting gate transmission element configured to inhibit, when the second piston is in the third position, fluid flow through the fourth inlet channel; (3) a third control gate configured to interface with a third control pressure that, when applied to a third surface area of the third control gate, may tend to force the second piston towards the third position, and (4) a fourth control gate configured to interface with a fourth control pressure that, when applied to a fourth surface area of the fourth control gate, may tend to force the second piston towards the fourth position.

In other examples, the first surface area of the first control gate may be greater than the second surface area of the second control gate. In such examples, the second control gate may receive a second control pressure as a preload pressure. In this arrangement, the piston may be in the second position by default, by which fluid flow through the first inlet channel may be inhibited, unless the first control pressure exceeds a certain value to overcome the force applied to the second control gate by the preload pressure and move the piston to the first position.

In alternative examples, the first surface area of the first control gate may be smaller than the second surface area of the second control gate. In such examples, the first control gate may receive a first control pressure as a preload pressure. In this arrangement, the first piston may be in the first position by default, by which fluid flow through the second inlet channel may be inhibited, unless the second control pressure exceeds a certain value to overcome the force applied to the first control gate by the preload pressure and move the first piston to the second position.

In additional or alternative examples, the third surface area of the third control gate may be larger than the fourth surface area of the fourth control gate. In such examples, the fourth control gate may receive a fourth control pressure as a preload pressure. In this arrangement, the second piston may be in the fourth position by default, in which the third inlet channel may be inhibited, unless the third control pressure exceeds a certain value to overcome the force applied to the fourth control gate by the preload pressure and move the second piston to the third position.

In alternative or additional examples, the third surface area of the third control gate may be smaller than the fourth surface area of the fourth control gate. In such examples, the third control gate may receive a third control pressure as a preload pressure. In this arrangement, the second piston may be in the third position by default, by which fluid flow through the fourth inlet channel may be inhibited, unless the fourth control pressure exceeds a certain value to overcome the force applied to the third control gate by the preload pressure and move the second piston to the fourth position.

In some examples, the first or second inlet channels may receive one of: a low-pressure fluid, a high-pressure fluid, or a fluid input signal. In some examples, the first and/or the second control pressures may be a first and/or a second input signal, which may be distinct from any input signal to the inlet channels. Similarly, the third and/or fourth inlet channels may receive a low and/or high pressure and/or may receive an input signal. In some examples, the third and/or the fourth control pressures may be one of a first, a second, a third, and/or a fourth input signal. In alternative embodiments, the third inlet channel and/or the fourth inlet channel may be in fluidic communication with (e.g., receive fluid flow from) an upstream output channel of a separate fluidic device or system.

In some examples, each of the inlet ports/channels may include contributions from several separate sources. These sources may be high pressure or low pressure, or may be a predetermined fraction of what might be a high pressure. Similarly, in alternative or additional examples, a control pressure may consist of contributions from several disparate fractional pressure sources. Such a fraction might, for example, be greater than what would be deemed a "low pressure," while being below a minimum pressure to be considered a "high pressure." For example, a preload pressure may be created from two separate sources, each providing, e.g., 0.6 fraction of a minimum preload pressure. Each of these sources, when used without the other pressure contribution will be insufficient to reach the minimum preload pressure. However, a summation of both sources will easily exceed the minimum preload pressure to maintain a piston at one of its two canonical positions, the first position or the second position. The opposing pressure to move the piston away from the default position caused by the preload pressure may also be from a summation of different pressures.

In some examples, two or more of the fluidic devices described above may be combined to achieve certain functions. In these arrangements, some fluidic devices may have preload pressures as the first control pressures, and other fluidic devices may have preload pressures as the second control pressures. In some examples, the fluidic devices may be arranged in a serial fashion, with one fluidic device fluidically connected downstream of the output channel of an upstream fluidic device. Alternatively, or additionally, fluidic devices may be configured in a parallel fashion, in which there is at least one common input either to an inlet channel and/or to a control input port of each of the fluidic devices that may be configured in parallel.

In additional or alternative examples, the output fluid of a fluidic device may be directed to one of (a) third inlet channel of a second fluidic device; (b) a fourth inlet channel of the second fluidic device; (c) a third control input port of the second fluidic device; or (d) a fourth control input port of the second fluidic device. One of the inlet channels of the second fluidic device may receive high pressure, while the other inlet channel of the second fluidic device may receive an input signal or low pressure. One of the control pressures may receive a separate input signal.

In some of the examples described above, fluidic devices may function as logic gates, such as AND, NAND, OR, NOR, XOR, and XNOR. Combinations of these fluidic devices may provide for more complex logic functions, such as storing signals (i.e., memory) and adding signals.

In another embodiment, a fluidic device may be a fluidic logic-gate system, in which each cFET of a plurality of fluidically interconnected cFETs includes: (i) a first inlet channel configured to convey fluid to an output channel; (ii)

a second inlet channel configured to convey fluid to the output channel; and (iii) a piston that is movable between a first position that inhibits fluid flow in the second inlet channel and a second position that inhibits fluid flow in the first inlet channel, wherein the movement of the piston between the first and second positions is determined by a difference between a first control force applied by a first control pressure against a first surface area of a first control gate of the piston and a second control force applied by a second control pressure against a second surface area of a second control gate of the piston.

In alternative or additional examples, each piston within the fluidic logic-gate system may additionally include (iv) a first restricting gate transmission element of the first control gate configured to engage the first inlet channel to inhibit fluid flow, when the piston is in a second position; and (v) a second restricting gate transmission element of the second control gate configured to engage the second inlet channel to inhibit fluid flow, when the piston is in a first position.

In at least one example, the fluidic device and/or system may perform an operation on a first fluid input source connected to the first inlet channel and a second fluid input source connected to the second inlet channel. In this example, the first one or more inlet channels may be fluidically configured to connect to a high-pressure source (e.g., corresponding to a logic value of "1", also referred to as "LOGIC 1"), the second one or more inlet channels may be one or more drain ports fluidically configured to connect to a low-pressure source (e.g., corresponding to a logic value of "0", also referred to as "LOGIC 0"). A first control pressure applied to the first surface area of the first control gate may be a first input signal. In alternative or additional examples, the first control pressure may exceed a second control pressure applied to the second surface area of the second control gate, which may cause the piston to move to a first position. In alternative or additional examples, the second control pressure may be a minimum, default, static, or preload pressure. In some examples, the first input source may be either low pressure (LOGIC 0) or high pressure (LOGIC 1). In other examples, a second input source may be high pressure (LOGIC 1) or low pressure (LOGIC 0).

In another embodiment, the present disclosure may include one or more example methods to control (e.g., manipulate) fluid flows in fluidic devices and/or in fluidic logic-gate systems. The steps of such an example method may include (1) conveying a first fluid with a first pressure in a first inlet channel of the fluidic device to an output channel of the fluidic device; (2) conveying a second fluid with a second pressure in a second inlet channel of the fluidic device to the output channel; (3) applying one of (a) a first control pressure against a first control gate of a piston of the fluidic device to locate the piston in a first position, in which the first position of the piston may inhibit fluid flow in the second inlet channel and may uninhibit fluid flow in the first inlet channel; or (b) a second control pressure against a second control gate of the piston of the fluidic device to locate the piston in a second position, in which the second position of the piston may inhibit fluid flow in the first inlet channel and may uninhibit fluid flow in the second inlet channel. Additional methods may be disclosed, at least, to invert signals and/or to perform logic operations on signals, such as, for example: OR, AND, XOR, and XNOR.

Features from any of the embodiments described herein may be used in combination with one another in accordance with the general principles described herein. These and other embodiments, features, and advantages will be more fully understood upon reading the following detailed description in conjunction with the accompanying drawings and claims.

Throughout the drawings, identical reference characters and descriptions may indicate similar, but not necessarily identical, elements. While the example embodiments described herein may be susceptible to various modifications and alternative forms, specific embodiments have been shown by way of example in the drawings and will be described in detail herein. However, the example embodiments described herein may not be intended to be limited to the particular forms disclosed. Rather, the present disclosure covers all modifications, equivalents, and alternatives falling within the scope of the appended claims.

The following will provide, with reference to FIGS. 1-51, detailed descriptions of basic elements of fluid flow control, basic fluidic devices, complementary fluidistors, uses of complementary fluidistors in fluid logic devices, combinations of fluidistors to achieve more complicated logic devices, including fluidic memory gates and/or systems, and fluidic binary adder devices.

The present disclosure may include fluidic systems that involve the control (e.g., stopping, starting, restricting, increasing, etc.) of fluid flows through inlets. The control of fluid flow may be accomplished with a fluidic valve. FIG. 1 shows a schematic diagram of a fluidic valve 100 for controlling flow through an inlet 110, according to at least one embodiment of the present disclosure. Fluid from a fluid source (e.g., a pressurized fluid source, a fluid pump, etc.) may flow through the inlet 110 from an inlet 112 to an output port 114, which may be operably coupled to, for example, a fluid-driven mechanism, another inlet, or a fluid reservoir.

Fluidic valve 100 may include a gate 120 for controlling the fluid flow through inlet 110. Gate 120 may include a gate transmission element 122, which may be a movable component that is configured to transmit an input force, pressure, or displacement to a restricting region 124 to restrict or stop flow through the inlet 110. Conversely, in some examples, application of a force, pressure, or displacement to gate transmission element 122 may result in opening restricting region 124 to allow or increase flow through the inlet 110. The force, pressure, or displacement applied to gate transmission element 122 may be referred to as a gate force, gate pressure, or gate displacement. Gate transmission element 122 may be a flexible element (e.g., an elastomeric membrane, a diaphragm, etc.), a rigid element (e.g., a movable piston, a lever, etc.), or a combination thereof (e.g., a movable piston or a lever coupled to an elastomeric membrane or diaphragm).

As illustrated in FIG. 1, gate 120 of fluidic valve 100 may include one or more gate terminals, such as an input gate terminal 126A and an output gate terminal 126B (collectively referred to herein as "gate terminals 126") on opposing sides of gate transmission element 122. Gate terminals 126 may be elements for applying a force (e.g., pressure) to gate transmission element 122. By way of example, gate terminals 126 may each be or include a fluid chamber adjacent to gate transmission element 122. Alternatively or additionally, one or more of gate terminals 126 may include a solid component, such as a spring, a lever, screw, piezoelectric actuator, or piston, that is configured to apply a force to gate transmission element 122.

In some examples, a gate port 128 may be in fluid communication with input gate terminal 126A for applying a positive or negative fluid pressure within the input gate terminal 126A. A control fluid source (e.g., a pressurized fluid source, a fluid pump, etc.) may be in fluid communication with gate port 128 to selectively pressurize and/or depressurize input gate terminal 126A. In additional embodiments, a force or pressure may be applied at the input gate terminal 126A in other ways, such as with a piezoelectric element or an electromechanical actuator, etc.

In the embodiment illustrated in FIG. 1, pressurization of the input gate terminal 126A may cause the gate transmission element 122 to be displaced toward restricting region 124, resulting in a corresponding pressurization of output gate terminal 126B. Pressurization (e.g., application of a force) of output gate terminal 126B may, in turn, cause restricting region 124 to partially or fully restrict to reduce or stop fluid flow through the inlet 110. Depressurization of input gate terminal 126A may cause gate transmission element 122 to be displaced away from restricting region 124, resulting in a corresponding depressurization (e.g., releasing/reducing an applied force) of the output gate terminal 126B. Depressurization of output gate terminal 126B may, in turn, cause restricting region 124 to partially or fully expand to allow or increase fluid flow through inlet 110. Thus, gate 120 of fluidic valve 100 may be used to control fluid flow from inlet 112 to output port 114 of inlet 110.

Figure 2:
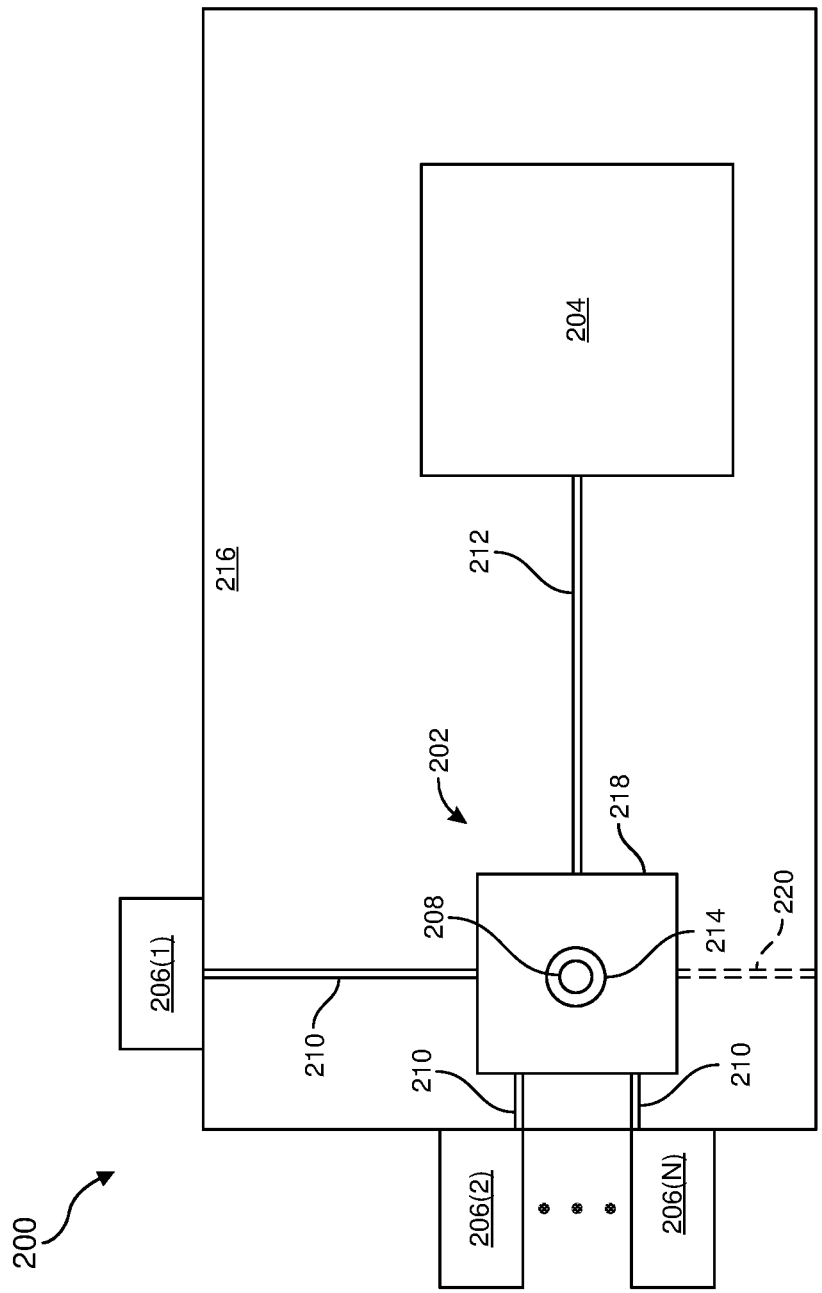
FIG. 2 is a schematic diagram of an example fluidic system, according to at least one embodiment of the present disclosure.

FIG. 2 is a schematic diagram of a fluidic system 200 that includes a fluidic valve 202, a fluid-driven mechanism 204 configured to be activated, controlled, or fed by fluidic valve 202, and one or more fluid sources 206(1)-(N) (collectively referred to as fluid sources 206) for controlling and/or being controlled by fluidic valve 202. In some examples, the flow of a fluid from one of fluid sources 206(1)-(N) to the fluid-driven mechanism 204 may be controlled by a piston 208 of fluidic valve 202. A port 210 (e.g., a control input port) may provide fluid communication between each of fluid sources 206(1)-(N) and fluidic valve 202. An output port 212 may provide fluid communication between fluidic valve 202 and fluid-driven mechanism 204. As shown, fluidic valve 202 may include piston 208 that may be movable within a cavity 214 to open and close fluidic valve 202 for controlling flow of the fluid.

Fluidic system 200 may include a substrate 216, within which or on which at least some of the components of fluidic system 200 are disposed. For example, at least a portion of substrate 216 may define one or more of a valve body 218 of fluidic valve 202, fluid sources 206, ports 210, output port 212, cavity 214, and/or fluid-driven mechanism 204. In some embodiments, substrate 216 may include a stack of materials, such as a drive body portion, at least one flexible material (e.g., an elastic material), a gate body portion, and/or an inlet body portion. In some examples, the term "flexible" may mean capable of flexing and/or returning to an original state without permanent damage. A flexible material may also be stretchable. In some examples, substrate 216 may include at least one of silicon, silicon dioxide, a glass, and/or a rigid polymer. Examples of some of these materials include, e.g., a polycarbonate material, an acrylic material, a urethane material, a fluorinated elastomer material, a polysiloxane material, PTFE, ABS, etc.

Fluid-driven mechanism 204 may include any fluid load or mechanism that may be driven or controlled by flowing and/or pressurization of fluid at a fluidic scale. By way of example and not limitation, fluid-driven mechanism 204 may include at least one of a microelectromechanical device (e.g., a so-called "MEMS" device), an expansible cavity, a piston system, and/or a haptic feedback device. Each of fluid sources 206 may be any source or mechanism that may provide a pressurized fluid (e.g., gas (e.g., air, nitrogen, etc.)) or liquid (e.g., (water, oil, etc.)) to fluidic valve 202. By way of example and not limitation, fluid sources 206 may each be or include a pressurized reservoir, a fan, a pump, or a piston system, etc. In some examples, one or more of fluid sources 206 may be capable of providing a pressurized fluid at a high pressure and/or a low pressure. In general, a "high pressure" may be any pressure of a fluid that falls within a high or maximum pressure range, and a "low pressure" may be any pressure of a fluid that falls within a low or minimum pressure range. In some situations, a pressure falling within a high-pressure range may be considered to represent one state (e.g., "1" or LOGIC 1) of a bit or binary digit, and a pressure falling within a low-pressure range may be considered to represent another state (e.g., "0" or LOGIC 0) of a bit or binary digit. In some examples, one or more fluid sources 206 may be a source of fluid pressures or a drain of fluid pressures.

Optionally, in some embodiments, an exhaust output 220 (shown in FIG. 2 in dashed lines) may be in fluid communication with fluidic valve 202. Exhaust output 220 may enable one or more chambers within fluidic valve 202 to expand and/or contract as piston 208 is moved back and forth to open or close fluidic valve 202, as will be explained in further detail below.

In some embodiments, fluidic system 200 may be incorporated in a haptic feedback device, such as for use with an artificial-reality (e.g., virtual-reality, augmented-reality, mixed-reality, or hybrid-reality) system. Fluidic system 200 may be positioned on or in a wearable device (e.g., a headband, a head-mounted display, a glove, an armband, etc.) that is configured to provide haptic feedback (e.g., vibration, pressure, etc.) to a user. For example, fluid-driven mechanism 204 of fluidic system 200 may be an expansible cavity configured to fill and expand with the fluid upon opening of fluidic valve 202. The expanding cavity may press against the user, and the user may sense the pressure from the expanding cavity, such as resulting from an action taken by the user in the artificial reality. By way of example, fluidic system 200 may be incorporated in a finger of a glove, and the user may use his or her finger in space to make a selection in an artificial-reality environment. The expansible cavity of fluidic system 200 may be filled and expanded with the fluid to provide a pressure point on the user's finger to confirm the selection made by the user. The pressure point may provide a sensation that the user is touching a real object. Alternatively, fluid-driven mechanism 204 may include an eccentric rotating element that may be rotated by the flowing fluid when fluidic valve 202 is in an open state, resulting in a vibrating sensation as haptic feedback for the user.

Figure 3A:
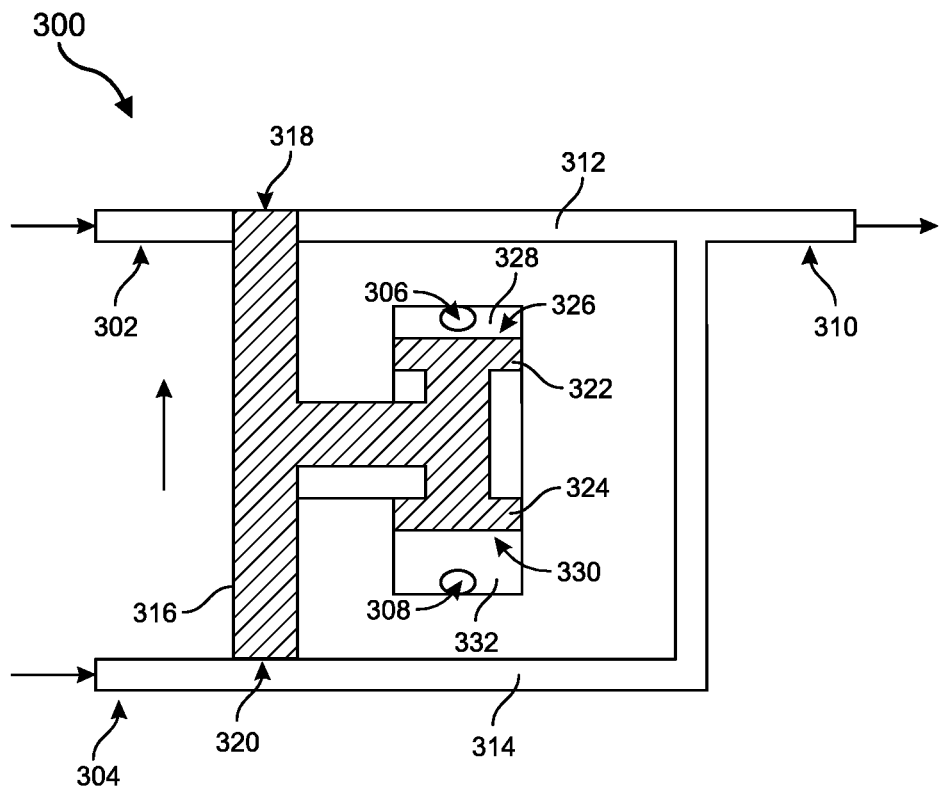
FIGS. 3A and 3B are schematic diagrams of an example complementary fluidic valve in two respective states, according to at least one embodiment of the present disclosure.
Figure 3B:
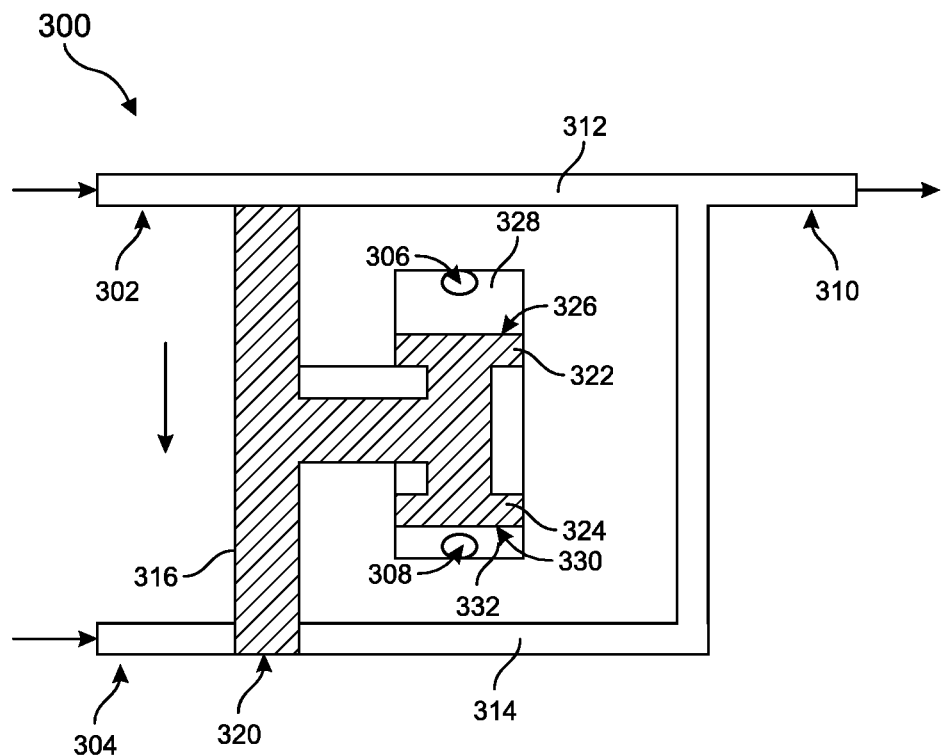

Fluidic valve 202 in FIG. 2 may have various forms and configurations and may be incorporated into various fluidic systems. FIGS. 3A and 3B are schematic diagrams illustrating two states of an example fluidic valve 300. As shown, fluidic valve 300 may include a first inlet port 302, a second inlet port 304, a first control input port 306, a second control input port 308, an output port 310, a first inlet channel 312 configured to convey fluid from first inlet port 302 to output port 310, a second inlet channel 314 configured to convey fluid from second inlet port 304 to output port 310, and a piston 316. In some examples, piston 316 may be formed from a single piece of a substantially rigid material (e.g., a plastic, metal, or glass). Alternatively, piston 316 may be formed from a substantially rigid composite part. Piston 316 may include a restricting gate transmission element 318 configured to inhibit or restrict fluid flow through first inlet channel 312 when piston 316 is in the position illustrated in FIG. 3A and uninhibit fluid flow through first inlet channel 312 when piston 316 is in the position illustrated in FIG. 3B.

Piston 316 may also include a restricting gate transmission element 320 configured to inhibit or restrict fluid flow through second inlet channel 314 when piston 316 is in the position illustrated in FIG. 3B and uninhibit fluid flow through second inlet channel 314 when piston 316 is in the position illustrated in FIG. 3A. Because of the complementary positions of restricting gate transmission elements 318 and 320, fluid flow may not tend to flow directly from inlet port 302 to inlet port 304. Piston 316 may include complementary or opposing first and second piston heads 322 and 324. First piston head 322 may have a first control gate 326 configured to interface with a first control pressure 328 from control input port 306 that, when applied to control gate 326, may tend to force piston 316 towards the position illustrated in FIG. 3B. Similarly, second piston head 324 may have a second control gate 330 configured to interface with a second control pressure 332 from control input port 308 that, when applied to control gate 330, may tend to force piston 316 towards the position illustrated in FIG. 3A.

Hereinafter, the terms "inlet," "inlet port," "inlet channel," or "inlet port/channel" may be referred to as "inlet" for simplicity. A port may be considered to be included in a channel, even if the term "port" is not expressly included.

As shown in FIGS. 3A and 3B, control gates 326 and 330 may have substantially the same surface areas as each other. As such, movement of piston 316 from the position illustrated in FIG. 3A to the position illustrated in FIG. 3B may require a greater fluid pressure at the first control input port 306 than at the second control input port 308. Similarly, movement of piston 316 from the position illustrated in FIG. 3B to the position illustrated in FIG. 3A may require a greater fluid pressure at the second control input port 308 than at the first control input port 306.

In some examples, the first restricting gate transmission element 318 and the second restricting gate transmission element 320 may have substantially the same surface areas as each other, which may be substantially less than the surface area of the first control gate 326 or the surface area of the second control gate 330. As such, movement of the piston 316 may be dominated by the first control pressure applied to first control input port 306 and/or the second control pressure applied to the second control input port 308 rather than any fluid pressures that may be applied to the first inlet port 302 and/or the second inlet port 304.

Figure 4A:
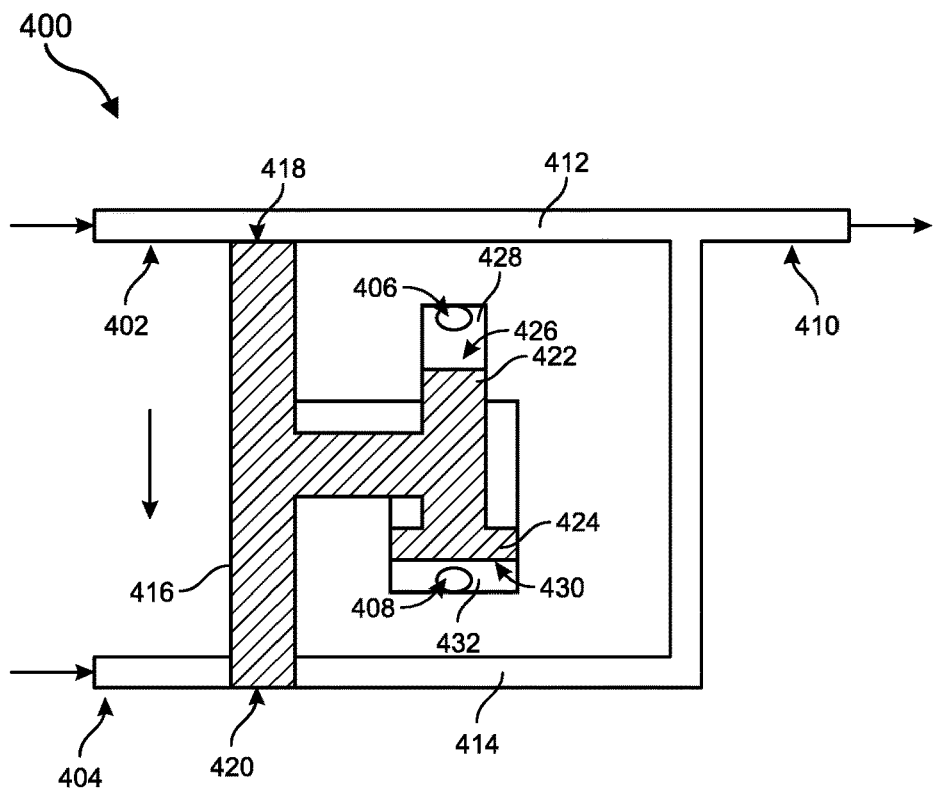
FIGS. 4A and 4B are schematic diagrams of another example complementary fluidic valve in two respective states, according to at least one embodiment of the present disclosure.
Figure 4B:
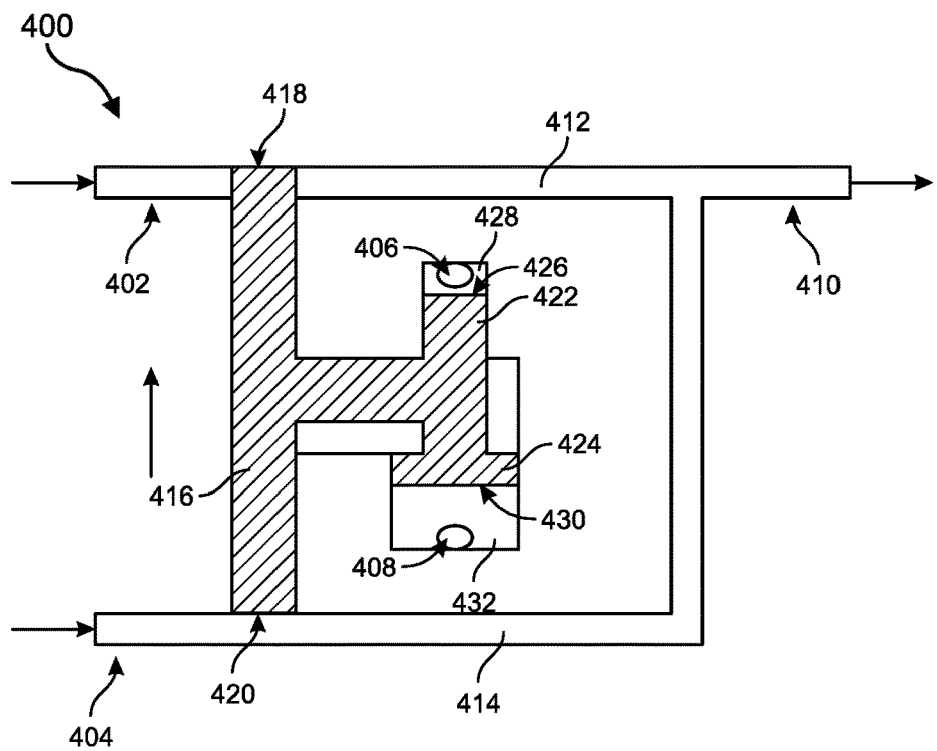

In some examples, the fluidic valves described herein may include a piston having control gates with different surface areas relative to each other. For example, FIGS. 4A and 4B are schematic diagrams illustrating two positions of an example fluidic valve 400 having control gates with different respective surface areas. As shown, fluidic valve 400 may include a first inlet port 402, a second inlet port 404, a first control input port 406, a second control input port 408, an output port 410, a first inlet channel 412 configured to convey fluid from first inlet port 402 to the output port 410, a second inlet channel 414 configured to convey fluid from second inlet port 404 to the output port 410, and a piston 416. Although not shown, in some embodiments, the first control input port 406 may be absent, and another source of force (e.g., a spring or electromechanical actuator) may be used to apply a force to first control gate 426. In some examples, the piston 416 may be formed from a single piece of a substantially rigid material (e.g., a rigid plastic, metal, or glass). Alternatively, piston 416 may be formed from a substantially rigid composite part.

The piston 416 may include a first restricting gate transmission element 418 configured to inhibit fluid flow through the first inlet channel 412 when the piston 416 is in the position illustrated in FIG. 4B and uninhibit fluid flow through the second inlet channel 412 when the piston 416 is in the position illustrated in FIG. 4A. The piston 416 may also include a second restricting gate transmission element 420 configured to inhibit fluid flow through the second inlet channel 414 when the piston 416 is in the position illustrated in FIG. 4A and uninhibit fluid flow through the second inlet channel 414 when the piston 416 is in the position illustrated in FIG. 4B.

The piston 416 may include complementary or opposing piston heads, a first piston head 422 and a second piston head 424. The first piston head 422 may have a first control gate 426 configured to interface with a first control pressure 428 from the first control input port 406 that, when applied to first control gate 426, may tend to force the piston 416 towards the position illustrated in FIG. 4A. Similarly, the second piston head 424 may have a second control gate 430 configured to interface with a second control pressure 432 a second control input port 408 that, when applied to the second control gate 430, may tend to force the piston 416 towards the position illustrated in FIG. 4B.

As shown in FIGS. 4A and 4B, the first control gate 426 and the second control gate 430 may have different surface areas (e.g., a second surface area of second control gate 430 may be larger than a surface area of the first control gate 426). As such, movement of the piston 416 from the position illustrated in FIG. 4A to the position illustrated in FIG. 4B may require the second control pressure at the second control input port 408 that is less than the first control pressure at the first control input port 406. In some examples, the relative surface areas of the first control gate 426 with that of the second control gate 430 may be configured such that specific differences between the first control pressure applied to the first control input port 406 and the second control pressure applied to the second control input port 408 may trigger movement of the piston 416 between the positions illustrated in FIGS. 4A and 4B. For example, the second surface area of control gate 430 may be configured to have a surface area that is two times greater than the first surface area of the first control gate 426 in order to trigger movement of the piston 416 from the position illustrated in FIG. 4A to the position illustrated in FIG. 4B when the second control pressure applied to the second control input port 408 is greater than one half the first control pressure applied to the first control input port 406.

In some examples, the first restricting gate transmission element 418 and the second restricting transmission element 420 may have substantially the same surface areas as each other, which may be substantially less than the surface areas of one or both of the first control gate 426 and the second control gate 430. As such, movements of piston 416 may be dominated by the first control pressure applied to the first control input port 406 and the second control pressure applied to the second control input port 408 rather than any fluid pressures that may be applied to the inlet port 402 and/or to the inlet port 404.

Figure 5:
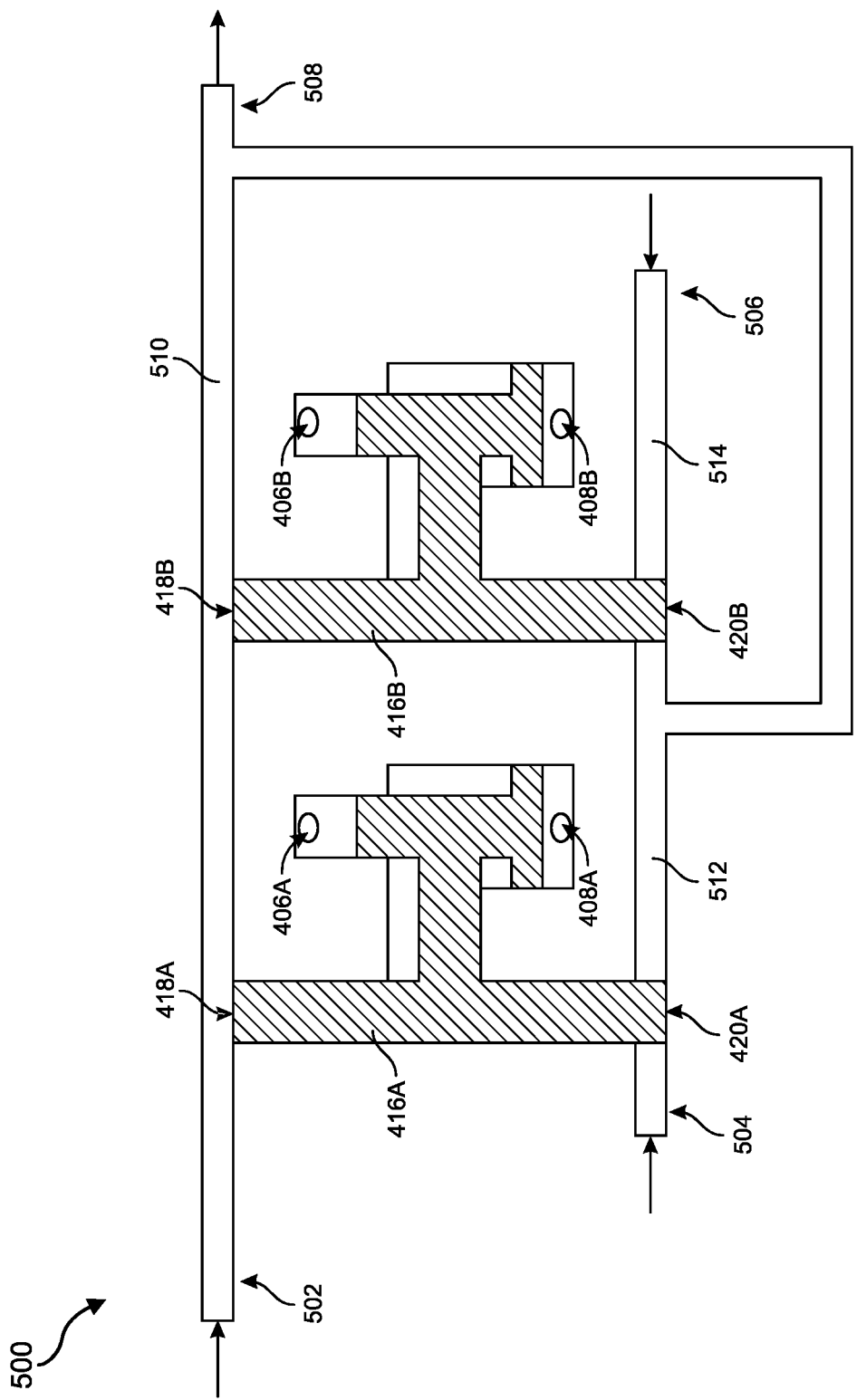
FIG. 5 is a schematic diagram of an example fluidic logic gate, according to at least one embodiment of the present disclosure.

Some or all of the components of fluidic valve 300 in FIGS. 3A and 3B or fluidic valve 400 in FIGS. 4A and 4B may be configured and/or modified to perform various functions and/or operations as part of a larger composite fluidic system. For example, as shown in FIG. 5, a fluidic logic gate 500 may be configured using a first piston 416A and a second piston 416B. As shown, fluidic logic gate 500 may include a first inlet port 502, a second inlet port 504, a third inlet port 506, an output port 508, a first inlet channel 510 configured to convey fluid from first inlet port 502 to the output port 508, a second inlet channel 512 configured to convey fluid from the second inlet port 504 to the output port 508, and a third inlet channel 514 configured to convey fluid from third inlet port 506 to the output port 508.

The first piston 416A may include a first restricting gate transmission element 418A which may be configured to uninhibit fluid flow through the first inlet channel 510 when the first piston 416A is in the position illustrated in FIG. 5 and inhibit fluid flow through the first inlet channel 510 when a sufficient second control pressure is applied to a second control input port 408A to overcome a first control pressure applied as a preload pressure to a first control input port 406A which may tend to force first piston 416A upwards (from the perspective of FIG. 5).

Similarly, a second piston 416B may include a third restricting gate transmission element 418B which may be configured to uninhibit fluid flow through first inlet channel 510 when second piston 416B is in the position illustrated in FIG. 5 and inhibit fluid flow through the first inlet channel 510 when a sufficient fourth control pressure is applied to a fourth control input port 408B to overcome a third control pressure applied as a preload pressure to a third control input port 406B which may tend to force second piston 416B upwards (from the perspective of FIG. 5).

Piston 416A may also include a second restricting gate transmission element 420A configured to inhibit fluid flow through second inlet channel 512 when the first piston 416A is in the position illustrated in FIG. 5 and uninhibit fluid flow through second inlet channel 512 when a sufficient second control pressure is applied to the second control input port 408A to overcome a first control pressure applied as a preload pressure to the first control input port 406A which may tend to force the first piston 416A upwards (from the perspective of FIG. 5).

Similarly, second piston 416B may include a fourth restricting gate transmission element 4206 configured to inhibit fluid flow through the third inlet channel 514 when the second piston 416B is in the position illustrated in FIG. 5 and uninhibit fluid flow through the third inlet channel 514 when sufficient fourth control pressure is applied to fourth control input port 408B to overcome the third control pressure applied as a preload pressure to the third control input port 406B which may tend to force the second piston 416B upwards (from the perspective of FIG. 5).

In some examples, the first and second pistons 416A-416B may be part of a single fluidic device within which the first inlet channel 510, the second inlet channel 512, and/or the third inlet channel 514 may be integrated. Alternatively, the first and second pistons 416A and 416B may be part of separate fluidic devices, and portions of the first inlet channel 510, the second inlet channel 512, and/or the third inlet channel 514 may be external fluid connections between the separate fluidic devices.

Figure 6:
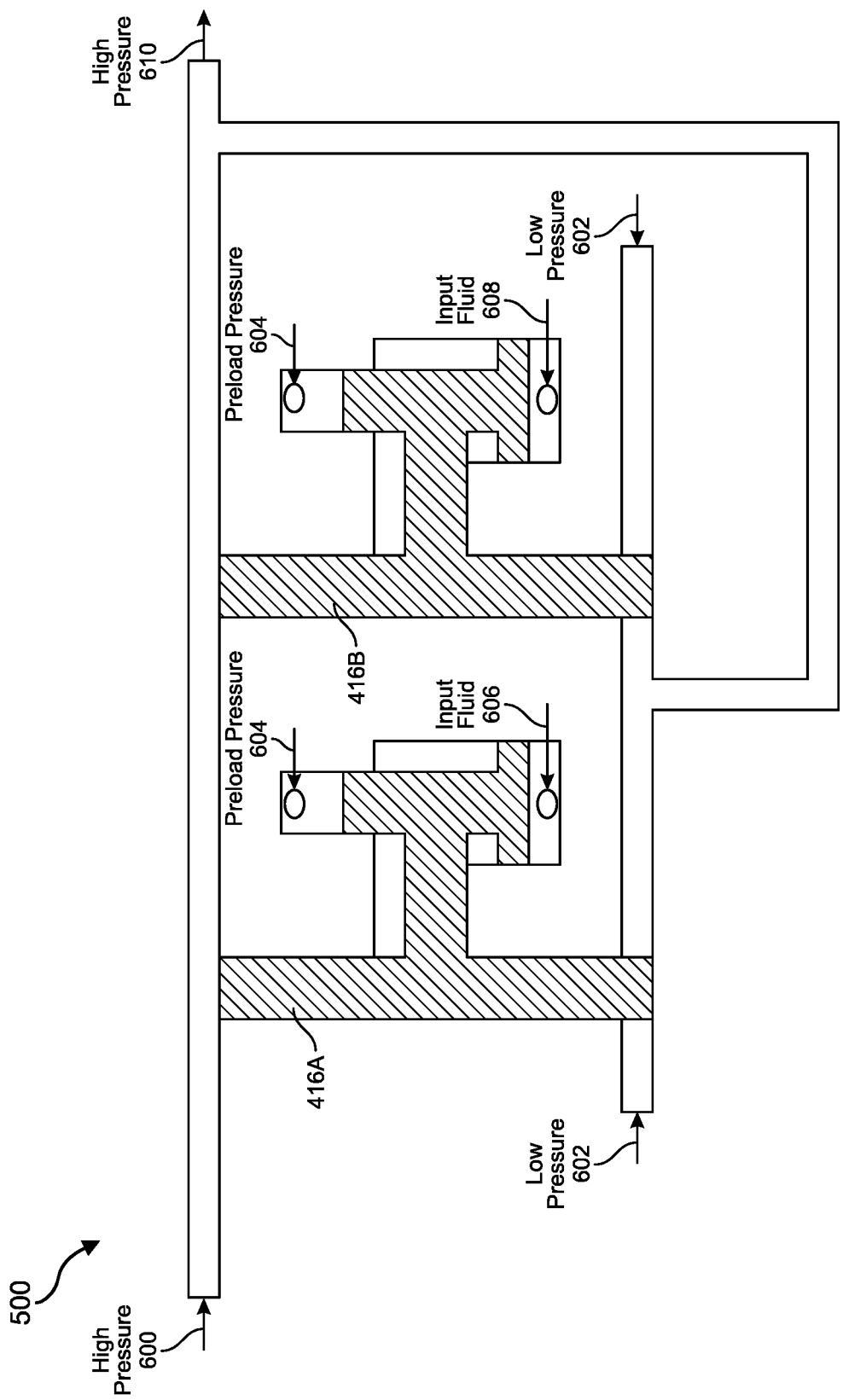
FIG. 6 is a schematic diagram of the example fluidic logic gate of FIG. 5 configured to perform a NOR operation, according to at least one embodiment of the present disclosure.

As shown in FIG. 6, in some examples, fluidic logic gate 500 may be configured to perform a NOR operation by applying (1) a high pressure 600 to the first inlet port 502, (2) a low pressure 602 to the second inlet port 504 and the third inlet port 506, (3) first and third control pressures, which are each a preload pressure 604 (e.g., high pressure 600) respectively applied to the first and third control input ports 406A-406B, (4) an input fluid 606 (e.g., an input A) to the second control input port 408A, and (5) an input fluid 608 (e.g., an input B) to the fourth control input port 408B. In this example, a result of the NOR operation may be seen as output pressure 610 at the output port 508.

As shown in FIG. 7A, if the input fluid 606 and the input fluid 608 both have a low pressure (e.g., a pressure lower than that of preload pressure 604, a LOGIC 0), then the first and second pistons 416A-416B may be in the positions shown and high pressure 600 may be conveyed from the first inlet port 502 through first inlet channel 510 to output port 508.

As shown in FIG. 7B, if input fluid 606 has a low pressure (e.g., a pressure lower than that of preload pressure 604, a LOGIC 0) and input fluid 608 has a sufficiently high pressure (e.g., a pressure at least equal to preload pressure 604, a LOGIC 1), then first and second pistons 416A-416B may be in the positions shown and low pressure 602 may be conveyed from first inlet port 506 through the third inlet channel 514 to the output port 508.

As shown in FIG. 7C, if input fluid 606 has a sufficiently high pressure (e.g., a pressure at least equal to the preload pressure 604, a LOGIC 1) and input fluid 608 has a low pressure (e.g., a pressure lower than that of preload pressure 604, a LOGIC 0), then the first and second pistons 416A-416B may be in the positions shown and low pressure 602 may be conveyed from the second inlet port 504 through the second inlet channel 512 to the output port 508.

As shown in FIG. 7D, if input fluid 606 and input fluid 608 both have a sufficiently high pressure (e.g., a pressure at least equal to preload pressure 604, a LOGIC 1), then pistons 416A-416B may be in the positions shown and low pressure 602 may be conveyed from the first inlet port 504 or the second inlet port 506 through the second inlet channel 512 or the third inlet channel 514 to the output port 508. FIG. 8 illustrates a NOR truth table 800 that may represent the functionality of fluidic logic gate 500 when configured as shown in FIG. 6.

Figure 9:
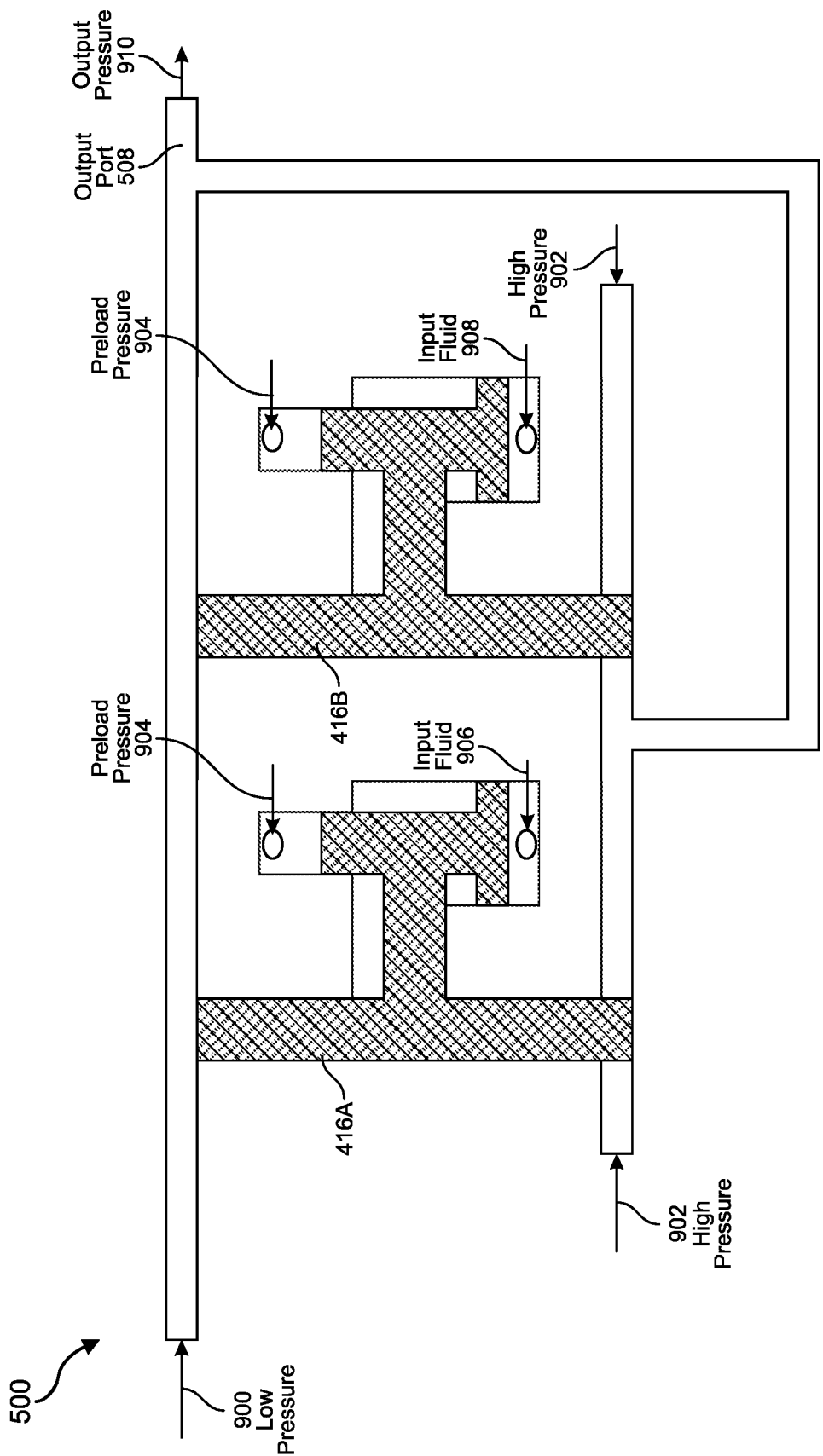
FIG. 9 is a schematic diagram of the example fluidic logic gate of FIG. 5 configured to perform an OR operation, according to at least one embodiment of the present disclosure.

As shown in FIG. 9, in some examples, fluidic logic gate 500 may be configured to perform an OR operation by applying (1) a low pressure 900 to the first inlet port 502, (2) a high pressure 902 to the second and the third inlet ports 504 and 506, (3) the first and the third control pressures, which are each a preload pressure 904 (e.g., high pressure 902) respectively to control input ports 406A-406B, (4) an input fluid 906 with a second control pressure (e.g., an input A) to the second control input port 408A, and (5) an input fluid 908 with a fourth control pressure (e.g., as input B) to fourth control input port 408B. In this example, a result of the OR operation may be seen as output pressure 910 at output port 508.

As shown in FIG. 10A, if input fluid 906 and input fluid 908 both have a low pressure (e.g., a pressure lower than that of preload pressure 904, a LOGIC 0), then pistons 416A-416B may be in the positions shown and low pressure 900 may be conveyed from the first inlet port 502 through the first inlet channel 510 to the output port 508.

As shown in FIG. 10B, if input fluid 906 has a low pressure (e.g., a pressure lower than that of preload pressure 904, a LOGIC 0) and input fluid 908 has a sufficiently high pressure (e.g., a pressure at least equal to preload pressure 904, a LOGIC 1), then pistons 416A-416B may be in the positions shown and high pressure 902 may be conveyed from the third inlet port 506 through the third inlet channel 514 to the output port 508.

As shown in FIG. 10C, if input fluid 906 has a sufficiently high pressure (e.g., a pressure at least equal to preload pressure 904, a LOGIC 1) and input fluid 908 has a low pressure (e.g., a pressure lower than that of preload pressure 904, a LOGIC 0), then pistons 416A-416B may be in the positions shown and high pressure 902 may be conveyed from the second inlet port 504 through the second inlet channel 512 to the output port 508.

As shown in FIG. 10D, if input fluid 906 and input fluid 908 both have a sufficiently high pressure (e.g., a pressure at least equal to preload pressure 904, a LOGIC 1), then pistons 416A-416B may be in the positions shown and high pressure 902 may be conveyed from the second inlet port 504 or the third inlet port 506 through the second inlet channel 512 or the third inlet channel 514 to the output port 508. FIG. 11 illustrates an OR truth table 1100 that may represent the functionality of fluidic logic gate 500 when configured as shown in FIG. 9.

Figure 12:
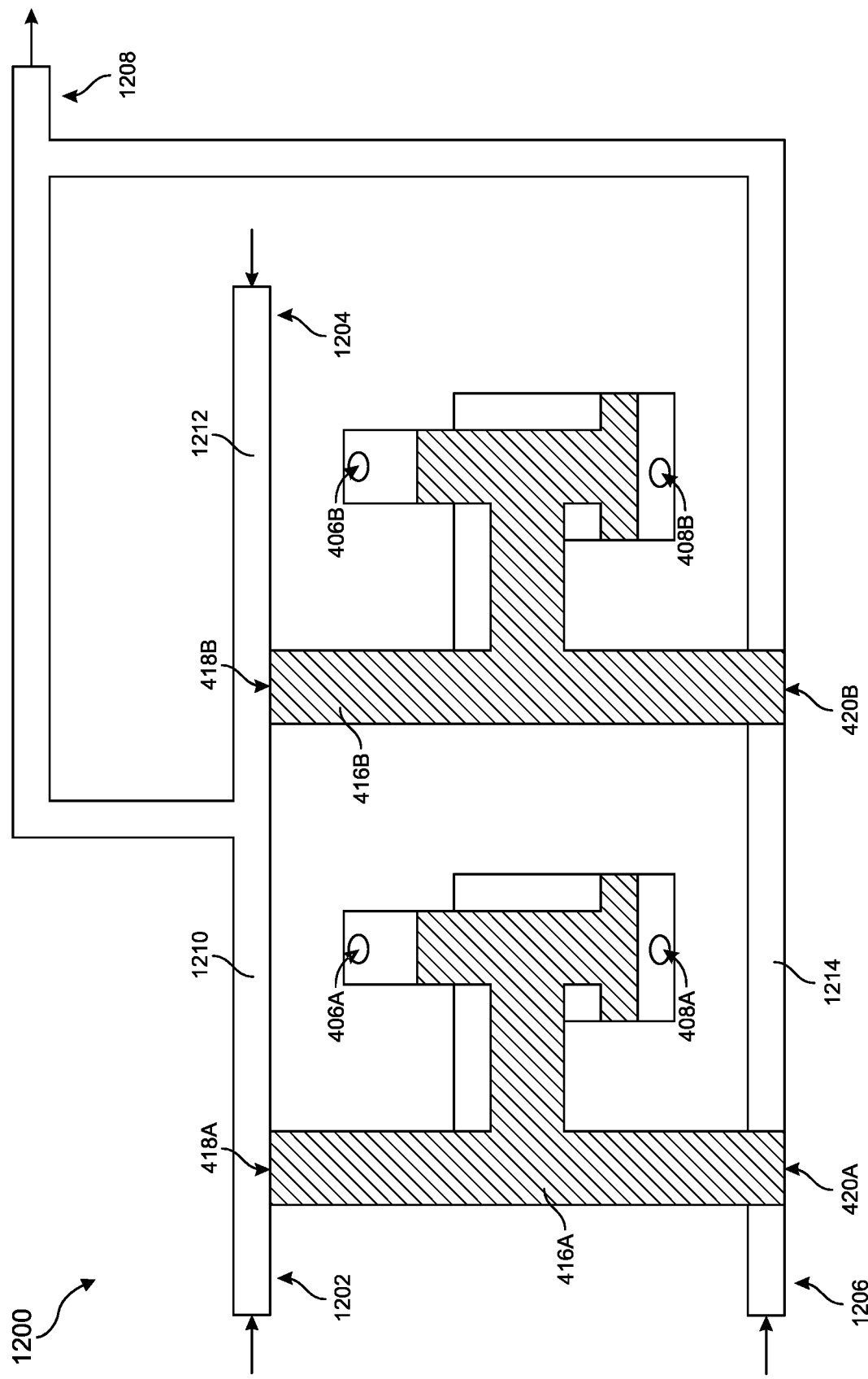
FIG. 12 is a schematic diagram of an example fluidic logic gate, according to at least one embodiment of the present disclosure.

FIG. 12 illustrates a fluidic logic gate 1200 that may be configured to perform a NAND operation or an AND operation. As shown in FIG. 12, fluidic logic gate 1200 may be configured using a first piston 416A and a second piston 416B. As shown, fluidic logic gate 1200 may include a first inlet port 1202, a second inlet port 1204, a third inlet port 1206, an output port 1208, a first inlet channel 1210 configured to convey fluid from the first inlet port 1202 to the output port 1208, a second inlet channel 1212 configured to convey fluid from the second inlet port 1204 to the output port 1208, a third inlet channel 1214 configured to convey fluid from the third inlet port 1206 to the output port 1208, and the pistons 416A-416B.

Piston 416A may include a first restricting gate transmission element 418A configured to uninhibit fluid flow through the first inlet channel 1210 when piston 416A is in the position illustrated in FIG. 12 and inhibit fluid flow through the first inlet channel 1210 when a sufficient second control pressure is applied to the second control input port 408A to overcome a first control pressure applied as a preload pressure to the first control input port 406A which may tend to force piston 416A upwards (in the perspective of FIG. 12).

The second piston 416B may include a third restricting gate transmission element 418B configured to uninhibit fluid flow through the second inlet channel 1212 when second piston 416B is in the position illustrated in FIG. 12 and inhibit fluid flow through the second inlet channel 1212 when a sufficient fourth control pressure is applied to the fourth control input port 408B to overcome a third control pressure applied as a preload pressure to the third control input port 406B which may tend to force second piston 416B upwards (in the perspective of FIG. 12).

The piston 416A may also include a second restricting gate transmission element 420A configured to inhibit fluid flow through the third inlet channel 1214 when piston 416A is in the position illustrated in FIG. 12 and uninhibit fluid flow through the third inlet channel 1214 when a sufficient second control pressure Is applied to second control input port 408A to overcome the first control pressure applied as a preload pressure to the first control input port 406A which may tend to force piston 416A upwards (in the perspective of FIG. 12).

Similarly, the second piston 416B may include a fourth restricting gate transmission element 4206 configured to inhibit fluid flow through the third inlet channel 1214 when the second piston 416B is in the position illustrated in FIG. 12 and uninhibit fluid flow through the third inlet channel 1214 when a sufficient fourth control pressure is applied to the fourth control input port 408B to overcome the third control pressure applied as a preload pressure to the third control input port 406B which may tend to force the second piston 416B upwards (in the perspective of FIG. 12). In some examples, pistons 416A-416B may be part of a single fluidic device within which the first inlet channel 1210, the second inlet channel 1212, and/or the third inlet channel 1214 are integrated. Alternatively, pistons 416A-416B may be part of separate fluidic devices, and portions of inlet channels 1210, 1212, and/or 1214 may be external fluid connections between the separate fluidic devices.

Figure 13:
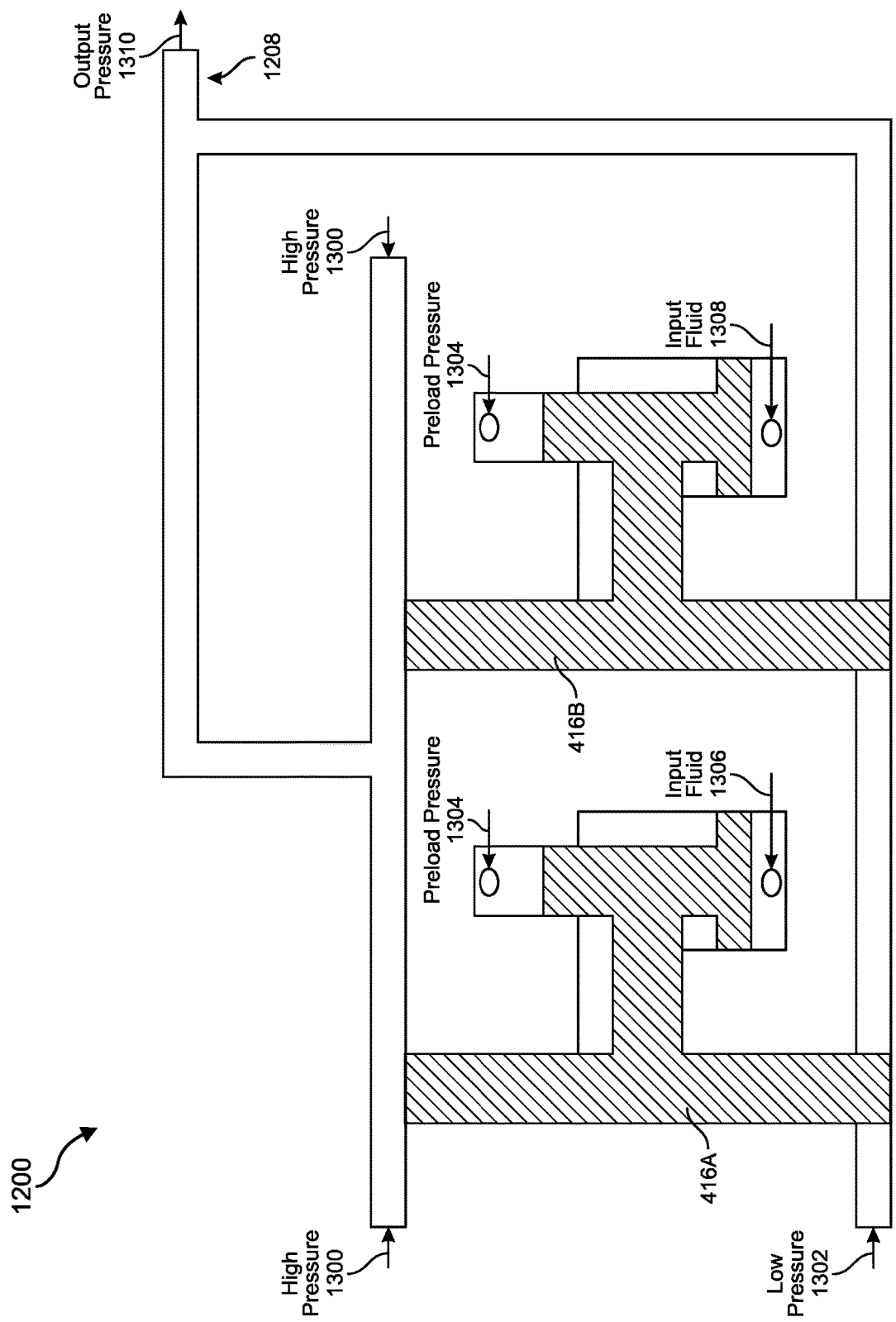
FIG. 13 is a schematic diagram of the example fluidic logic gate of FIG. 12 configured to perform a NAND operation, according to at least one embodiment of the present disclosure.

As shown in FIG. 13, in some examples, fluidic logic gate 1200 may be configured to perform a NAND operation by applying (1) a high pressure 1300 to the first inlet port 1202 and the second inlet port 1204, (2) a low pressure 1302 to the third inlet port 1206, (3) a first control pressure directed to the first control input port 406A and a third control pressure directed to the third control input port 406B, in which each is in the form of a preload pressure 1304 (e.g., high pressure 1300), (4) an input fluid 1306 (e.g., an input A) with a second control pressure to the second control input port 408A, and (5) an input fluid 1308 (e.g., an input B) with a fourth control pressure to the fourth control input port 408B. In this example, a result of the NAND operation may be seen as output pressure 1310 at the output port 1208.

Figure 14A:
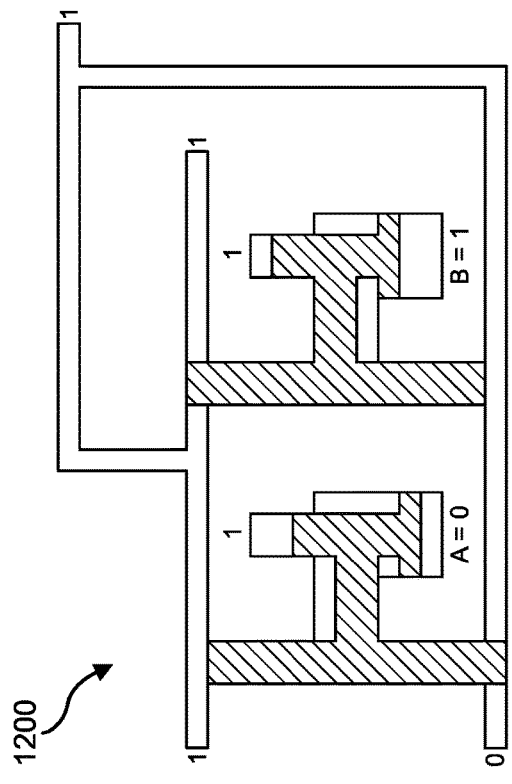
FIGS. 14A-14D are state diagrams of the example fluidic logic gate of FIG. 13, according to at least one embodiment of the present disclosure.

As shown in FIG. 14A, if input fluid 1306 and input fluid 1308 both have a low pressure (e.g., a pressure lower than that of a preload pressure 1304, a LOGIC 0), then pistons 416A-416B may be in the positions shown and high pressure 1300 may be conveyed from the first inlet port 1202 or second inlet port 1204 through the first inlet channel 1210 or the second inlet channel 1212 to the output port 1208.

Figure 14B:
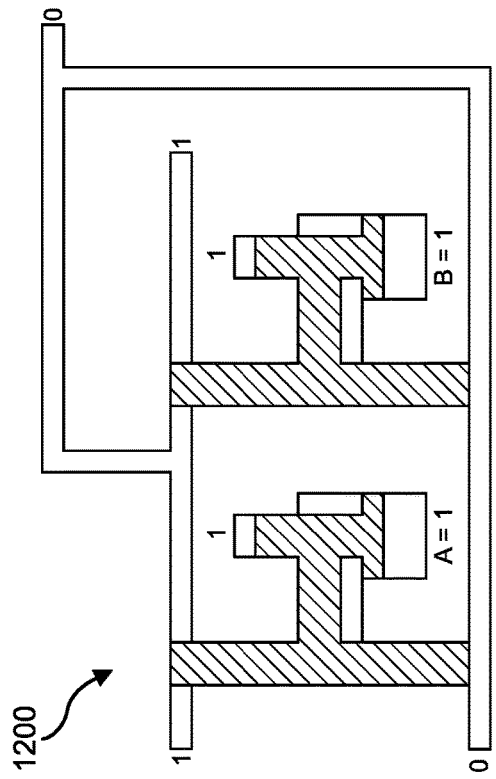

As shown in FIG. 14B, if input fluid 1306 has a low pressure (e.g., a pressure lower than that of a preload pressure 1304, a LOGIC 0) and input fluid 1308 has a sufficiently high pressure (e.g., a pressure at least equal to preload pressure 1304, a LOGIC 1), then pistons 416A-416B may be in the positions shown and high pressure 1300 may be conveyed from the first inlet port 1202 through the first inlet channel 1210 to the output port 1208.

Figure 14C:
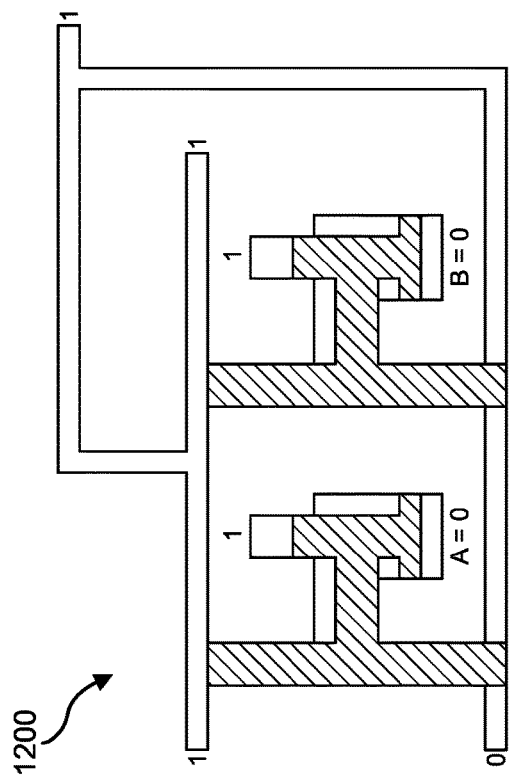

As shown in FIG. 14C, if input fluid 1306 has a sufficiently high pressure (e.g., a pressure at least equal to preload pressure 1304, a LOGIC 1) and input fluid 1308 has a low pressure (e.g., a pressure lower than that of preload pressure 1304, a LOGIC 0), then pistons 416A-416B may be in the positions shown and high pressure 1300 may be conveyed from the second inlet port 1204 through the second inlet channel 1212 to the output port 1208.

Figure 14D:
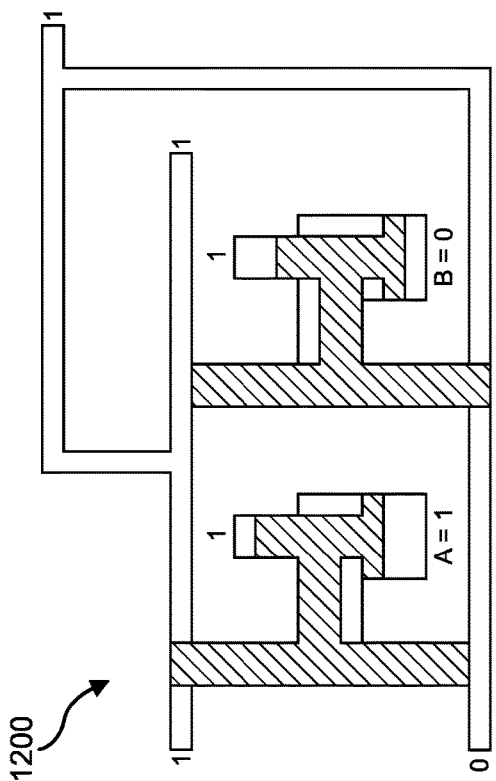

As shown in FIG. 14D, if input fluid 1306 and input fluid 1308 both have a sufficiently high pressure (e.g., a pressure at least equal to preload pressure 1304, a LOGIC 1), then pistons 416A-416B may be in the positions shown and low pressure 1302 may be conveyed from the third inlet port 1206 through the third inlet channel 1214 to the output port 1208. FIG. 15 illustrates a NAND truth table 1500 that may represent the functionality of fluidic logic gate 1200 when configured as shown in FIG. 13.

Figure 16:
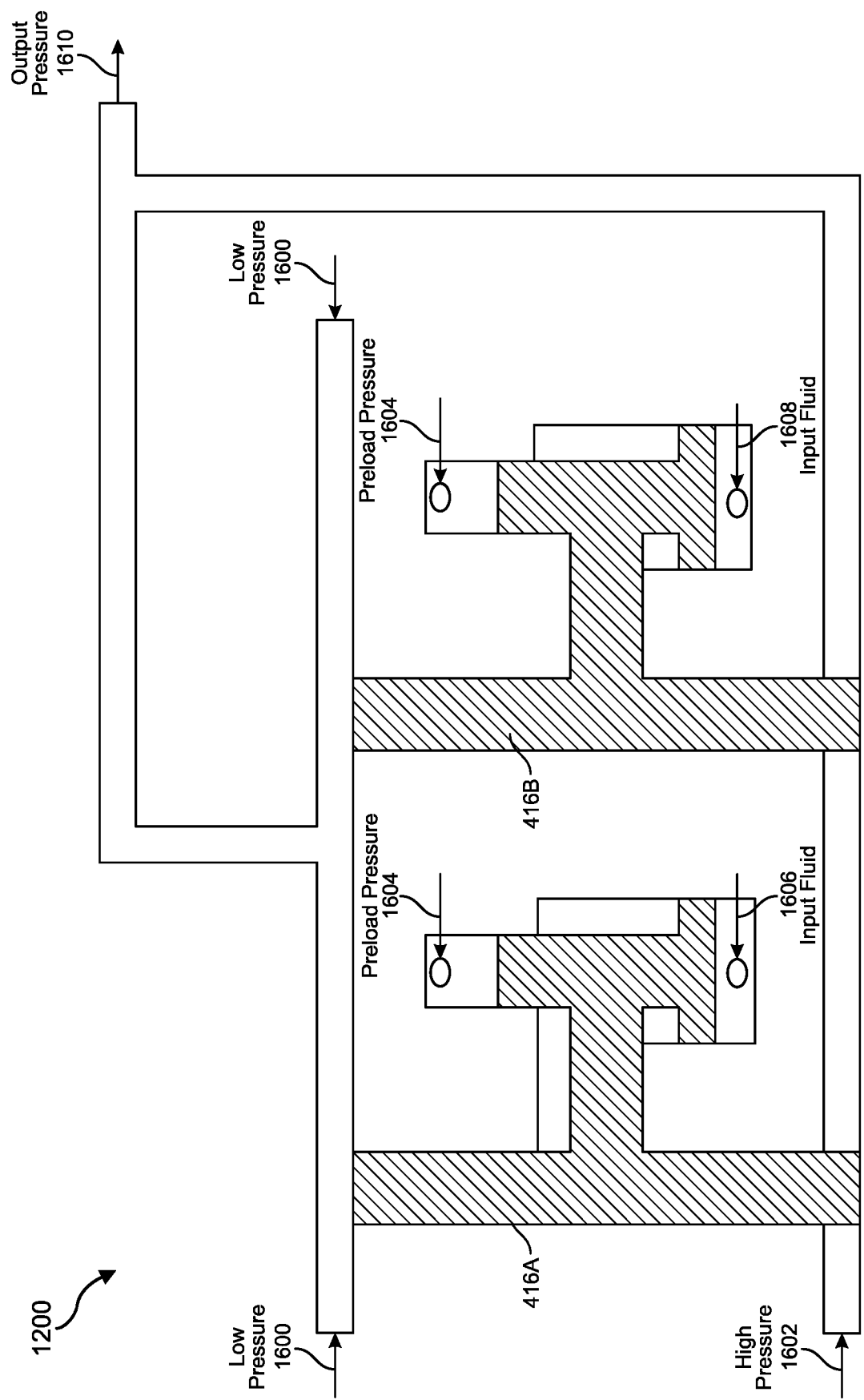
FIG. 16 is a schematic diagram of the example fluidic logic gate of FIG. 12 configured to perform an AND operation, according to at least one embodiment of the present disclosure.

As shown in FIG. 16, in some examples, fluidic logic gate 1200 may be configured to perform an AND operation by applying (1) a low pressure 1600 to the first inlet port 1202 and to the second inlet port 1204, (2) a high pressure 1602 to the third inlet port 1206, (3) a first control pressure and a third control pressure, which are preload pressures 1604 (e.g., high pressure 1602) respectively to control input ports 406A-406B, (4) an input fluid 1606 (e.g., an input A) with a third control pressure to the third control input port 408A, and (5) an input fluid 1608 (e.g., an input B) with a fourth control pressure to the fourth control input port 408B. In this example, a result of the AND operation may be seen as the output pressure 1610 at the output port 1208.

Figure 17A:
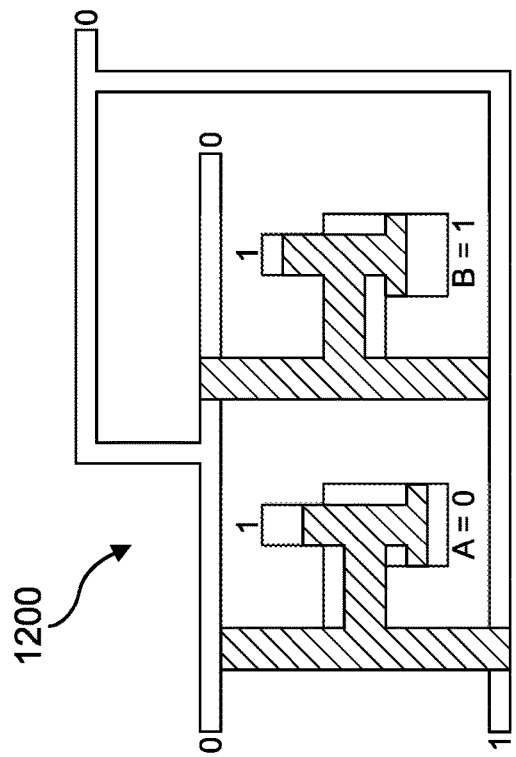
FIGS. 17A-17D are state diagrams of the example fluidic logic gate of FIG. 16, according to at least one embodiment of the present disclosure.

As shown in FIG. 17A, if the second control pressure of the input fluid 1606 and a fourth control pressure of the input fluid 1608 both are low pressure (e.g., a pressure lower than that of preload pressure 1604, a LOGIC 0), then pistons 416A-416B may be in the positions shown and low pressure 1600 may be conveyed from the first inlet port 1202 or the second inlet port 1204 through the first inlet channel 1210 or the second inlet channel 1212 to the output port 1208.

Figure 17B:
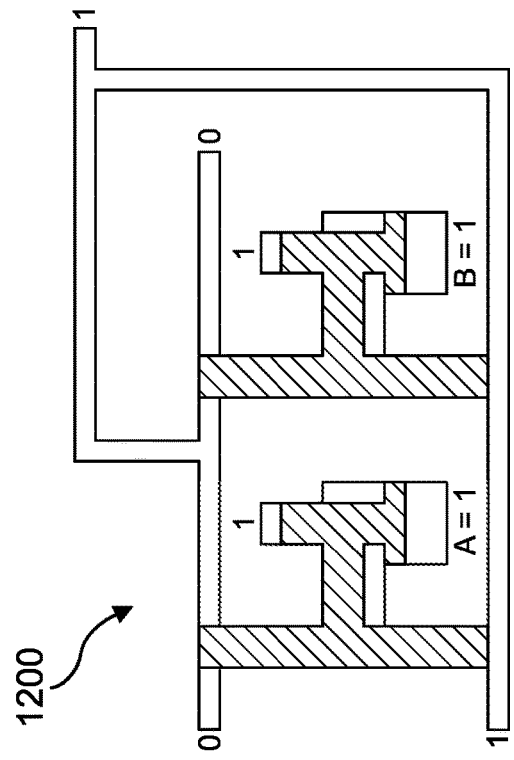

As shown in FIG. 17B, if the second control pressure of the input fluid 1606 has a low pressure (e.g., a pressure lower than that of the first control pressure which is a preload pressure 1604, a LOGIC 0) and a fourth control pressure of the input fluid 1608 is sufficiently high (e.g., a pressure at least equal to preload pressure 1604, a LOGIC 1), then pistons 416A-416B may be in the positions shown and low pressure 1600 may be conveyed from the first inlet port 1202 through the first inlet channel 1210 to the output port 1208.

Figure 17C:
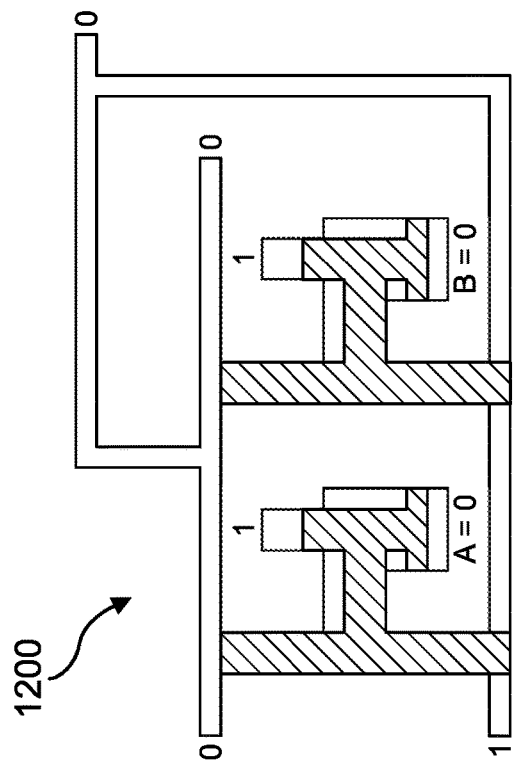

As shown in FIG. 17C, if the second control pressure of the input fluid 1606 is sufficiently high (e.g., a pressure at least equal to preload pressure 1604, a LOGIC 1) and the fourth control pressure of the input fluid 1608 is sufficiently low (e.g., a pressure lower than that of preload pressure 1604, a LOGIC 0), then pistons 416A-416B may be in the positions shown and the low pressure 1600 may be conveyed from the second inlet port 1204 through the second inlet channel 1212 to the output port 1208.

Figure 17D:
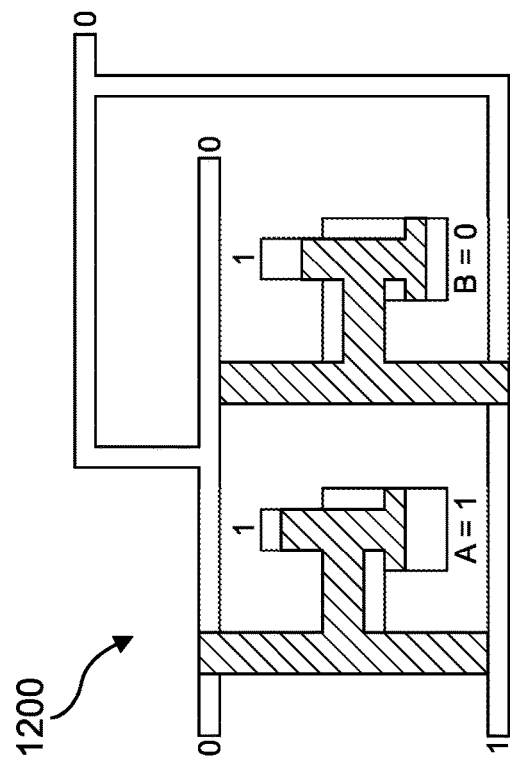

As shown in FIG. 17D, if the second control pressure of the input fluid 1606 and the fourth control pressure of the input fluid 1608 both are sufficiently high (e.g., a pressure at least equal to preload pressure 1604, a LOGIC 0), then pistons 416A-416B may be in the positions shown and high pressure 1602 may be conveyed from the third inlet port 1206 through the third inlet channel 1214 to the output port 1208. FIG. 18 illustrates an AND truth table 1800 that may represent the functionality of fluidic logic gate 1200 when configured as shown in FIG. 16.

Figure 19:
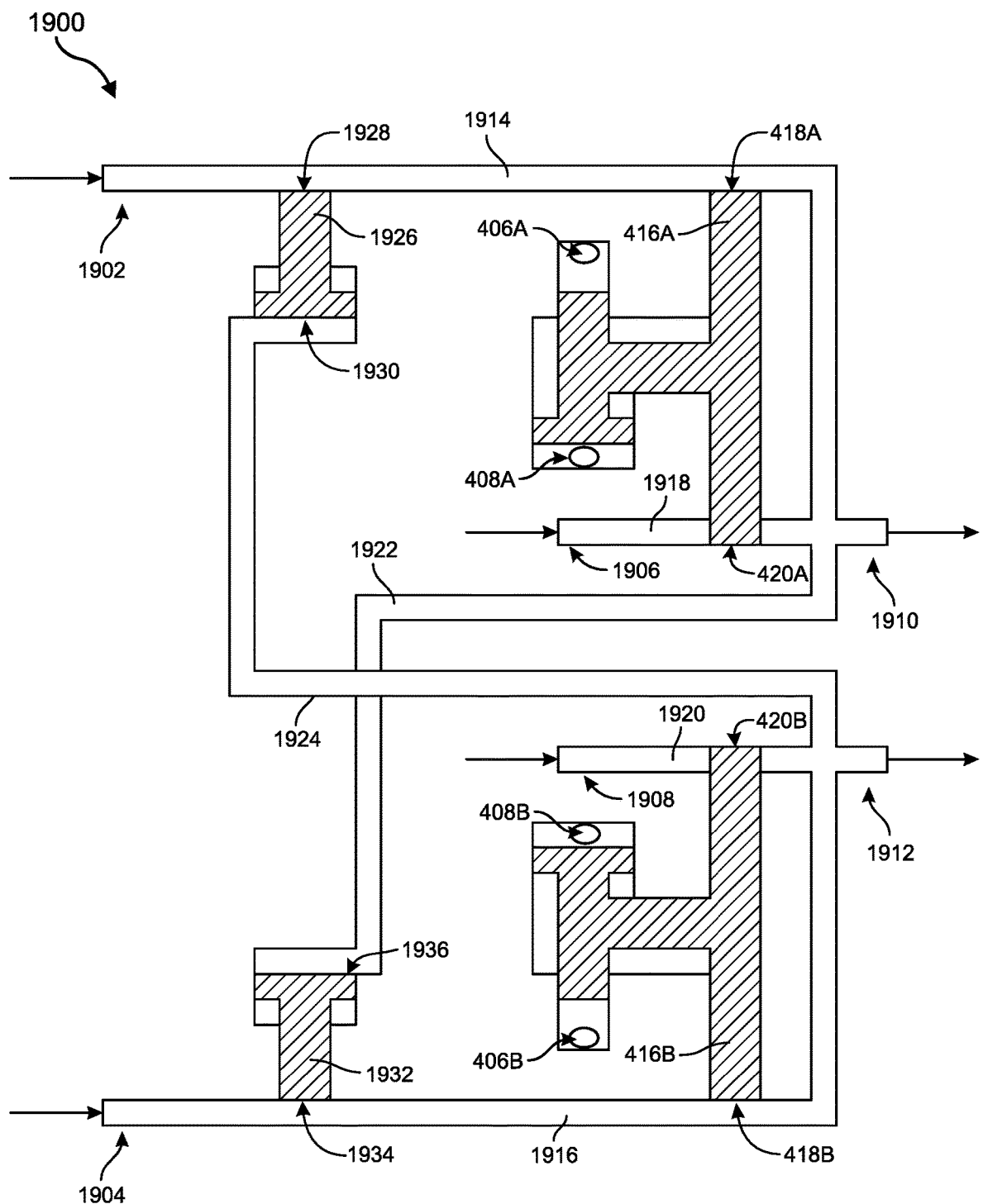
FIG. 19 is a schematic diagram of an example fluidic latch, according to at least one embodiment of the present disclosure.

FIG. 19 illustrates a fluidic latch 1900 that may be configured to hold a given state and/or store information. In some examples, a fluidic latch may be a set-reset latch.

As shown, the fluidic latch 1900 may include a first and a second piston 416A-416B and a first normally open valve 1926 and a second normally open valve 1932 (e.g., valves that are open when a control pressure (e.g., into control input ports 408A-408B) is low and closed when the control pressure is high). Fluidic latch 1900 may include a first inlet port 1902, a second inlet port 1904, a third inlet port 1906, a fourth inlet port 1908, a first output port 1910, and a second output port 1912. Fluidic latch 1900 may also include a first inlet channel 1914 configured to convey fluid from the first inlet port 1902 to the first output port 1910, a second inlet channel 1916 configured to convey fluid from the second inlet port 1904 to the second output port 1912, a third inlet channel 1918 configured to convey fluid from the third inlet port 1906 to the first output port 1910, a fourth inlet channel 1920 configured to convey fluid from the fourth inlet port 1908 to the second output port 1912, a fifth inlet channel 1922 configured to convey fluid from the first output port 1910 to the second normally open valve 1932, and a sixth inlet channel 1924 configured to convey fluid from the second output port 1912 to the first normally open valve 1926.

In some examples, the first normally open valve 1926 and the second normally open valve 1932 and the first piston 416A and the second piston 416B may be part of a single fluidic device within which first, second, third, fourth, fifth, and sixth inlet channels 1914-1924 are integrated. Alternatively, the first and the second normally open valves 1926 and 1932 and the first and the second pistons 416A-416B may be part of one or more separate fluidic devices, and portions of inlet channels 1914, 1916, 1918, 1920, 1922, 1924 may be external fluid connections between the separate fluidic devices.

As shown in FIG. 19, the first piston 416A may include a first restricting gate transmission element 418A configured to uninhibit fluid flow through first inlet channel 1914 when the first piston 416A is in the position illustrated in FIG. 19 and inhibit fluid flow through the first inlet channel 1914 when a sufficient second control pressure is applied to the second control input port 408A to overcome the first control pressure applied as a preload pressure to the first control input port 406A which may tend to force piston 416A upwards (in the perspective of FIG. 19).

Similarly, the second piston 416B may include a third restricting gate transmission element 418B configured to uninhibit fluid flow through the second inlet channel 1916 when the second piston 416B is in the position illustrated in FIG. 19 and inhibit fluid flow through the second inlet channel 1916 when a sufficient fourth control pressure is applied to fourth control input port 408B to overcome the third control pressure applied as a preload pressure to the third control input port 406B which may tend to force the second piston 416B downward (in the perspective of FIG. 19).

The first piston 416A may also include a second restricting gate transmission element 420A configured to inhibit fluid flow through third inlet channel 1918 when the first piston 416A is in the position illustrated in FIG. 19 and uninhibit fluid flow through third inlet channel 1918 when a sufficient second control pressure is applied to the second control input port 408A to overcome the first control pressure applied as a preload pressure to the first control input port 406A which may tend to force piston 416A upwards (in the perspective of FIG. 19).

Similarly, the second piston 416B may include a fourth restricting gate transmission element 420B configured to inhibit fluid flow through fourth inlet channel 1920 when the second piston 416B is in the position illustrated in FIG. 19 and uninhibit fluid flow through the fourth inlet channel 1920 when sufficient fourth control pressure is applied to the fourth control input port 408B to overcome any third control pressure applied as a preload pressure to the third control input port 406B which may tend to force the second piston 416B downward (in the perspective of FIG. 19).

The first normally open valve 1926 may include a fifth restricting gate transmission element 1928 configured to uninhibit fluid flow through first inlet channel 1914 when the first normally open valve 1926 is in the position illustrated in FIG. 19 and inhibit fluid flow through the first inlet channel 1914 when a sufficient fifth control pressure is applied to a first control gate 1930 to overcome any opposing forces which may tend to force the first normally open valve 1926 upwards (in the perspective of FIG. 19).

Similarly, the second normally open valve 1932 may include a sixth restricting gate transmission element 1934 configured to uninhibit fluid flow through second inlet channel 1916 when first normally open valve 1926 is in the position illustrated in FIG. 19 and inhibit fluid flow through second inlet channel 1916 when a sufficient sixth control pressure is applied to a second control gate 1936 to overcome any opposing forces which may tend to force the second normally open valve 1932 downward (in the perspective of FIG. 19).

In some embodiments, a latch may have multiple inputs and multiple outputs, and each of the inputs may have multiple values. A truth table is a representation of the list of possible combinations of inputs that lead to specific outputs. Each combination and the concomitant outputs may be referred to as a state of the latch. Typically, a latch may have two states, one of which may be called "set," and the other state "reset." A set state may have a first input as 1, while a second input may be 0. A reset state may have the opposing arrangement, namely, that the first input may have a value of 0, and the second input a value of 1. The two outputs, a first and a second output, are supposed to have opposite values. For example, if the first output value is 1, then the second output value will be 0. On the other hand, if the first output value is 0, then then second output value will be 1. Setting both input values to 0 may result in a "hold" state in which the outputs do not change their values from the previous set or reset action. If both inputs are set to 1, then a special condition is reached, which is called "forbidden."

Figure 20:
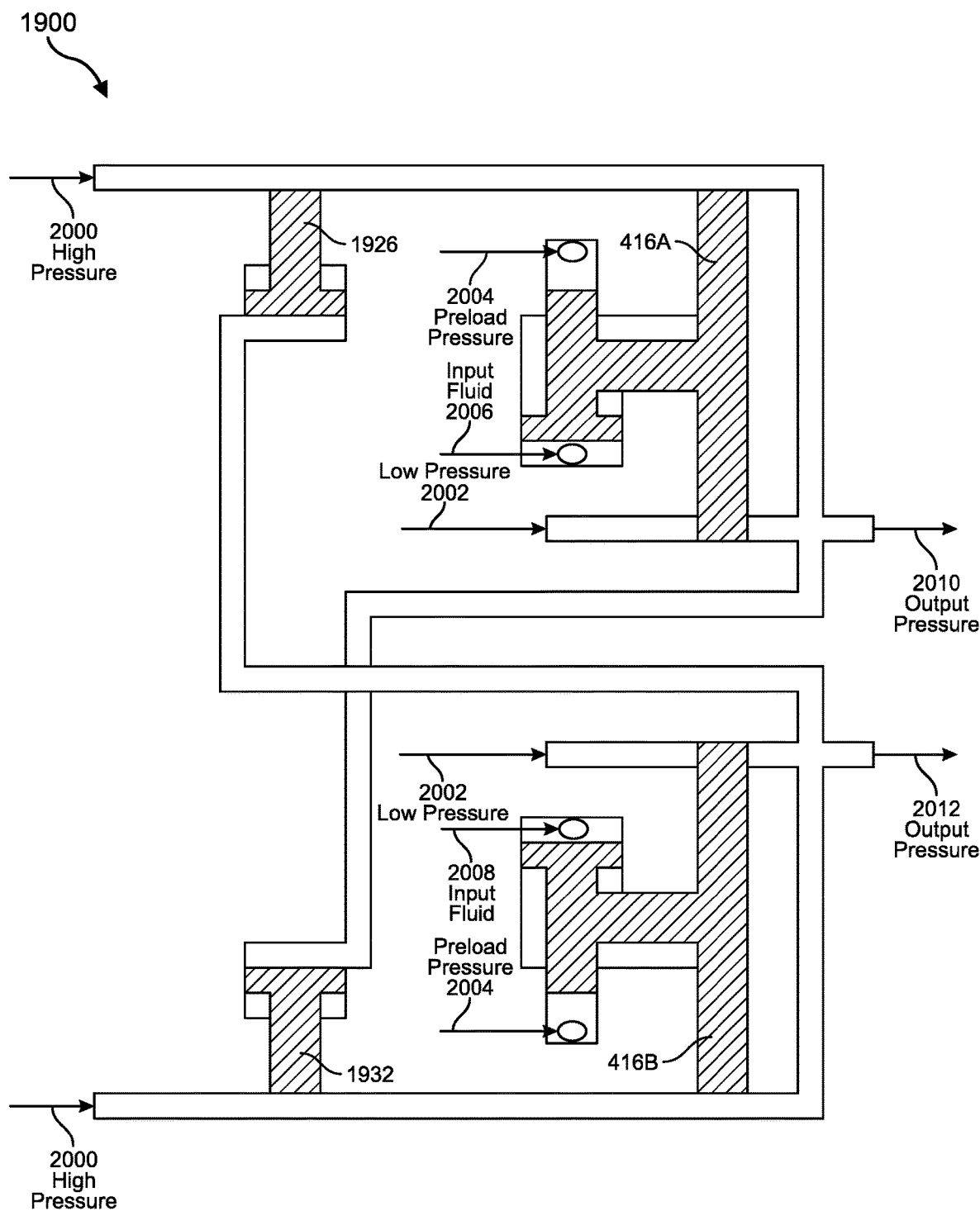
FIG. 20 is another schematic diagram of the example fluidic latch of FIG. 19, according to at least one embodiment of the present disclosure.

As shown in FIG. 20, in some examples, fluidic latch 1900 may be configured to act as a fluidic set-reset latch by applying (1) a high pressure 2000 to the first and second inlet ports 1902 and 1904, (2) a low pressure 2002 to the third and fourth inlet ports 1906 and 1908, (3) preload pressures 2004 (e.g., high pressure 2000) as the first and third control pressures applied to the first and third control input ports 406A-406B, (4) a first input fluid 2006 (e.g., an input signal A, which may act as a reset-command input) to the second control input port 408A, and (5) a second input fluid 2008 (e.g., an input signal B, which may act as a set-command input) to the fourth control input port 408B. In this example, a stored state of fluidic latch 1900 may be seen as the first output pressure 2010 and/or the second output pressure 2012. FIGS. 21-26 illustrate various possible states and state transitions of fluidic latch 1900.

Figure 21:
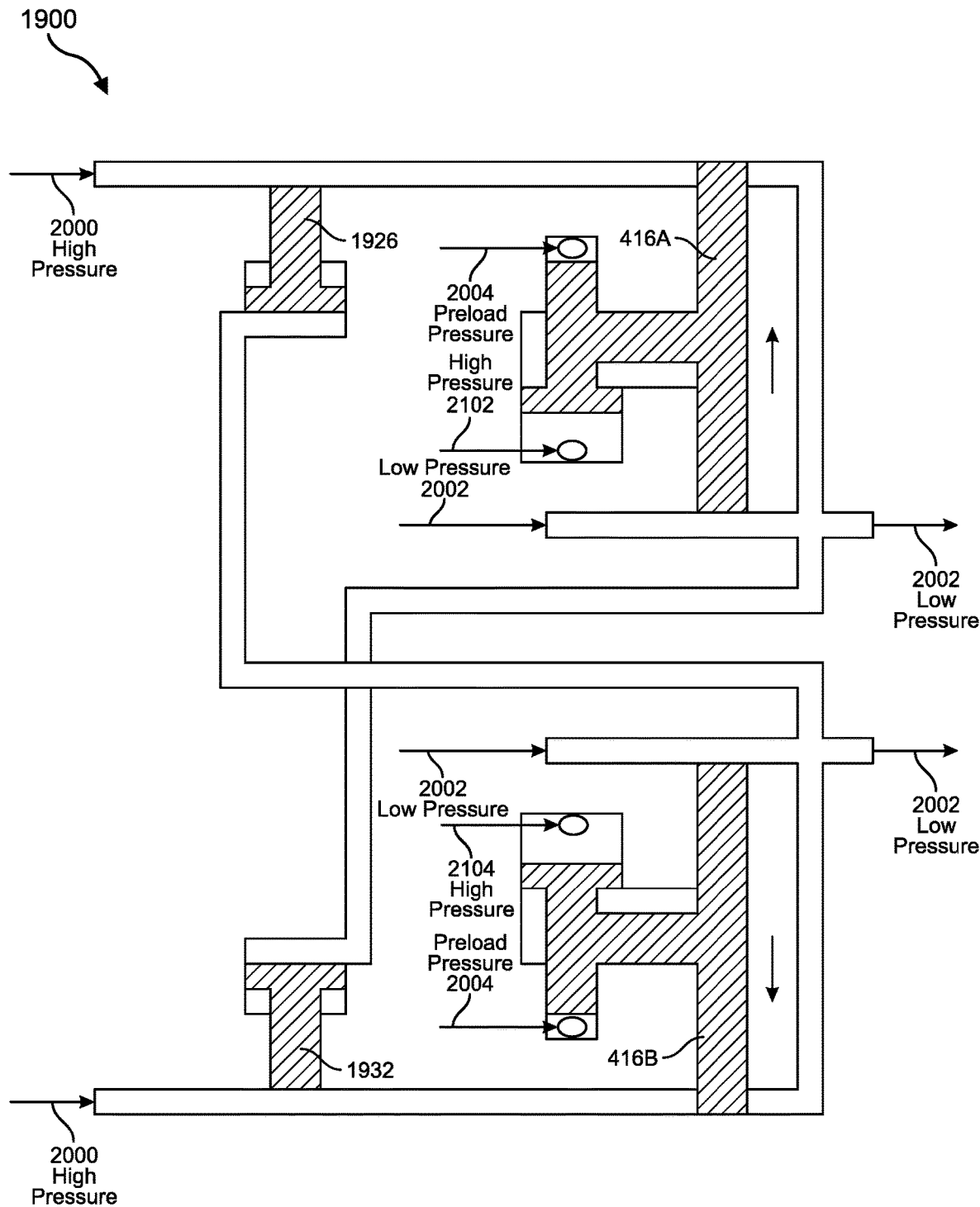
FIG. 21 is another schematic diagram of the example fluidic latch of FIG. 19, according to at least one embodiment of the present disclosure.

As shown in FIG. 21, if the first input fluid 2006 and the second input fluid 2008 respectively have sufficiently high pressure 2102 and high pressure 2104 (e.g., a pressure at least equal to preload pressure 2004, a LOGIC 1), then the first and second pistons 416A-416B may be in the positions shown. In this state, a first restricting gate transmission element 418A of piston 416A may inhibit fluid flow through the first inlet channel 1914, and third restricting gate transmission element 418B of the second piston 416B may inhibit fluid flow through the second inlet channel 1916. As shown, low pressure 2002 may be conveyed from the third inlet port 1906 through third inlet channel 1918 to the first output port 1910 and from the first output port 1910 through fifth inlet channel 1922 to the second normally open valve 1932, which may remain open as a result. Low pressure 2002 may also be conveyed from fourth inlet port 1908 through fourth inlet channel 1920 to the second output port 1912 and from the second output port 1912 through inlet channel 1924 to the first normally open valve 1926, which may remain open as a result.

The state illustrated in FIG. 21 may represent a forbidden state of fluidic latch 1900. A forbidden or invalid state, which is not a specific logic level as the invalid state is non-deterministic, may exist where the first input fluid 2006 and the second input fluid 2008 are both LOGIC 1. This may allow the two outputs 1910 and 1912 to have the same value, which may cause undesirable effects in the downstream logic driven by the latch outputs. By operation, the two outputs of a latch may not have the same value. Also, if the first and second inputs 2006 and 2008 transition directly from the forbidden state to a hold-state (both first and second inputs 2006 and 2008 are LOGIC 0), then the values of the first and second outputs 1910 and 1912 may be unknown.

Figure 22:
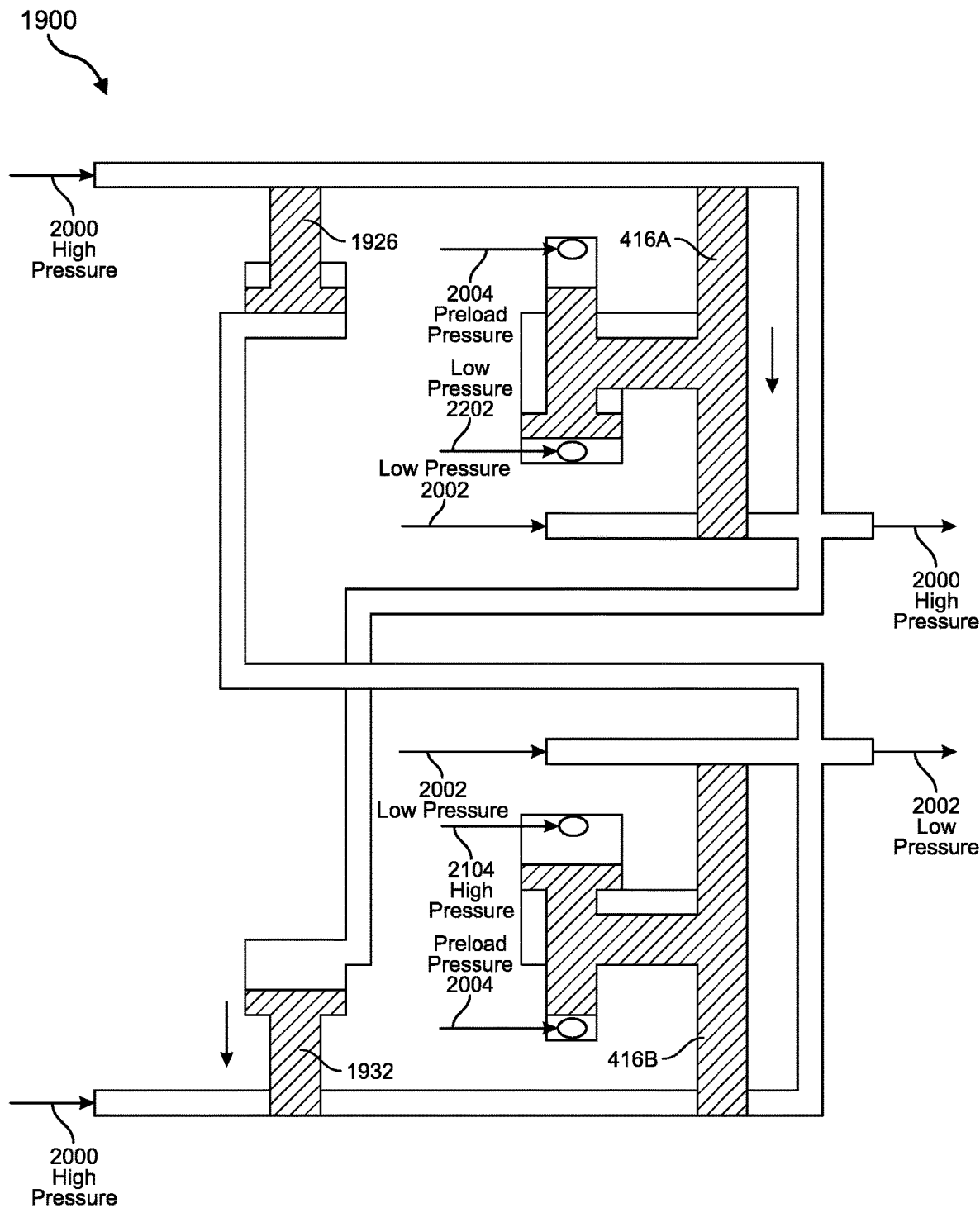
FIG. 22 is another schematic diagram of the example fluidic latch of FIG. 19, according to at least one embodiment of the present disclosure.

As shown in FIG. 22, if the first input fluid 2006 transitions from high pressure 2102 to low pressure 2202 and the second input fluid 2008 maintains high pressure 2104 or the first input fluid 2006 is at low pressure 2202 and the second input fluid 2008 is at high pressure 2104, then the first and second pistons 416A-416B may be in the positions shown. In this state, the first restricting gate transmission element 418A of the first piston 416A may uninhibit fluid flow through the first inlet channel 1914, and the third restricting gate transmission element 418B of the second piston 416B may still inhibit fluid flow through the second inlet channel 1916. As a result, high pressure 2000 may be conveyed from the first inlet port 1902 through the first inlet channel 1914 to the first output port 1910 and from the first output port 1910 through the fifth inlet channel 1922 to the second normally open valve 1932, which may close as a result and inhibit fluid flow through the second inlet channel 1916. Low pressure 2002 may still be conveyed from the fourth inlet port 1908 through the fourth inlet channel 1920 to the second output port 1912 and from the second output port 1912 through the sixth inlet channel 1924 to the first normally open valve 1926, which may remain open as a result. In some embodiments, the state illustrated in FIG. 22 may represent a set-state of the fluidic latch 1900.

Figure 23:
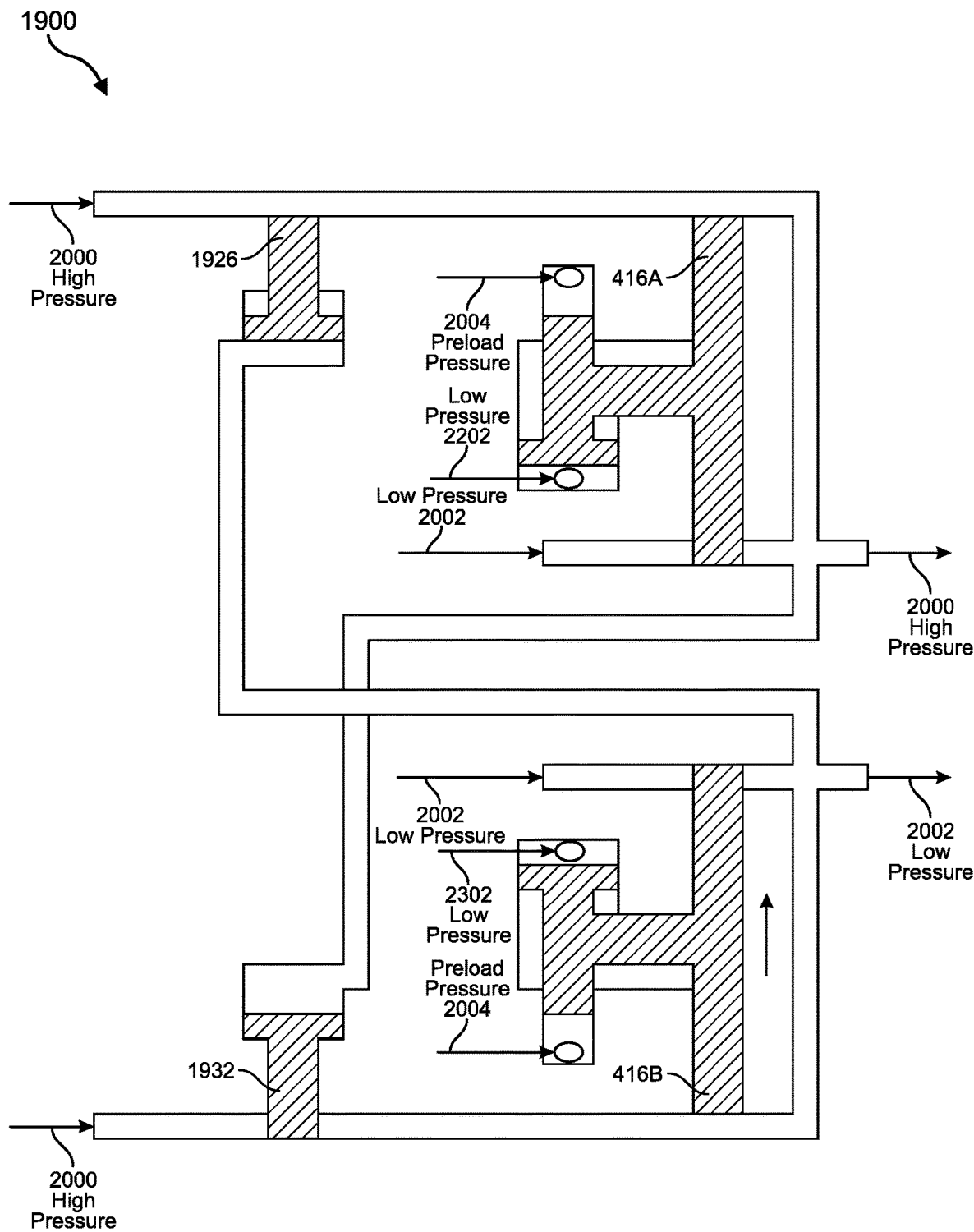
FIG. 23 is another schematic diagram of the example fluidic latch of FIG. 19, according to at least one embodiment of the present disclosure.

As shown in FIG. 23, if the second input fluid 2008 transitions from high pressure 2104 to low pressure 2302 and the first input fluid 2006 maintains low pressure 2202, then the first and second pistons 416A-416B may transition to the positions shown. In this state, the third restricting gate transmission element 418B of the second piston 416B may uninhibit fluid flow through the second inlet channel 1916, and the first restricting gate transmission element 418A of the first piston 416A may still uninhibit fluid flow through the first inlet channel 1914. As a result, high pressure 2000 may be still be conveyed from the first inlet port 1902 through the first inlet channel 1914 to the first output port 1910 and from the first output port 1910 through the fifth inlet channel 1922 to the second normally open valve 1932, which may remain closed as a result and continue to inhibit fluid flow through the second inlet channel 1916. While the fourth restricting gate transmission element 420B may inhibit fluid flow through the fourth inlet channel 1920, low pressure 2002 may still be conveyed from the second output port 1912 through the sixth inlet channel 1924 to the first normally open valve 1926, which may remain open as a result. In some embodiments, the state illustrated in FIG. 23 may represent a hold-state of fluidic latch 1900.

Figure 24:
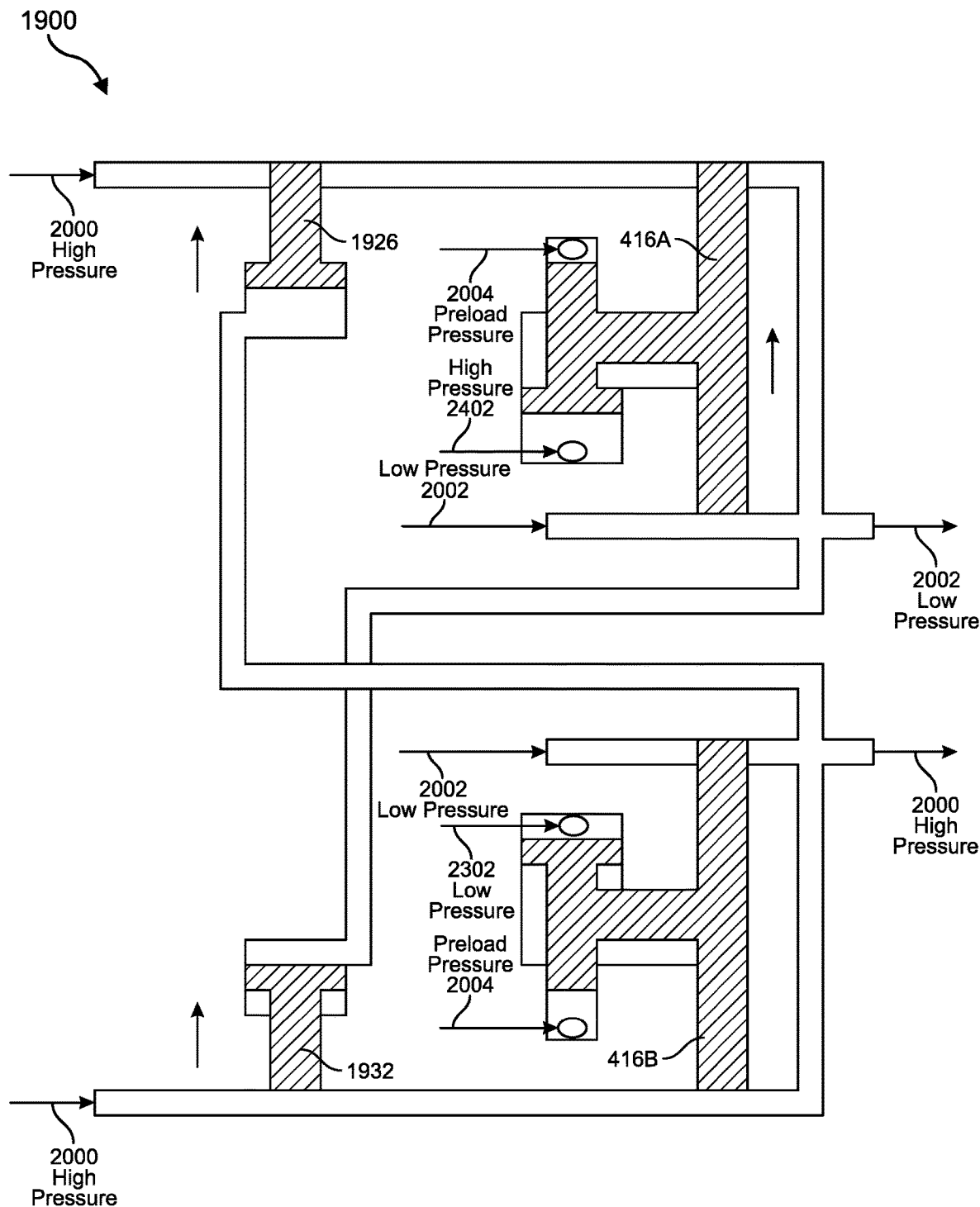
FIG. 24 is another schematic diagram of the example fluidic latch of FIG. 19, according to at least one embodiment of the present disclosure.

As shown in FIG. 24, if the first input fluid 2006 transitions from low pressure 2202 to high pressure 2402 and the second input fluid 2008 maintains low pressure 2302, then the first and second pistons 416A-416B may transition to the positions shown. In this state, the second restricting gate transmission element 420A of the first piston 416A may uninhibit fluid flow through the third inlet channel 1918. As a result, low pressure 2002 may be conveyed from third inlet port 1906 through the third inlet channel 1918 to the first output port 1910 and from the first output port 1910 through the fifth inlet channel 1922 to the second normally open valve 1932, which may open as a result. Since the third restricting gate transmission element 418B of the second piston 416B does not inhibit fluid flow through inlet channel 1916, high pressure 2000 may be conveyed from second inlet port 1904 to the second output port 1912 through the second inlet channel 1916 and from the second output port 1912 to the first normally open valve 1926 through the sixth inlet channel 1924, which may close as a result. In some embodiments, the state illustrated in FIG. 24 may represent a reset-state of fluidic latch 1900.

Figure 25:
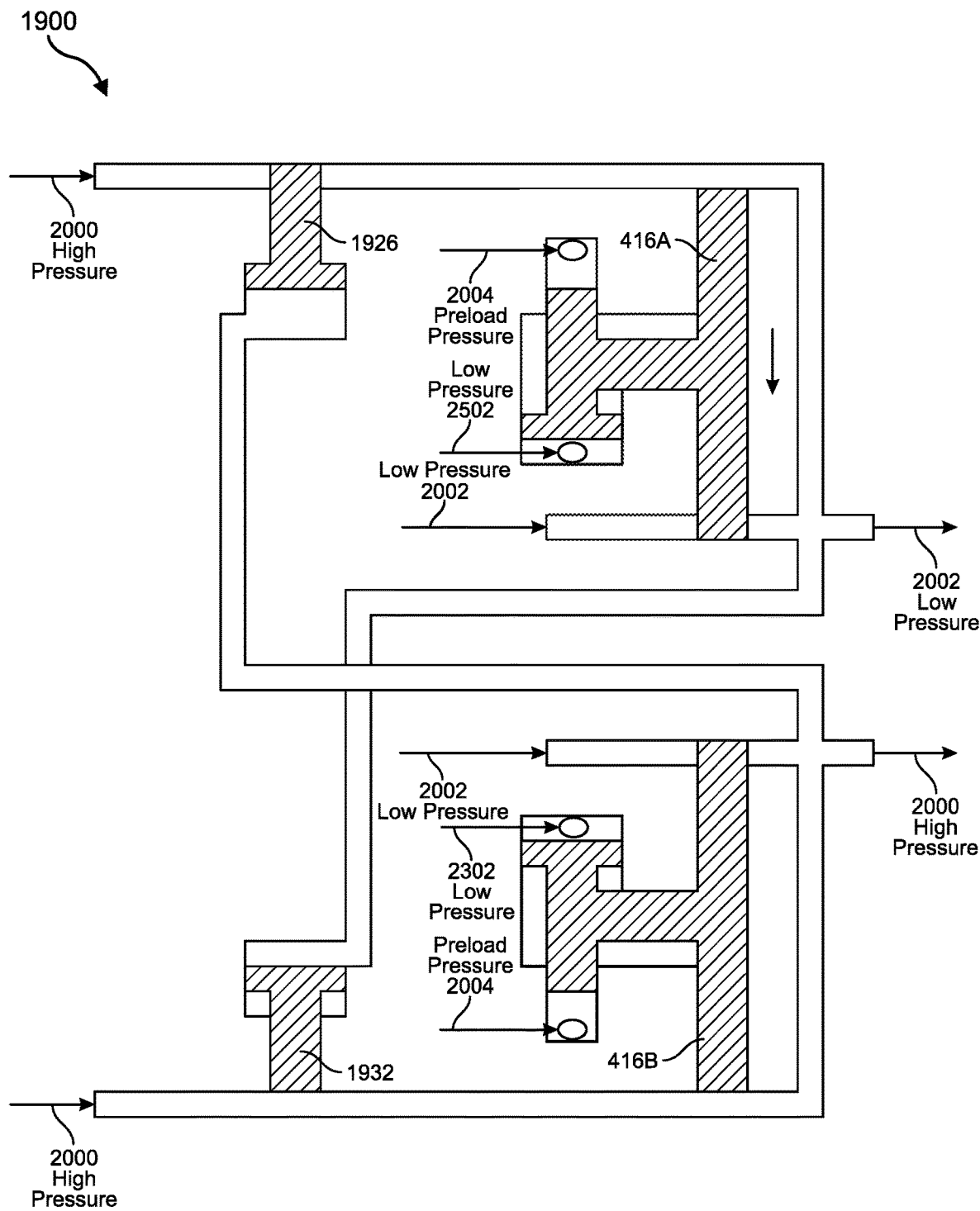
FIG. 25 is another schematic diagram of the example fluidic latch of FIG. 19, according to at least one embodiment of the present disclosure.

As shown in FIG. 25, if the first input fluid 2006 transitions from high pressure 2402 to low pressure 2502 and the second input fluid 2008 maintains low pressure 2302, then the first and second pistons 416A-416B may transition to the positions shown. In this state, first restricting gate transmission element 418A of first piston 416A may uninhibit fluid flow through the first inlet channel 1914, and the third restricting gate transmission element 418B of the second piston 416B may still uninhibit fluid flow through the second inlet channel 1916. As a result, high pressure 2000 may be still be conveyed from the second inlet port 1904 through the second inlet channel 1916 to the second output port 1912 and from the second output port 1912 through the sixth inlet channel 1924 to the first normally open valve 1926, which may remain closed as a result and thus inhibiting fluid flow through the first inlet channel 1914. While the second restricting gate transmission element 420A may inhibit fluid flow through the third inlet channel 1918, low pressure 2002 may still be conveyed from the first output port 1910 through the fifth inlet channel 1922 to the second normally open valve 1932, which may remain open as a result. In some embodiments, the state illustrated in FIG. 25 may represent a hold-state of the fluidic latch 1900. FIG. 26 illustrates a latch truth table 2600 that may represent the functionality of the fluidic latch 1900 when configured as shown in FIG. 20.

In another embodiment, an example complementary fluidic logic device 2700 may be configured as shown in FIGS. 27A-27C. In FIG. 27A, the fluidic device 2700 may have at least two input ports, namely a first inlet 2702 and a second inlet 2704, which, respectively, may be in fluidic communication with a first inlet 2712 and a second inlet 2714. The piston 2716 of the device 2700 may include complementary (e.g., opposing) piston heads 2722 and 2724. Piston head 2722 may have a first control gate 2726 configured to interface with a first control pressure 2728 from control input port 2706 that, when applied to first control gate 2726 may tend to force piston 2716 towards the position illustrated in FIG. 27B. Similarly, piston head 2724 may have a second control gate 2730 configured to interface with a second control pressure 2732 from control input port 2708 that, when applied to second control gate 2730 may tend to force piston 2716 towards the position illustrated in FIG. 27C.

Piston 2716 may include a restricting gate transmission element 2718 configured to inhibit fluid flow through first inlet 2712 when piston 2716 is in the position illustrated in FIG. 27C and uninhibit fluid flow through first inlet 2712 when piston 2716 is in the position illustrated in FIG. 27B (i.e., in a direction indicated by the arrow 2740). Piston 2716 may also include a restricting gate transmission element 2720 configured to inhibit fluid flow through inlet 2714 when piston 2716 is in the position illustrated in FIG. 27B and uninhibit fluid flow through inlet 2714 when piston 2716 is in the position illustrated in FIG. 27C (i.e., in a direction indicated by the arrow 2745).

FIG. 27A illustrates a neutral piston position which may be an exceptional state where three piston positions may be possible: (1) neutral, as in FIG. 27A, which may allow fluid flow in both the first and second inlets 2712 and 2714 to reach the output port/channel 2710; (2) inhibiting flow in only the second inlet 2714, as in FIG. 27B, which may simultaneously allow fluid flow only in the first inlet 2712 of the device 2700 to reach the output port/channel 2710 and (3) inhibiting flow in only the first inlet 2712, as in FIG. 27C, which may simultaneously allow fluid flow only in the second inlet 2714 of the device 2700 to reach the output port/channel 2710. In normal operation of the fluidic device 2700, the expectation may be, e.g., when fluid flow in a particular channel is inhibited, fluid flow through another channel is uninhibited may be allowed to reach the output port/channel 2710.

In these views of FIGS. 27A-27C, the configuration is such that the first control gate 2726 has a first surface area and the second control gate 2730 has a second surface area. These surface areas may be the same as each other or may be different from each other depending on the desired configuration and/or operation of the device 2700. The first surface area may be smaller than the second surface area as is shown in FIGS. 27A-27C. In this embodiment, the fluidic device may be considered to be "inverted," relative to the device 400 shown in FIGS. 4A-4B. This means that the first (smaller) control gate receives a static (e.g., preload pressure), and the second (larger) control gate controls the movement of the piston by pushing the piston upwards to inhibit fluid flow through the first inlet. This means that when the second control gate is low (due to a low second control pressure), the output may be high, if the first inlet is fluidically connected to a high-pressure source.

The first control gate 2726 of the piston shown in FIGS. 27A-27C may be configured to interface with a first control pressure 2728 in fluidic communication with control input port 2706 that, when applied to the first surface area of the first control gate 2726 may tend to force piston 2716 towards the first position (in a direction indicated by the arrow 2740) as is exemplarily illustrated in FIG. 27B.

Similarly, piston head 2724 may have a second control gate 2730 configured to interface with a second control pressure 2732 from a second control input port 2708 that, when applied to the surface area of the second control gate 2730 forces piston 2716 towards the position illustrated in FIG. 27C, as indicated by the arrow 2745.

As shown in FIGS. 27A-27C, control gates 2726 and 2730 may have different surface areas (e.g., the surface area of second control gate 2730 may be different than the surface area of first control gate 2726). As such, movement of piston 2716 from the position illustrated in FIG. 27B to the position illustrated in FIG. 27C may require a control pressure at control input port 2708 that is less than the control pressure at control input port 2706. In some examples, the relative surface areas of control gates 2726 and 2730 may be configured such that specific pressure differences between the pressures applied to control input ports 2706 and 2708 may trigger movement of piston 2716 between the positions illustrated in FIGS. 27B and 27C. In some examples, restricting gate transmission elements 2718 and 2720 may have substantially the same surface areas, which may be essentially less than the surface areas of control gates 2726 and 2730. As such, movements of piston 2716 may be mostly caused by the fluid control pressures applied to control input ports 2706 and 2708 rather than any fluid pressures applied to inlets 2702 and 2704.

Another example, as depicted in FIGS. 28A-28C, provides a similar arrangement that is shown in FIG. 27A-28C, with the exception that the piston 2816 is in a "buffered" configuration. In this arrangement, a first control gate 2826 has a greater surface area than a second control gate 2830; and, moreover, a second control input port 2808 may receive a second control pressure as a predetermined minimum (e.g., a preload) pressure 2832. Should the preload pressure 2832 be of a sufficient magnitude, the piston 2816 may inhibit fluid flow in the first inlet channel 2812 as a default position. In this arrangement, when the first control pressure 2828 applied onto the first control gate 2826 exceeds the preload pressure 2832 applied onto the second control gate 2830, the piston 2816 will allow fluid flow in the first inlet channel 2812. Alternatively stated, if the first inlet channel 2812 receives a high pressure (LOGIC 1) and the first control gate 2826 receives a LOGIC 1 as, the output channel may also be a LOGIC 1. Alternatively, if the first control pressure 2828 is a LOGIC 0, and the second inlet channel 2814 receives a LOGIC 0, then the output channel may receive a LOGIC 0.

FIG. 28A shows an example of the piston 2816 in a neutral position, which may indicate that a first fluid provided by the first inlet port 2802 into the first inlet channel 2812 and a second fluid provided by the second inlet port 2804 into the second inlet channel 2814 may reach the output port 2810. In some examples described in the present disclosure, a neutral position of a piston may be provided for illustrative purposes. In normal operation, however, the piston may be configured to inhibit flow in one channel while allowing flow in another, and vice versa. The piston being in a first position or a second position may be controlled by the strength of the first control pressure relative to the second control pressure, which is discussed herein in relation to specific examples and/or embodiments.

A "gate high" position (e.g., a LOGIC 0), depicted in FIG. 28B, may result in the piston 2816 being moved in a lower direction (as indicated by the arrow 2840) relative to the second position which may be caused by the first control pressure 2828 impinging on the first surface area of the first control gate 2826 entering the first control input port 2806 exceeding the second control pressure 2832 entering the second control input port 2808 onto the second surface area of the second control gate 2830.

In some examples, the second control pressure 2832 may be a combination of a preload pressure, which may be normally present, and an additional pressure. In such a case, the preload pressure and the additional pressure may each originate from different sources and may be allowed, cumulatively, to impinge on the second surface area of the second control gate 2830. The preload pressure may be produced mechanically (e.g., a spring), electromechanically (e.g., a piezoelectric actuator), fluidically (e.g., gas and/or liquid), or by any other suitable mechanism or arrangement. In some non-limiting examples, the preload pressure provided to the control input port 2808 may be provided by fluids of differing composition.

FIG. 28C depicts the buffered device 2800 in a state when the gate is low (e.g., a LOGIC 0). In this arrangement, the relative pressures of the first control pressure and second control pressure may allow for the piston 2816 to be moved in an upwards direction (as indicated by the arrow 2845) so that the piston 2816 may inhibit fluid flow in the first inlet channel 2812. This may allow fluid flow from the second inlet 2802 to travel through the second inlet channel 2814 to the output port/channel 2810.

Figure 29A:
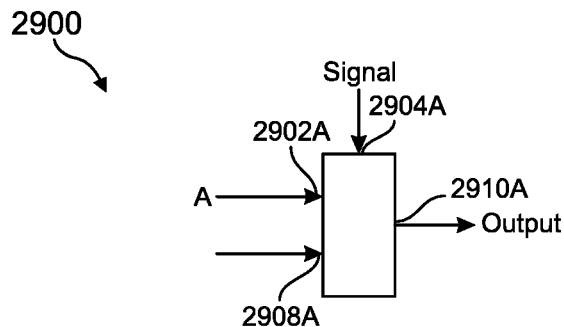
FIG. 29A is an outline of at least some of the functional parts of a switch, in accordance with at least one embodiment of the present disclosure.

In another example, inputs to a fluidic device may be selected by an input signal, which may allow selected fluid inputs to be connected to an output. FIG. 29A presents a schematic diagram of an example selection device 2900 (e.g., a gate, a switch, etc.) that may include two inputs pressures: a first fluid input pressure 2902A and a second fluid input pressure 2908A, a signal 2904A, and an output 2910A. Depending on the strength of the signal 2904A, either the first fluid input pressure 2902A or the second fluid input pressure 2908A may be selected to reach the output 2910A.

Figure 29B:
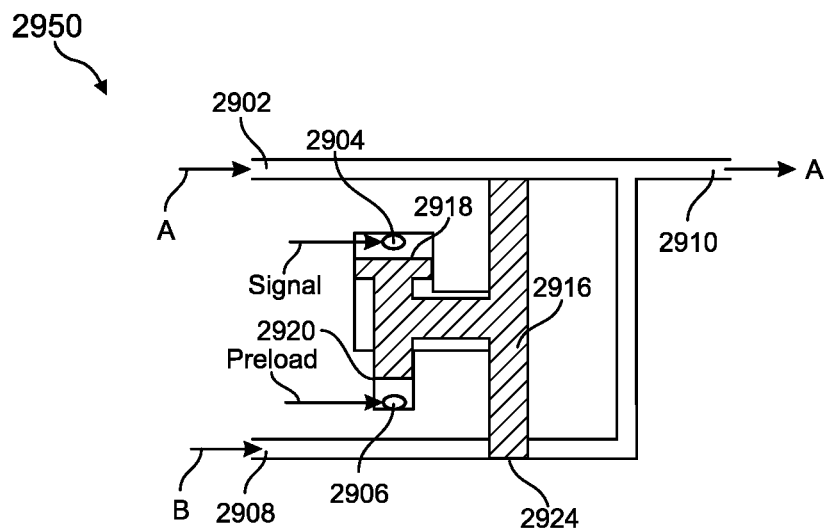
FIGS. 29B-29C are schematic diagrams of an example fluidic device in various respective states, according to at least one embodiment of the present disclosure.
Figure 29C:
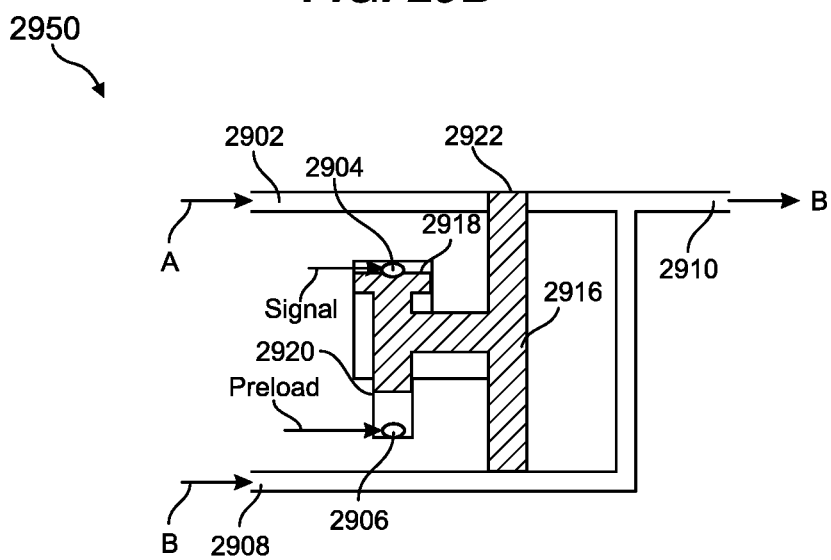

FIGS. 29B-29C illustrate an example of a complementary fluidistor (cFET) 2950 in which there may be two inputs: a first fluid A of a first pressure conveyed into a first inlet 2902 and a second fluid B of a second pressure conveyed into a second inlet 2908. A piston 2916 of this fluidistor 2950 may be operable to two positions: a first position (as shown in FIG. 29B) to inhibit the fluid flow in the lower (in the perspective of FIG. 29B) or second inlet 2908 from being in fluidic communication with an output 2910 by applying a sufficient first control pressure to a first control input port 2904 to force the piston 2916 to inhibit fluid flow through the second inlet 2908 by a second restricting gate transmission element 2924; and a second position (as shown in FIG. 29C), by which fluid flow through the first inlet 2902 is inhibited by the piston 2916 being in the second position caused by a preload pressure entering a second control input port 2906 engaging a first restricting gate transmission element 2922 to inhibit fluid flow in the first inlet 2902. Thus, as depicted in FIG. 29B, a selection of pressure A (at the first inlet 2902) to reach the output 2910 may be possible when the signal pressure entering first control input port 2904 is below a given threshold or is low. The alternative, shown in FIG. 29C, is that a selection of pressure B (second inlet 2908) to reach the output 2910 may be possible when the signal pressure entering the first control input port 2904 is at least the preload pressure applied to the second control input port 2906.

FIGS. 30A-30B present alternative examples of a fluidic device 3000 which may be similar in construction to the fluidic device presented in FIGS. 29B-29C. In FIG. 30A, a first input signal A may enter a first inlet 3002 of the fluidic device 3000, while a second input signal B may be fluidically directed to the first control input port 3004. A second control input port 3006 may be preloaded with a minimum force or pressure. A second inlet 3008 may be in fluidic communication with a reference pressure source, such as a low-pressure source representing a LOGIC 0. In other words, if a signal is "low" then this "low" signal may be represented by a LOGIC 0 and if the signal is "high" then this "high" signal may be referred to as LOGIC 1.

In another state, as illustrated in FIG. 30B, the first input signal A and the second input signal B may have interchanged their entry ports within the fluidic device, such that the first input signal A enters the first control input port 3004 and the second input signal B enters the first inlet 3002. The reference low pressure (LOGIC 0) is still present in the second inlet 3008. In the illustrations shown in FIGS. 30A-30B, the piston 3016 is in a neutral position. In a normal operation this may not be the case, as the piston 3016 may be configured to either inhibit fluid flow through one or the other of the inlets 3002, 3008, but not uninhibit, or inhibit, fluid flow through both of the inlets 3002, 3008 concurrently.

As shown in FIG. 30A, if either input signal A or B corresponds to a low pressure (LOGIC 0), then the output 3010 will be LOGIC 0 as well because: (1) if A is a low (LOGIC 0) and B is a high (LOGIC 1), then this implies that the piston 3016 may be in the first position inhibiting fluid flow through the second inlet 3008 while permitting fluid flow in the first inlet 3002, a result being that the output 3010 may be low as well; (2) if A is high and B is high, then fluid flow through the second inlet 3008 is inhibited by the second restricting gate transmission element 3024, and the input signal A is fluidically communicated/conveyed along the first inlet 3002 to the output port 3010; (3) if A is high and B is low, then the fluid flow and/or pressure associated with the low B signal may cause the first restricting gate transmission element 3022 to engage with the first inlet 3002 and inhibit fluid flow of the first inlet 3002 from reaching the output port 3010; and, (4) if A is low, and B is low, fluid flow through the first inlet 3002 may be inhibited by the piston 3016 by the first restricting gate transmission element 3022 and the output port 3010 may receive LOGIC 0. A summary of the possible inputs and outputs (see (1)-(4) above) of the cFET is presented in the truth table 3050 of FIG. 30C, which corresponds to the cFET 3000 as shown in FIGS. 30A-30B. Moreover, the various states of the example fluidic device of FIGS. 30A-30B, summarized in the truth table 3050, may correspond to an AND logic gate.

In additional embodiments, the cFET 3000 of FIGS. 30A-30B, may also be operated as an OR logic gate, as shown in FIGS. 31A-31B and described below. The arrangement of the various inputs relative to those presented in FIGS. 30A-30B may be altered as shown in FIGS. 31A-31B for operation as an OR logic gate.

For example, a cFET 3100 of FIG. 31A may include a first inlet 3102, a first control input port 3104, a second control input port 3106, a second inlet 3108, an output port 3110, a piston 3116, a first restricting gate transmission element 3122 of the piston 3116, and a second restricting gate transmission element 3124 of the piston 3116. A cFET 3150 of FIG. 31B may be structurally similar to the cFET 3100 of FIG. 31A, but with a different arrangement of input signals A and B as illustrated and as described below. A high-pressure source LOGIC 1 may be in fluidic communication with the first inlet 3102. As shown in FIG. 31A, a first input signal A may be applied to the second inlet 3108. A second input signal B may be the first control pressure that enters the first control input port 3104. A minimum pressure PRELOAD applied to the second control input port 3106 may be used to bias the piston 3116 to inhibit fluid flows in the first input port/channel 3102 in the absence of a sufficient first control pressure applied by the second input signal.

The piston 3116 of FIGS. 31A-31B is illustrated in a neutral position between the first and second inlets 3102 and 3108 for illustrative purposes. In normal operation, the piston 3116 may inhibit fluid flow through either the first inlet 3102 with the first restricting gate transmission element 3122 while allowing fluid flow in the second inlet 3108. Alternatively, the piston 3116 may be in a position to inhibit fluid flow in the second inlet 3108 with the second restricting gate transmission element 3124 while allowing fluid flow in the first inlet 3102.

In a first logic state, when operated as the cFET 3100 of FIG. 31A, if the second input signal B is LOGIC 0, then the force of the preload pressure PRELOAD into the second control input port 3106 may not be overcome by the low pressure applied by the second input signal B. As a result, fluid flow through the first inlet 3102 may be inhibited by the first restricting gate transmission element 3022 (with LOGIC 1). The inhibition of fluid flow through the first inlet 3102 may imply that the result at the output port 3110 may depend on the logic state of the first input signal A.

In a second logic state, when operated as the cFET 3100 of FIG. 31A, if the second input signal B is LOGIC 1, then the piston 3116 may be forced to inhibit fluid flow through the second inlet 3108. Thus, irrespective of the value of the input signal A, whether LOGIC 0 or LOGIC 1, fluid may not be conveyed from the second inlet 3108 to the output port/channel 3110 of the cFET 3100. A fluidic signal conveyed to the output port 3110 may be that present in the first inlet 3102, which, in the case illustrated in FIG. 31A, is LOGIC 1.

If the input signals A and B are switched in cFET 3150, as shown in FIG. 31B, in which the first input signal B is provided to the second input port/channel 3108 and the second input signal A is the first control pressure entering the first control input port 3104, the results may remain the same as those presented for the cFET 3100.

In summary, whether configured as the cFET 3100 of FIG. 31A or as the cFET 3150 of FIG. 31B, if A=LOGIC 0 and B=LOGIC 0, then the output will be LOGIC 0. If A=LOGIC 1 and B=LOGIC 1, then the output will be LOGIC 1. If A=LOGIC 1 and B=LOGIC 0, then the output will be LOGIC 1. These logical operations imply that the cFET 3100 or the cFET 3150 may perform as an OR logic gate. A truth table 3160 that may correspond to such a logic gate (either cFET 3100 or cFET 3150) is presented in FIG. 31C.

A fluidic device (e.g., logic-gate system) may include a plurality of complementary fluiditors (cFETs), subsets of which may be fluidically connected serially and/or in parallel. In some examples, a serial connection may imply that an output of a first cFET provides an input to a second cFET that is downstream of the first cFET. An input of the second cFET that may receive the output of the first cFET may include, for example, at least one of the following: a first inlet, a second inlet, a first control pressure, or a second control pressure.

In some examples, a parallel connection may imply that a first cFET and a second cFET receive inputs from a common source. For example, in a first cFET, a first pressure may be directed to one of the two inlet channels or to one of the two control input ports of a first piston of the first cFET. The first pressure may also be directed to one or two inlet channels or to one of two control input ports of a second piston of the second cFET. Common input pressures to any of the inlet channels and/or control input ports may be concurrent. Alternatively, or additionally, at least one of the inlet channels and/or control input ports may receive a delayed signal with respect to another inlet and/or control input port that may be fed by a common source or pressure. In other examples, several cFETs may have one or more common input signals or reference sources, such as a low pressure (LOGIC 0) and a high pressure (LOGIC 1).

In some embodiments, a control pressure may include multiple pressure components. Thus, when the cumulative pressure of at least a subset of the multiple components exceeds that of the opposing control pressure, the piston may be forced to translate to inhibiting fluid flow through the other inlet channel.

Figures 32A, 32B:
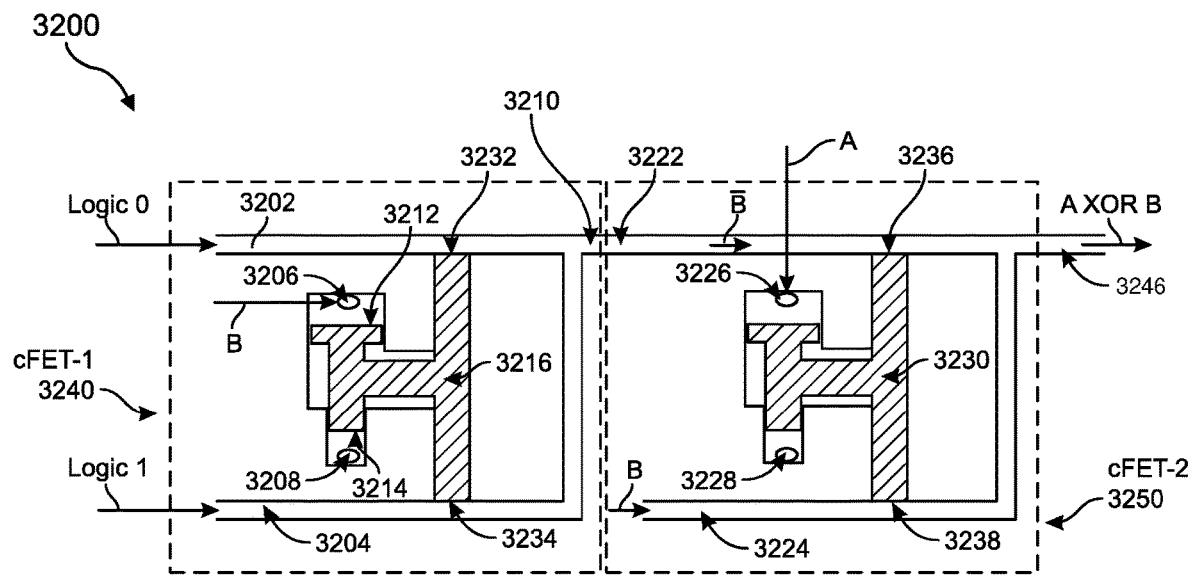
FIG. 32A is a schematic diagram of an example fluidic device, according to at least one embodiment of the present disclosure.
FIG. 32B is a diagram of a truth table corresponding to the example fluidic device of FIG. 32A, according to at least one embodiment of the present disclosure.

The fluidic device 3200 depicted in FIG. 32A is an example in which an output port/channel 3210 of a first cFET-1 3240 may be in fluidic communication with an inlet of a downstream second cFET-2 3250. In FIG. 32A, the first cFET 3240 has a first inlet 3202 which may be at least partially blocked by a first restricting gate transmission element 3232 if sufficient pressure has been applied to a second control gate 3214 to maintain a piston 3216 at a second position (i.e., inhibiting first inlet 3202). However, if there is sufficient pressure from a first control pressure (from, e.g., an input signal B) introduced into a first control input port 3206 of this cFET 3240, then the piston 3216 may tend to be moved to the first position opening up the first inlet 3202 while a second restricting gate transmission element 3234 may engage with, and inhibit fluid flow in, a second inlet 3204. In some examples, a first surface area of a first control gate 3212 may exceed a second surface area of the second control gate 3214. In some configurations, the second control pressure applied to the second control input port 3208 may be a preload pressure to bias the inhibition of fluid flow through the first inlet 3202 when the first control pressure is low (e.g., LOGIC 0).

In the example shown in FIG. 32A, the first inlet 3202 of the first cFET 3240 receives a LOGIC 0 while the second inlet 3204 of the first cFET 3240 receives a LOGIC 1. Two input signals may be provided into the fluidic device 3200: a first input signal A and a second input signal B. The second input signal B is introduced into the first control input port 3206 of the first cFET 3240. Thus, if B is LOGIC 0, then then output channel 3210 may receive a LOGIC 1. If B is LOGIC 1, then the output channel 3210 may receive a LOGIC 0. Thus, the first cFET 3240 inverts the B signal into $\overline{B}$, which is a logic symbol for inverted B. In binary logic, values are either 0 or 1. Thus, if B=1, then $\overline{B}$=0. If B=0, then $\overline{B}$=1.

As is depicted in FIG. 32A, a first inlet 3222 of the second cFET 3250 may receive the output 3210 of the first cFET 3240, which is the inverted signal of the second input signal B that entered the first control input port 3206 of the first cFET 3240. The second input signal B may also be received at a second inlet 3224 of the second cFET 3250. A first input signal A is received at a first control input port 3226 of a piston 3230 of the second cFET 3250. With a preload pressure entering a second control input port 3228 of the second cFET 3250, if the first input signal A is LOGIC 1, then the piston 3230 of the second cFET 3250 may move so as to allow flow in the first inlet 3222 of the second cFET 3250 while inhibiting flow in the second inlet 3224 of the second cFET 3250 by having a second restricting gate transmission element 3238 engage therewith and inhibit flow therein, in which the second input signal B is present. Thus, if the first input signal A is LOGIC 1, the piston 3230 of the second cFET 3250 may move to allow the inverse B (e.g., $\overline{B}$) to flow to an output 3246 of the second cFET 3250. If, however, the first input signal A is LOGIC 0, then the second input signal B, present in the second inlet of the second cFET 3250, may be allowed to flow to the output 3246 of the second cFET 3250. In this case, a first restricting gate transmission element 3236 will engage the first inlet 3222 of the second cFET 3250 and inhibit flow therein. The fluidic device depicted in FIG. 32A is presented, in an example, with the appearance as two separate cFETs. This was done for illustration purposes so as to explain more easily the arrangement of the various components. An alternative system, e.g., unitary, with similar functional arrangements may yield an alternative embodiment. Other illustrated examples in the present disclosure may be treated similarly.

In summary, if A=LOGIC 0 and B=LOGIC 0, then the output 3246 of the second cFET 3250 may be 0. If A=LOGIC 0 and B=LOGIC 1, then the output 3246 of the second cFET 3250 may be 1. If A=LOGIC 1 and B=LOGIC 0, then the output 3246 of second cFET 3250 may again be 1. However, if A=LOGIC 1 and B=LOGIC 1, then the output 3246 of the second cFET 3250 may be zero. These results may suggest that this combination of cFETs yields an exclusive OR (XOR) logical gate. FIG. 32B presents a truth table 3260 corresponding to this particular cFET combination forming the fluidic device 3200. In other words, a signal at the output 3246 may be A XOR B. In mathematical notation this expression would be A⊕B.

An exclusive OR (XOR) is a logical operator which results in LOGIC 1 when either of the inputs or operands is LOGIC 1 (one operand is LOGIC 1 and the other operand is LOGIC 0) but both are not LOGIC 1 and both are not LOGIC 0. In logical condition-making, the simple "or" is a bit ambiguous when both operands are LOGIC 1. Because in that case it is very difficult to understand what exactly satisfies the condition. To remove this ambiguity, the "exclusive" term has been added to "or" to make it clearer in meaning.

While the fluidic device illustrated in FIG. 32A is conceptually divided into two separate cFETS, cFET 3240 and cFET 3250, this was done in order to simply the discussion. However, a single device retaining the essential components (inlets, output channels, pistons, control gates, etc.) may also be possible.

Figures 33A, 33B:
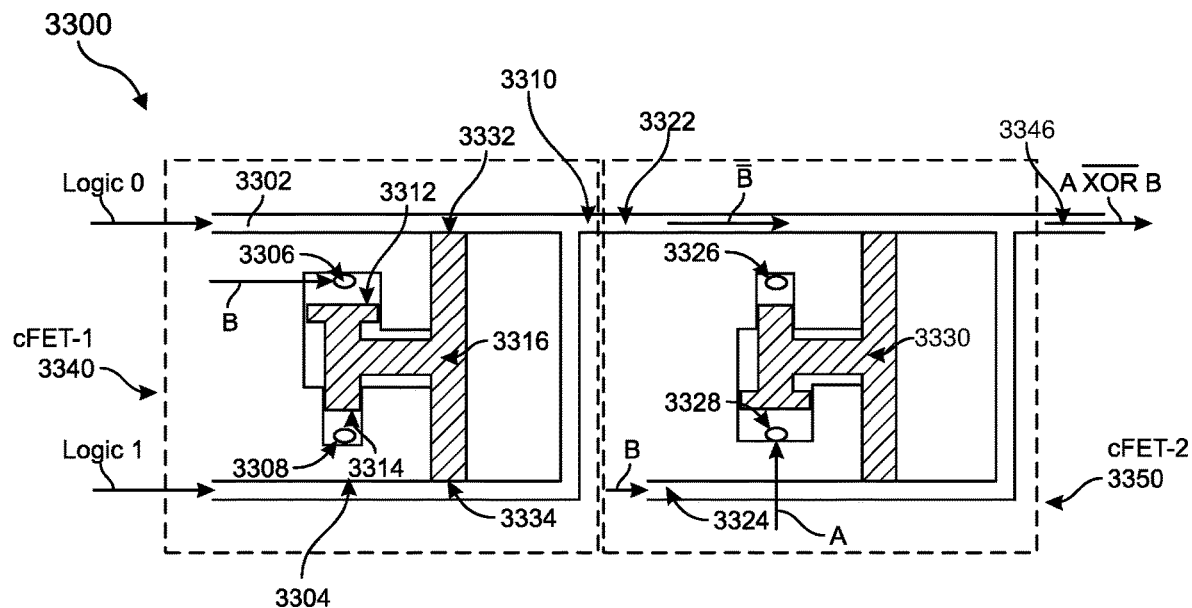
FIG. 33A is a schematic diagram of an example fluidic device, according to at least one embodiment of the present disclosure.
FIG. 33B is a diagram of a truth table corresponding to the example fluidic device of FIG. 33A, according to at least one embodiment of the present disclosure.

In contrast to the fluidic device 3200 of FIG. 32A, in which the fluidically connected cFETs have similar default preload pressures in each of the respective second control input ports 3208 and 3228, an inverted XOR logic gate (XNOR) may be used. As depicted in FIG. 33A, a fluidic device 3300 may include a first cFET 3340 similar to the first cFET 3240 of FIG. 32A and a second cFET 3350 with an inverted gate relative to that depicted in cFET 3250 of FIG. 32A. In this arrangement, a first control pressure that enters a first control input port 3326 of cFET 3350 may be a predetermined preload pressure.

In an alternative example, as depicted in FIG. 33A, the first cFET 3340 performs similarly as that of the first cFET 3240 of FIG. 32A; the signal entering a first control input port 3306 of the first cFET 3340 may be inverted (this means, for a binary system, 0→1 or 1→0) at an output 3310 of the first cFET 3240. A preload pressure may be applied to a second surface of a second control gate 3314 through a second control input port 3308 in order to maintain a piston 3316 in a second position, in which a first restricting gate transmission element 3332 engages a first inlet 3302 of cFET 3340 therewith and inhibits fluid flow therein. A LOGIC 1 input signal B to a first control input port 3306 may overcome this default setting by allowing fluid flow within the first inlet 3302 to reach the output 3310 of the first cFET 3340. Concurrent with this action, fluid flow in the second inlet 3304 would be inhibited by engagement of a second restricting gate transmission element 3334 with the second inlet 3304. A LOGIC 0 input signal B to the first control input port 3306 may be insufficient to overcome the preload pressure entering the second control input port 3308 of the second control gate 3314.

In the example shown in FIG. 33A, a LOGIC 0 is in fluidic communication with a first inlet 3302 of the first cFET 3340. A LOGIC 1 is in fluidic communication with a second inlet 3304. A first input signal A and a second input signal B may be provided to the two fluidically connected cFETs 3340 and 3350. The first input signal A may enter a second control input port 3328 of the second cFET 3350. The second input signal B may enter a first control input port 3312 of the first cFET 3340. In addition, this second input signal B may also be in fluidic communication with a second inlet 3324 of the second cFET 3350.

The first cFET 3340 may generate the inverse of the B input signal (e.g., $\overline{B}$) at which will be received at an output port/channel 3310. The inverse of B may be conveyed to a first inlet 3322 of the second cFET 3350. Thus, the second cFET 3350 may possess a signal (LOGIC 0 or LOGIC 1) in one of its inlets (e.g., 3322 or 3324), while the other of the inlets (3324 or 3322) possesses the inverse of that signal (LOGIC 1 or LOGIC 0).

An output port/channel 3346 of the second cFET 3350 may then be either a LOGIC 0 or LOGIC 1 depending on the value of the first input signal A that enters the second control input port 3328 of the second cFET 3350. If the first input signal A is LOGIC 0, then a piston 3330 of the second cFET 3350 may inhibit fluid flow through a second inlet 3324 of the second cFET 3350, which is B. An output of the output port/channel 3346 of the second cFET 3350 may then be $\overline{B}$ (and not B). Alternatively, if the first input signal A is LOGIC 1 then the piston 3330 may be placed into a second position, which inhibits fluid flow through the first inlet 3322 of the second cFET 3350. In this arrangement, the output 3346 of the second cFET 3350 may then be B and not its inverse, which is $\overline{B}$.

In summary, if A=LOGIC 0 and B=LOGIC 0, then the output 3346 of the second cFET 3350 may be LOGIC 0. If A=LOGIC 0 and B=LOGIC 1, then the output 3346 of the second cFET 3350 may be 1. If A=LOGIC 1 and B=LOGIC 0, then the output 3346 of cFET 3350 may again be LOGIC 1. However, if A=LOGIC 1 and B=LOGIC 1, then the output 3346 of the cFET 3350 may be LOGIC 0. FIG. 33B presents a truth table 3360 corresponding to this fluidic device 3300, which is for an XNOR logic gate. An XNOR is a logical operator which results LOGIC 0 when either of the operands are LOGIC 0 (one operand is LOGIC 0 and the other operand is LOGIC 1). When both operands are the same value, either LOGIC 0 or LOGIC 1, the output may be LOGIC 1.

Similar to the configuration of FIG. 32A, an alternative arrangement for the XNOR gate from that of FIG. 33A, may be to have the output port/channel 3210 in fluidic communication with the second inlet 3224 of the second cFET 3250. The first cFET of this alternative configuration may have the same arrangement as the first cFET 3340 (or that of the first cFET 3240 of FIG. 32A): the output of this first cFET may be an inverse of the its input (thus B→B̄). In this alternative arrangement, the B input signal might enter a first inlet of the second cFET and the A input signal might enter a first control input port of the second cFET. A second control input port of the second cFET may receive a preload pressure. Such a configuration may yield the same truth table 3360 as presented in FIG. 33B.

Figure 34:
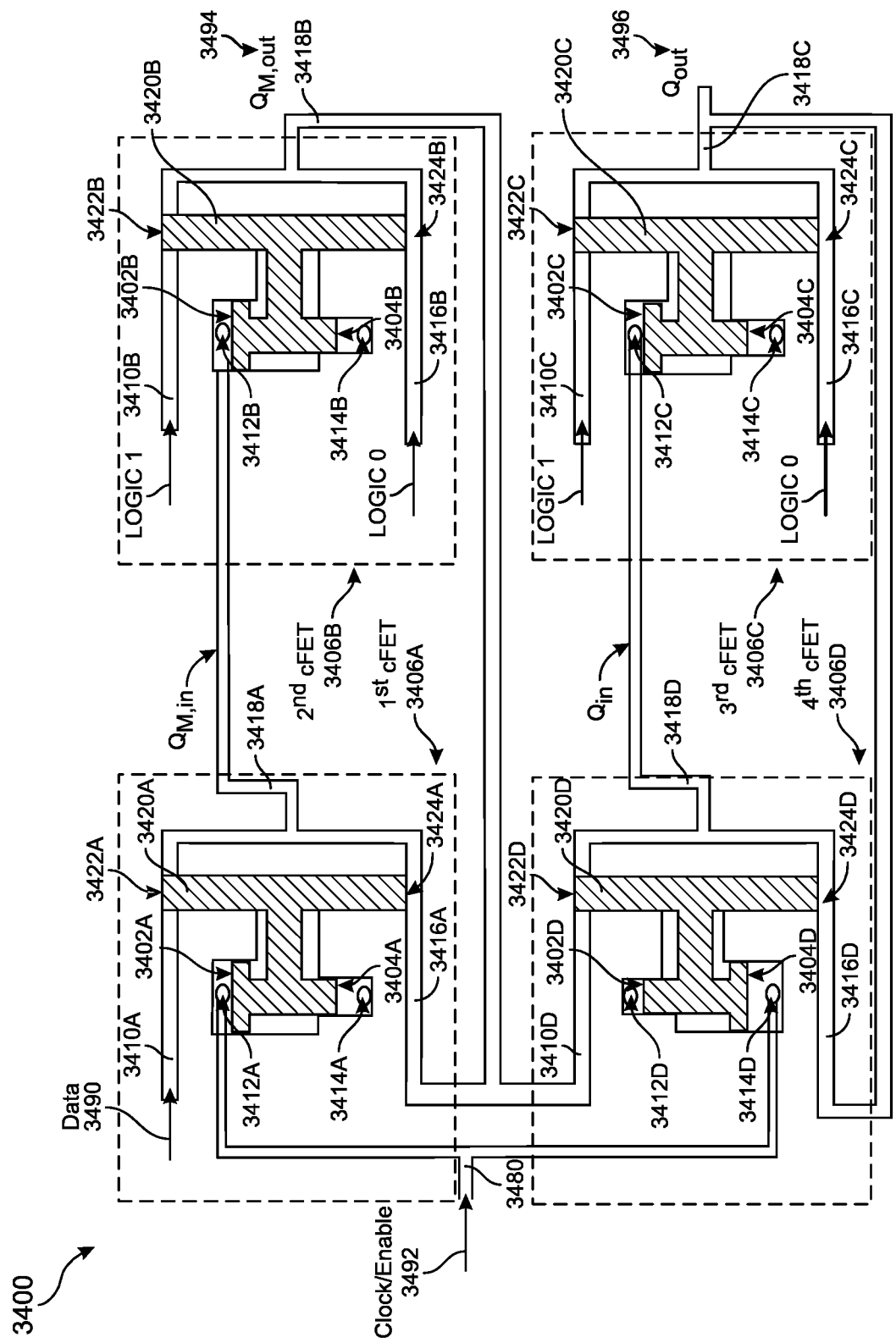
FIG. 34 is a schematic of an example fluidic device system, according to at least one embodiment of the present disclosure.

In the examples and embodiments described hereinabove, single cFETs and pairs of cFETs may be considered to be fluidic equivalents of specific logic gates. More complex fluidic logic gates and/or systems of cFETs may be demonstrated that may perform more complicated functions than such simple logic gates. For example, FIG. 34 illustrates a fluidic memory device 3400. Various states demonstrating the operation of this device 3400 are presented in FIGS. 35-41.

In FIGS. 34-41, respective operational states of the fluidic memory device 3400 are shown. The fluidic memory device 3400 shown in FIGS. 34-41 may have components that may be conceptually identified, for the ease of subsequent discussion, as four separate cFETs. These cFETs may be identified as a first cFET 3406A, a second cFET 3406B, a third cFET 3406C, and a fourth cFET 3406D (collectively referred to as "cFETs 3406").

In FIG. 34, each of the cFETs 3406 is shown with reference numerals followed by a respective letter (e.g., A, B, C, or D). The following discussion of elements common to each of the cFETs 3406 omits the respective letters. Each cFET 3406, may have a piston 3420 that may have multiple control gates 3402 and 3404. Each of these control gates 3402, 3404 may influence the position of the piston 3420 when appropriate forces have been introduced into control input ports 3412 and 3414 of the respective control gates 3402, 3404. Some of these forces may be produced by fluidic pressure. The piston 3420, for example, may be translated to inhibit fluid flow to an output port/channel in either one of two channels, such as a first inlet 3410 and a second inlet 3416. In the arrangement depicted in FIG. 34, the piston 3420 may be positioned to inhibit fluid flow in the lower or second inlet 3416 from reaching an output port/channel 3418. This positioning may be accomplished by applying a force to a first control gate having a first surface area 3402. The force may be applied by a pressure from a fluid. In this case, a first control pressure may be applied through a first control input port 3412 to the first surface area 3402.

In the arrangement as depicted in FIG. 34, the piston 3420 may be positioned to inhibit fluid flow in the upper or first inlet 3410. This positioning may be accomplished by applying a force to a second control gate having a second surface area 3404. This force may be applied by a pressure from a fluid. In this case, a second control pressure may be applied through a second control input port 3414. The second control pressure may be a constant minimum pressure (e.g., a preload pressure).

The first cFET 3406A, the second cFET 3406B, and the third cFET 3406C each may have a first surface area 3402 that is larger than the second surface area 3404 for that cFET 3406. The fourth cFET 3406D may have a first surface area 3402D that is smaller than the second surface area 3404D. Thus, the fourth cFET 3406D may be in an inverted configuration, compared to the first, second, and third cFETs 3406A, 3406B, 3406C.

Each piston 3420 may also include two restricting gate transmission elements: a first restricting gate transmission element 3422 that may be configured to inhibit fluid flow in the first inlet 3410 when the piston 3420 is in a second position; and a second restricting gate transmission element 3424 that may be configured to inhibit fluid flow in a second inlet 3416 when the piston 3420 is in the first position.

As shown in FIGS. 34-41, there may be two input signals. A first input signal 3490 (also referred to herein as "DATA signal 3490"), representing data input or data signal, is presented to the first inlet 3410A of the first cFET 3406A; and a second input signal 3492 (also referred to herein as "CLOCK signal 3492") may be a clock or an enable signal for the fluidic device 3400. This CLOCK signal 3492 may be in fluidic communication with two of the control input ports of separate cFETs and these ports may have a common origin or input 3480. An additional input, used to control one or more logic functions of the some of the cFETs 3406 of the fluidic device 3400, may be a source LOGIC 1, which may provide a high pressure. Another additional input, also used to control one or more logic functions of some of the cFETs 3406 of the fluidic device 3400 may be that of LOGIC 0, which may be of a relatively low pressure. FIG. 34 presents each of the pistons 3420 of the cFETs 3406 in a neutral position only for simplicity of illustration.

Each of the steps of the operation of the fluidic device 3400 to achieve transferring the DATA signal 3490 to a final output $Q_{out}$ 3496 are shown in FIGS. 35-41 and are described below. In some examples, a fluid channel receiving a LOGIC 0 signal is represented by an empty channel, and a fluid channel receiving a LOGIC 1 signal is represented by a shaded channel.

Figure 35:
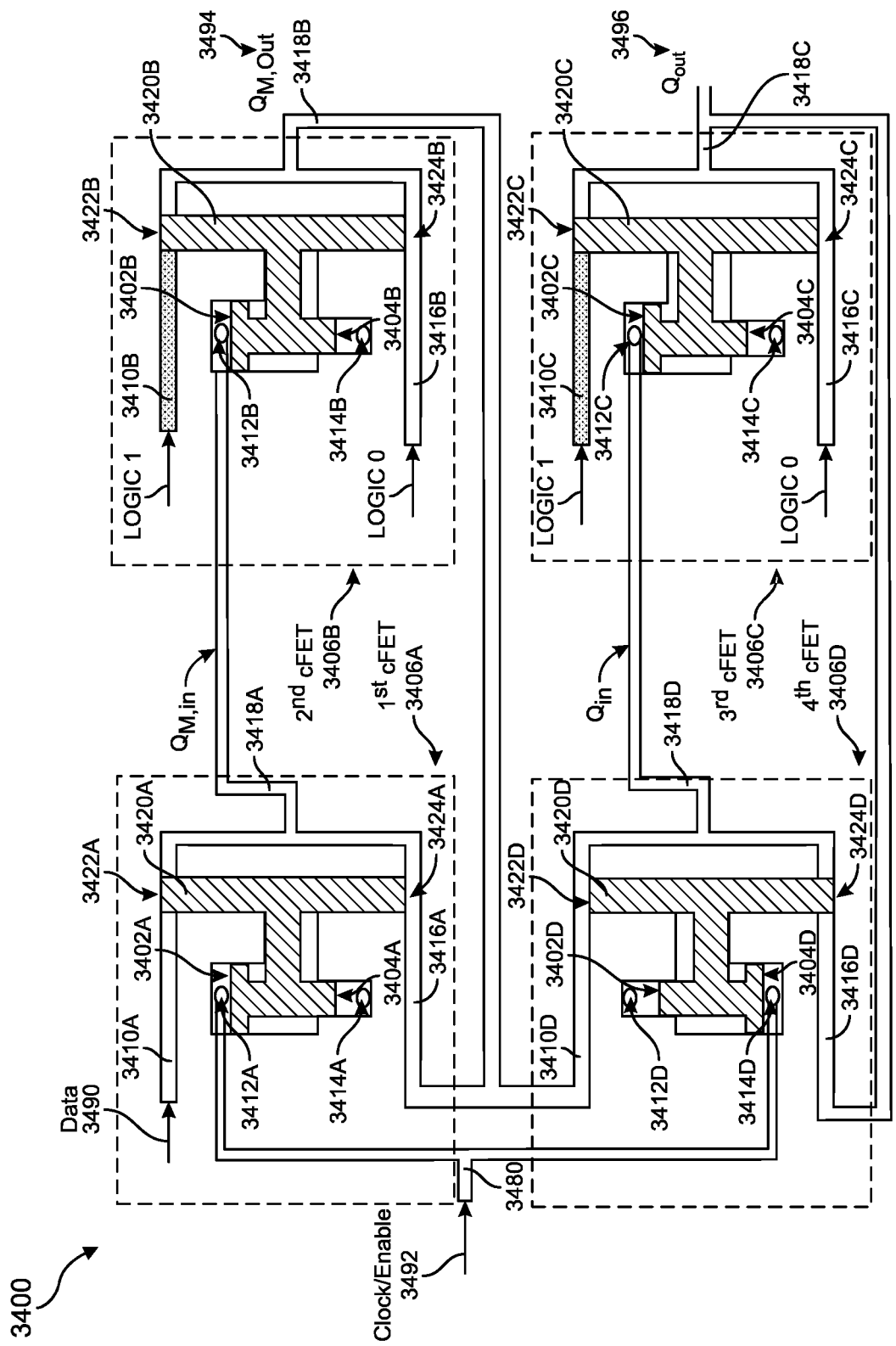
FIG. 35 is a state diagram of the example fluidic device system of FIG. 34, according to at least one embodiment of the present disclosure.

As depicted in FIG. 35, when the CLOCK signal 3492 is LOGIC 0, the piston 3420A of the first cFET 3406A is in the second position inhibiting the DATA signal 3490 in the first inlet 3410A of the first cFET 3406A from progressing and/or influencing aspects downstream, which may include the state of the second cFET 3406B. Thus, when the CLOCK signal 3492 is LOGIC 0, the DATA signal 3490 is not transmitted further whether the DATA signal 3490 be LOGIC 0, as shown in FIG. 35, or LOGIC 1 as seen, e.g., in FIG. 36. A CLOCK signal 3492 of LOGIC 0 also does not change the position of the piston 3420D of the fourth cFET 3406D from inhibiting fluid flow through the second inlet 3416D of the fourth cFET 3406D, which is connected to the final output $Q_{out}$ 3496. Thus, in summary, whenever the CLOCK signal 3492 is LOGIC 0, no DATA signal 3490 is transferred downstream.

Also shown in FIG. 35, irrespective of the CLOCK signal 3492, the first inlet of the second cFET 3406B and the first inlet of the third cFET 3406C may each receive a pressure representing a LOGIC 1. Nevertheless, with the CLOCK signal 3492 at a LOGIC 0, there may be no transfers of such signals within the fluidic device 3400.

Figure 36:
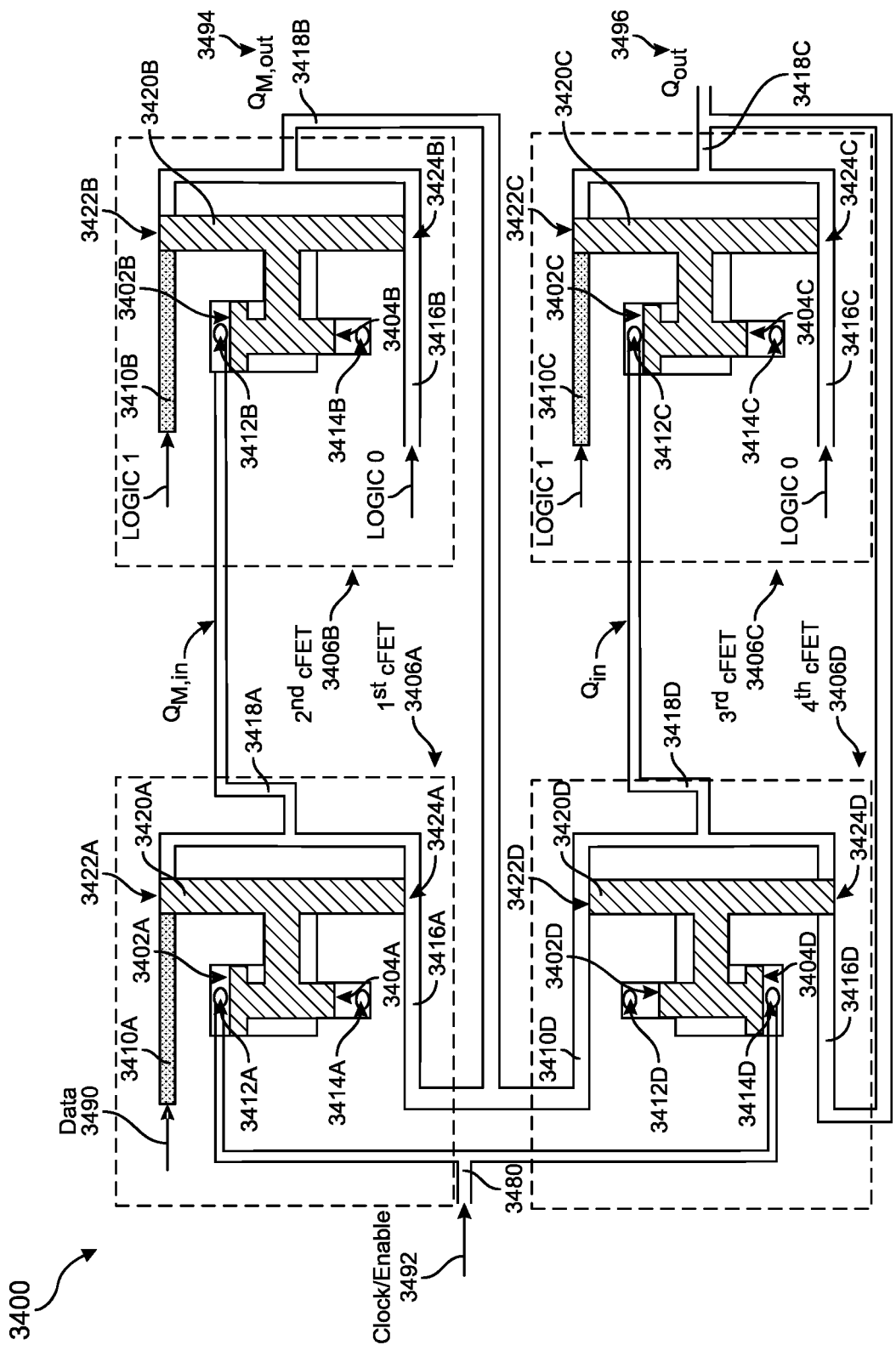
FIG. 36 is another state diagram of the example fluidic device system of FIG. 34, according to at least one embodiment of the present disclosure.
Figure 37:
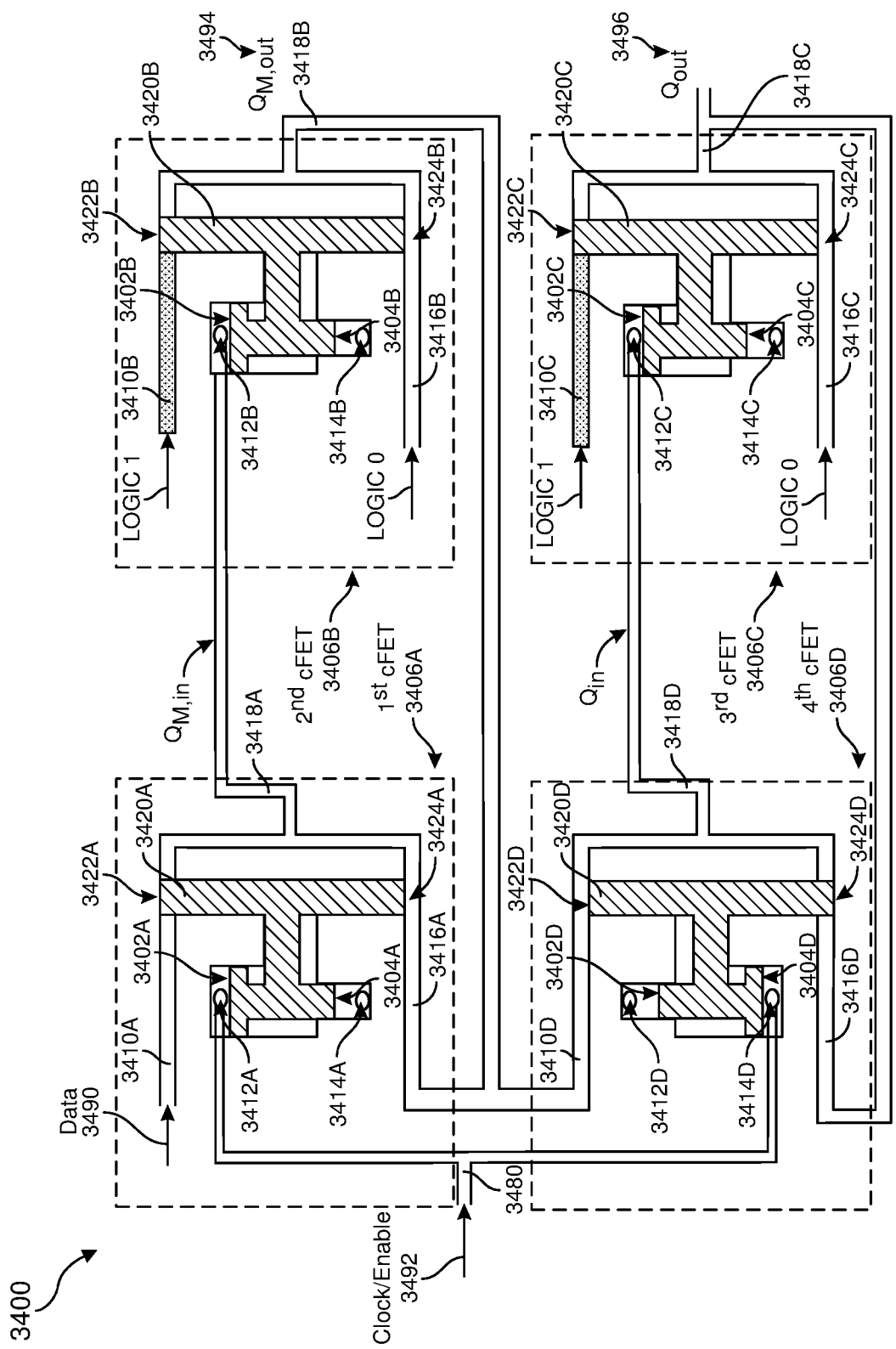
FIG. 37 is another state diagram of the example fluidic device system of FIG. 34, according to at least one embodiment of the present disclosure.

This is the same result should the DATA signal 3490 equal LOGIC 1. FIG. 36 illustrates the fluidic memory device 3400 in the same state as FIG. 35 (e.g., with the CLOCK signal 3492 at a LOGIC 0), but with the DATA signal 3490 at LOGIC 1. Should the DATA signal 3490 return to LOGIC 0 from LOGIC 1, as is seen in FIG. 37, the pistons are in the same previous position when the CLOCK signal 3492 becomes LOGIC 0.

Figure 38:
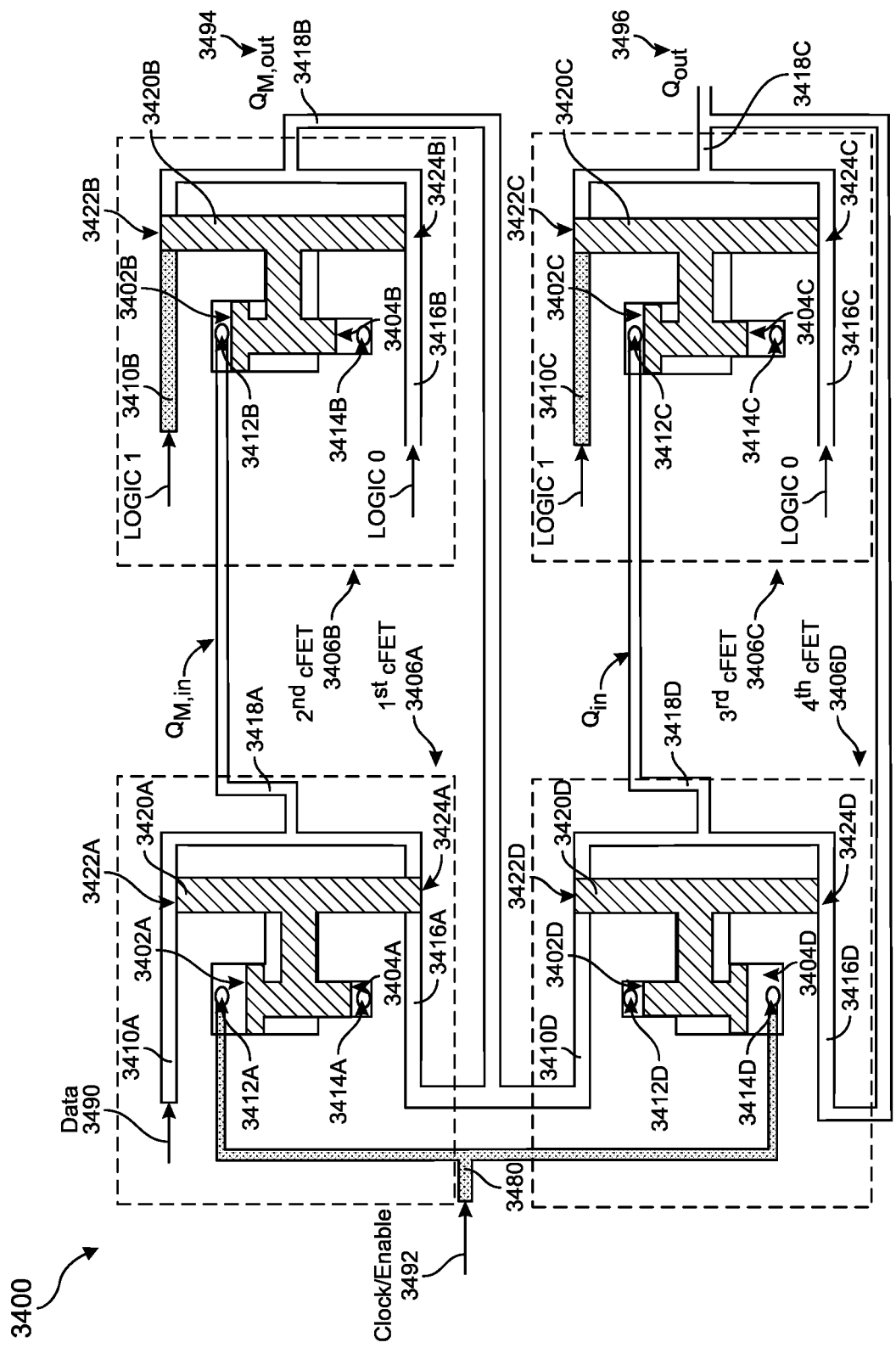
FIG. 38 is another state diagram of the example fluidic device system of FIG. 34, according to at least one embodiment of the present disclosure.

When then CLOCK signal 3492 has transited from LOGIC 0 to LOGIC 1, as is seen in FIG. 38, the piston 3420A of the first cFET 3406A may shift from the second position (inhibiting fluid flow in the first inlet 3410A) to the first position of the first cFET 3406A, which may cause the piston 3420A to inhibit fluid flow in the second inlet 3416A of the first cFET 3406A. This may allow whatever DATA signal 3490 present, LOGIC 0 or LOGIC 1, to proceed to the output port/channel 3418A of the first cFET 3406A (as $Q_{M,in}$). This output port/channel 3418A may be in fluidic communication with the first control input port 3412B of the second cFET 3406B.

The piston 3420B of the second cFET 3406B may be by default in the second position (by a preload pressure into the second control input port 3414B) which may inhibit fluid flow in the first inlet 3410B of the second cFET 3406B from fluidic communication with the output port/channel 3418B of the second cFET 3406B. However, the second position of the piston 3420B may allow the second inlet 3416B of the second cFET 3406B to be in fluidic communication with the output port/channel 3418B of the second cFET 3406B and this may be LOGIC 0. The output port/channel 3418B of the second cFET 3406B may be in fluidic communication with second inlet 3416A of the first cFET 3406A; however, fluid flow through the output port/channel 3418B may be inhibited as the piston 3420A of the first cFET 3406A is in its first position, i.e., inhibiting fluid flow through the second inlet 3416A, as the CLOCK signal 3492 with LOGIC 1 entering the first control input port 3412A of the first cFET 3406A may have caused the piston 3420A to move to inhibit fluid flow through the second inlet 3416A of the first cFET 3406A.

The output port/channel 3418B of the second cFET 3406B may be also in fluidic communication with the first inlet 3410D of the fourth cFET 3406D. However, as the CLOCK signal 3492 is LOGIC 1, the piston 3420D of the fourth cFET 3406D may be in the second position due to the CLOCK signal 3492 LOGIC 1 entering the second control input port 3414D of the fourth cFET 3406D, which may overcome the preload pressure entering the first control input port 3412D of that piston 3420D. This situation may place the piston 3420D of the fourth cFET 3406D in the second position, which may inhibit fluid flow in the first inlet 3410D of the fourth cFET 3406D. Thus, the output 3418B of the second cFET 3406B may not be transferred beyond the inhibited first inlet 3410D of the fourth cFET 3406D. This also may mean that the final output 3496, $Q_{out}$, remains unchanged from its previous value.

Figure 39:
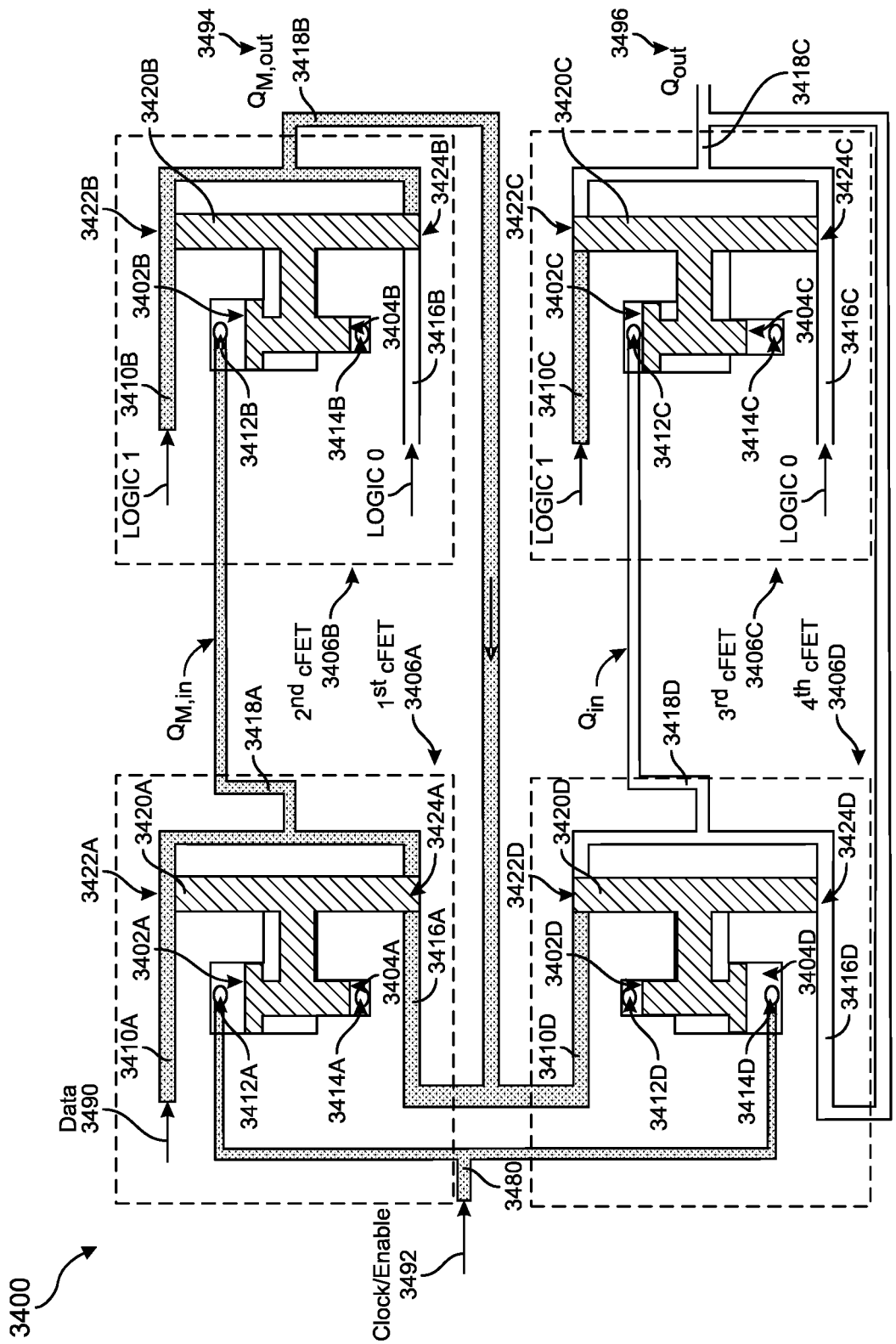
FIG. 39 is another state diagram of the example fluidic device system of FIG. 34, according to at least one embodiment of the present disclosure.

As illustrated in FIG. 39, should CLOCK signal 3492 transition to LOGIC 1, then the value at the output 3418B of the second cFET 3406B may depend on the value of DATA signal 3490. If the DATA signal 3490 is LOGIC 1, then the output 3418A of the first cFET 3406A ($Q_{M,in}$) may also be LOGIC 1. This value may be applied to the first control input port 3412B of the second cFET 3406B piston 3420B, and may cause that piston 3420B to be placed into a first position, which may mean that fluid flow through the second inlet 3416B of the second cFET 3406B may be inhibited. Concomitantly, it may mean that the first inlet 3410B with LOGIC 1 of the second cFET 3406B may now be in fluidic communication with the output port/channel 3418B of the second cFET 3406B ($Q_{M,out}$ 3494), and thus is also LOGIC 1. Moreover, the value of output port/channel 3418B ($Q_{M,out}$ 3494) may be in fluidic communication with the first inlet 3410D of the fourth cFET 3406D.

If DATA signal 3490 is LOGIC 0 and CLOCK signal 3492 is LOGIC 1, then the piston 3420B of the second cFET 3406B may be in the second position, thus inhibiting LOGIC 1 fluid flow through the first inlet 3410B of the second cFET 3406B. This inhibiting action on the first inlet 3410B also may mean, simultaneously, that the second inlet 3416B of the second cFET 3406B is now in fluidic communication with the output port/channel 3418B of the second cFET 3406B. As the second inlet 3416B receives LOGIC 0, that value, LOGIC 0, may be transferred to the output port/channel 3418B of the second cFET 3406B which is $Q_{M,out}$ 3494.

Thus, in summary: if CLOCK signal 3492 is LOGIC 0 and DATA signal 3490 is either LOGIC 0 or LOGIC 1, there may be no change in the state of any output value Q ($Q_{M,out}$ 3494 and/or $Q_{out}$ 3496). If, however, CLOCK signal 3492 is LOGIC 1 and DATA signal 3490 is LOGIC 0 or LOGIC 1, then that value of the DATA signal 3490 (LOGIC 0 or LOGIC 1) gets transferred to $Q_{M,out}$ 3494.

Figure 40:
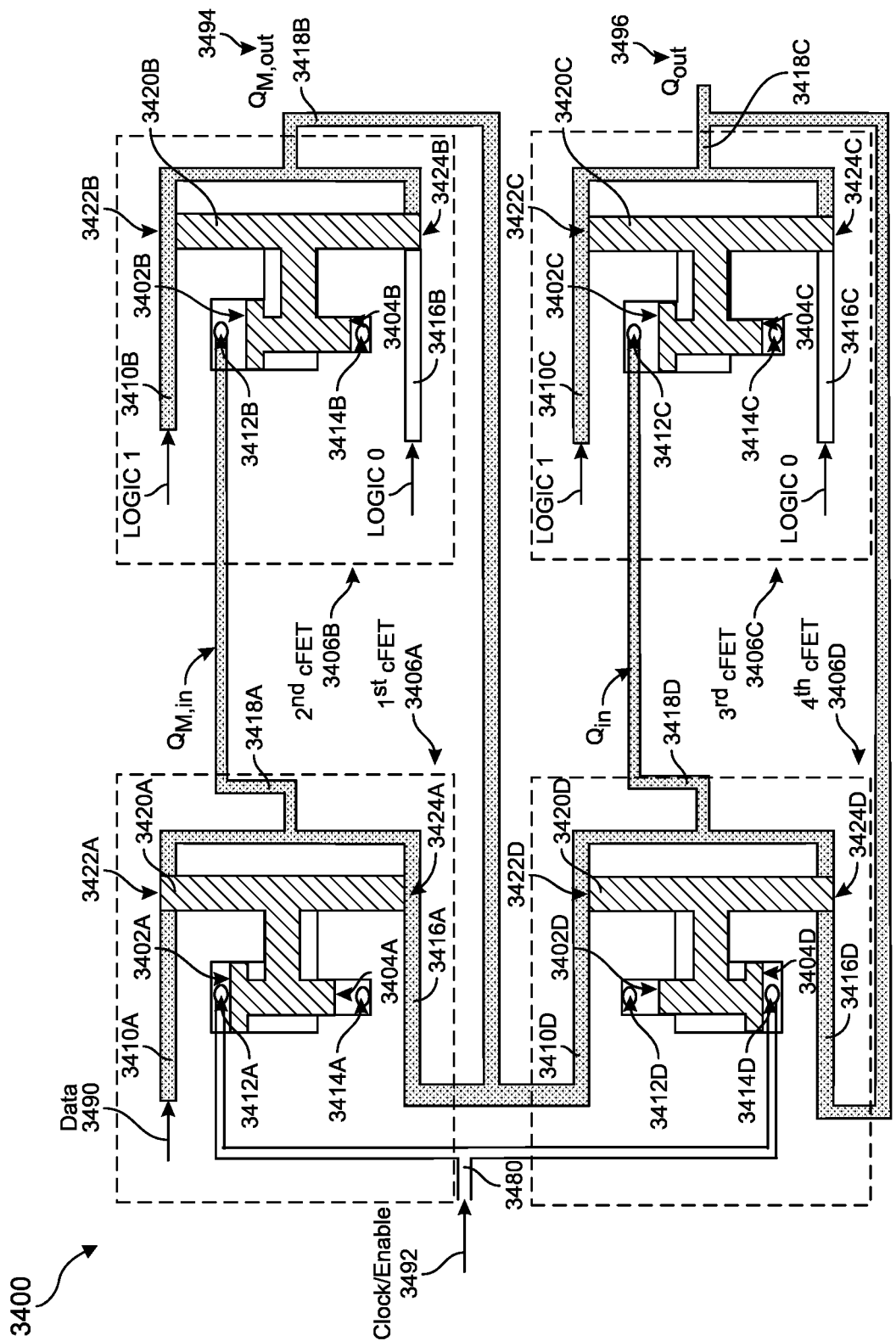
FIG. 40 is another state diagram of the example fluidic device system of FIG. 34, according to at least one embodiment of the present disclosure.

Upon transiting from a CLOCK signal 3492 of LOGIC 1 to a CLOCK signal 3492 of LOGIC 0 as is depicted in FIG. 40, the piston 3420A of the first cFET 3406A may once again be in the second position which prevents any value of the DATA signal 3490 from entering the remainder of the chain of cFETs 3406 (meaning the second, fourth, and third cFETs 3406B, 3406D, 3406C). With CLOCK signal 3492=LOGIC 0, the piston 3420D of the fourth cFET 3406D may be in the first position, which may mean that fluid flow through the second inlet 3416D of the fourth cFET 3406D is inhibited, and fluid flow through the first inlet 3410D of the fourth cFET 3406D may then be uninhibited to the output port/channel 3418D of the fourth cFET 3406D. Thus, the value of $Q_{M,out}$ 3494 may be transferred to the output port/channel 3418D of the fourth cFET 3406D (=$Q_{in}$). Moreover, the value of $Q_{M,out}$ 3494 may be in fluidic communication with the first control input port 3412C of the piston 3420C of the third cFET 3406C.

Figure 41:
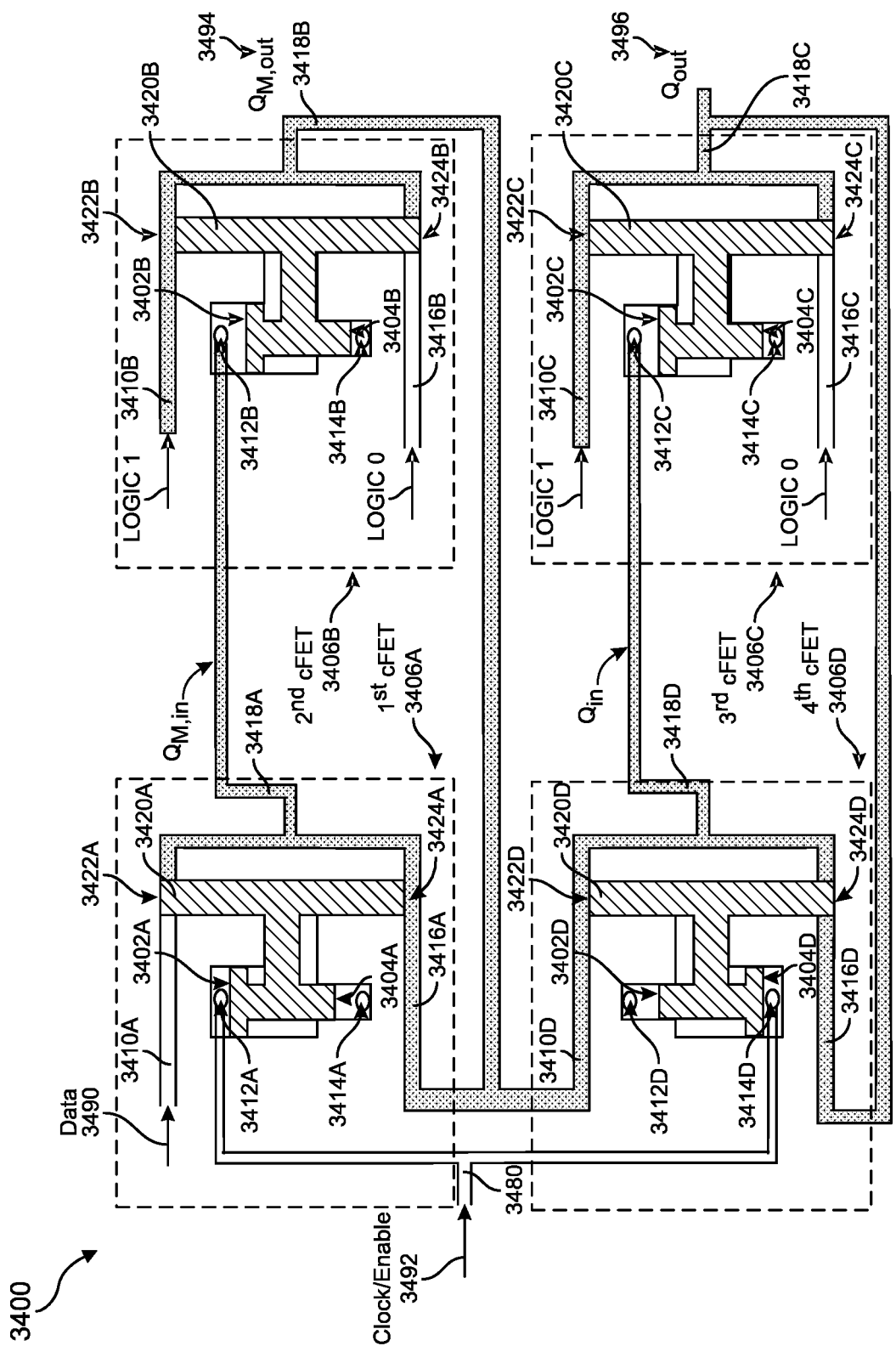
FIG. 41 is another state diagram of the example fluidic device system of FIG. 34, according to at least one embodiment of the present disclosure.

As is seen in FIG. 41, should CLOCK signal 3492 be LOGIC 0, and DATA signal 3490 is LOGIC 0, then $Q_{M,out}$=1. Furthermore, with the CLOCK signal 3492 again LOGIC 0, then $Q_{in}$=LOGIC 1 as the output port/channel 3418D of the fourth cFET 3406D is in fluidic communication with the first control input port 3412C of the third cFET 3406C. When $Q_{in}$=LOGIC 1, the piston 3420C of the third cFET 3406C may allow LOGIC 1 fluid flow from the first inlet 3410C of the third cFET 3406C to reach the output port/channel 3418C of the third cFET 3406C (as $Q_{out}$ 3496). The output port/channel 3418C of the third cFET 3406C may be the value of $Q_{in}$ which may be the same as the value of $Q_{M,out}$, which is the same value of $Q_{M,in}$ which is the same value of DATA signal 3490 when CLOCK signal 3492 transited from LOGIC 0 to LOGIC 1.

Thus, in summary, a value of the DATA signal 3490 may be loaded by the first cFET 3406A and the second cFET 3406B when CLOCK signal 3492 transits from LOGIC 0 to LOGIC 1, as illustrated in FIGS. 38 and 39. That loaded DATA signal 3490 value then may be transferred to the final value $Q_{out}$ 3496 of the fluidic device when CLOCK signal 3492 transits from LOGIC 1 to LOGIC 0 via the fourth cFET 3406D and the third cFET 3406C. The operation of the fluidic memory device 3400 may be summarized in a truth table 4200 illustrated in FIG. 42. While the afore-described fluidic memory device 3400 has been conceptualized and elucidated using four cFETS, alternative designs may use systems of NAND gates (see, for example, FIG. 13), and/or systems using NOR gates (see, for example, FIG. 6). The basic components as described hereinabove may be contained in a unitary device, wherein categorization into the functioning of four separate cFETs may be less likely.

As has been described in the examples presented hereinabove, cFETs may function as logic gates, for example, at least as the following logic gates: AND, NAND, OR, NOR, XOR, and/or XNOR. Combinations of cFETs may be combined to create more complicated logical devices and/or gates, such as the fluidic memory device 3400 discussed above. For example, the latch 1900 shown in FIG. 19 may be configured to act as a memory device by adding an enable and/or clock signal to transform the latch 1900 into a flipflop. Such a flipflop may include one or more NOR and/or NAND gates as described in the present application. A series of these fluidic memory devices, which may be referred to as "flip-flops," maybe chained together to form a shift register. Such a configuration may allow for a system that takes serial information as an input and outputs parallel information. This may be particularly useful in data/actuation signals.

The conceptualization of fluidic interactions between separate cFETS may be further applied to a more complex fluidic system, such as a fluidic adder device. Such a fluidic adder device may include several cFETs that may accept as inputs, three signals, namely input signal A, input signal B, and input signal $C_{in}$. The fluidic adder device may be configured, for example, to provide a sum. Additionally, an additional output, for example, may be in the form of a carry out bit such as $C_{out}$.

In an example, A, B, and $C_{in}$ may represent binary bits. In logic terminology, the sum=(A⊕B)⊕$C_{in}$, which, more plainly stated, is the exclusive OR between the A and B signals and the result of that operation then undergoes an exclusive OR with the $C_{in}$ signal. The carry out=[A●B+ (A⊕B)●$C_{in}$], which, plainly stated, is the sum of two terms, the first term in the sum being an AND between the A and B signals and the second term in the sum is the exclusive OR of the A and B signals which then undergoes an AND operation with $C_{in}$.

Figure 43:
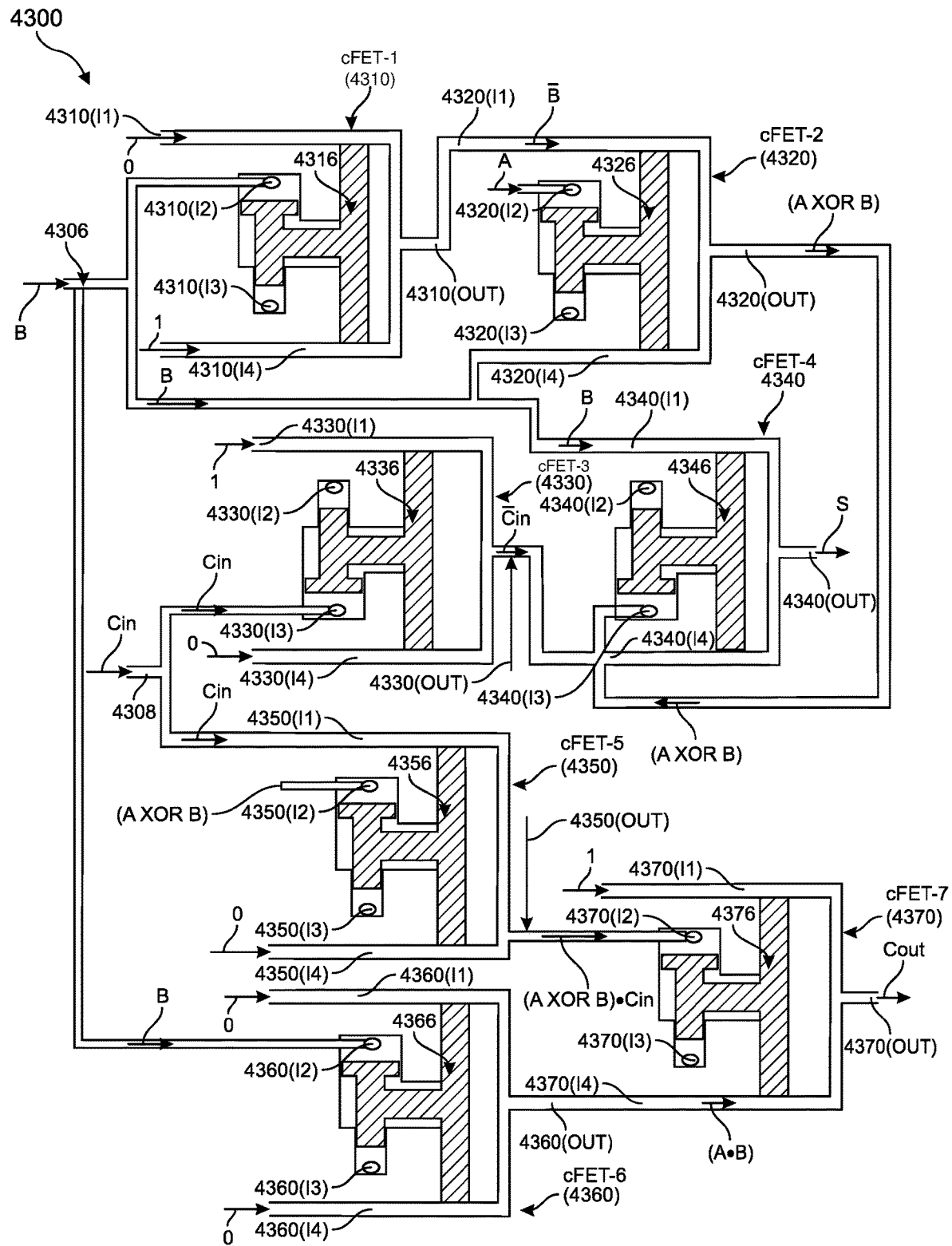
FIG. 43 is a schematic diagram of an example fluidic device system, according to at least one embodiment of the present disclosure.

FIG. 43 presents an example of a fluidic adder device 4300, which may be operable with three inputs A, B, and $C_{in}$. The outputs of this fluidic adder device 4300 may be a sum of those inputs along with a carry out bit $C_{out}$. In the example fluidic adder device 4300 shown in FIG. 43, there may be a first fluidic XOR logic gate that may take as inputs A and B input signals and may provide an exclusive OR of these as an output, represented by the expression A⊕B. A second XOR gate may also be present, located downstream from the first XOR gate. Other logic cFETs that may functionally contribute to the fluidic adder device include AND and/or OR logic gates.

In FIG. 43, for reference, each of the pistons of the fluidic adder device 4300 is indicated in an artificially neutral position for illustrative purposes only. The actual operation of the fluidic adder device 4300, including the operating positions of the pistons, is explained below. For example, the position of the piston 4316 may depend upon the relative counteracting pressures entering the opposing control gates of the piston 4316, as has been discussed above. For example, if a force resultant from a first control pressure entering into, for example, a first control input port 4310(I2) of a first cFET 4310 is greater than the force exerted by a second control pressure entering a second control input port 4310(I3), then the piston 4316 may be in a first position, thus inhibiting flow within the second inlet 4310(I4) reaching the output port/channel 4310(OUT) of first cFET 4310. Alternatively, if the force resultant from the first control pressure entering into, for example, the first control input port 4310 (I2) of first cFET 4310 is less than the force exerted by the second control pressure entering the second control input port 4310(I3), then the piston may be in a second position, thus inhibiting flow within the first inlet 4310(I1) of first cFET 4310 from reaching the output port/channel 4310 (OUT) of first cFET 4310. In the fluidic adder device 4300, the control gates may not all have the same surface area. In the example depicted in FIG. 43, the second control gates of the pistons 4316, 4326, 4356, 4366, and 4376 and the first control gates of the pistons 4336 and 4346 each may have a smaller surface area than its opposing control gate counterpart and thus may receive a preload pressure to bias the respective piston in either the first position or in the second position. In alternative examples, any of the pistons conceptualized in the fluidic adder device 4300 illustrated in FIG. 43 may be inverted, such as the arrangement of the pistons 4336 and 4346 relative to the other pistons 4316, 4326, 4356, 4366, and 4376, just as long as the relationships between the various input signals and the LOGIC 0 and/or LOGIC 1 pressures is maintained with respect to the positioning of the corresponding piston.

In the arrangement depicted in FIG. 43, a LOGIC 0 (0) is received by the first inlet 4310(I1) and LOGIC 1 (1) is received in the second inlet 4310(I4) of first cFET 4310. The piston 4316 of first cFET 4310 may move into its first position (inhibiting flow in the second fluid inlet 4310(I4)) when a first control pressure entering the first control input port 4310(I2) is greater than a second control pressure entering into the second control input port 4310(I3).

The second input signal B may be conveyed to the first control input port 4310(I2) as the first control pressure of the first cFET 4310. Thus, if the second input signal B is sufficiently high to overcome a preload pressure entering the second control input port 4310(I3) of the first cFET 4310, then the piston 4316 may be located in its second position. This action may lead to the inhibiting of flow in the second inlet 4310(I4) reaching the output port/channel 4310(OUT) of first cFET 4310. This may result in the output 4310(OUT) being LOGIC 0.

Alternatively, if the B input signal is LOGIC 0, then the default position of the piston 4316 may be in the first position, thus inhibiting flow in the first inlet 4310(I1), which is LOGIC 0. Thus, the output of first cFET 4310 may be LOGIC 1. The net result of the operation of first cFET 4310 may be to invert the value of the second input signal B to an inverted second input signal $\overline{B}$.

The output 4310(OUT) of first cFET 4310 (i.e., $\overline{B}$) may be in fluidic communication with the first inlet 4320(I1) of the second cFET 4320. The second inlet 4320(I4) of second cFET 4320 is the second input signal B. The first input signal A may be the first control pressure entering into the first control input port 4320(I2) of the piston 4326 of second cFET 4320. Should the first input signal A be larger than the default preload pressure of the second control input port 4320(I3), then the piston 4326 of the second cFET 4320 may be in the first position inhibiting fluid flow within the second inlet 4320(I4) of second cFET 4320, which conveys the second input signal B. Thus, the net result of this arrangement of this second cFET 4320 at the output 4320(OUT)

thereof may be the exclusive OR between the first input signal A and the second input signal B. In summary, the first cFET 4310 and the second cFET 4320 form a first XOR logic gate that may be configured to perform an XOR logic operation on the first input signal A with the second input signal B.

A given input signal may be presented as an input to several cFETs. All or a subset of the inputs that receive a given input signal (for example, A, or, B, or $C_{in}$) may be in direct fluidic communication. Alternatively, all, or a subset, of the inputs that may receive a given input signal may be correlated/coordinated in activity without any direct fluidic connection. These input signals may be presented to one of the two inlet ports/channels and/or to one of the two control input ports of the associated piston of a given cFET. An example of a common origin for a signal may be illustrated in FIG. 43, in which the third input signal $C_{in}$, which enters both the second control input port 4330(I3) of the third cFET 4330 as well the first inlet 4350(I1) of the fifth cFET 4350, for example, from a common source 4308. This common source 4308 in FIG. 43 is for illustrative purposes only and may not necessarily exist in other examples.

The third cFET 4330 and the fourth cFET 4340 may be configured to form a second XOR logic gate that performs an XOR logic operation on the value of the output port of the first XOR logic gate (e.g., output 4320(OUT) of second cFET 4320) with the third input signal $C_{in}$, in which the first inlet 4330(I1) of the third cFET 4330 may be configured to convey LOGIC 1 and the second inlet 4330(I4) of the third cFET 4330 may be configured to convey LOGIC 0. Also, the second inlet 4340(I4) of the fourth cFET 4340 may be configured to convey the output port 4330(OUT) of the third cFET 4330, which may be the inverse of the third input signal $C_{in}$ ($\overline{Cin}$). The second input signal B may be conveyed to the first inlet 4340(I1) of the fourth cFET 4340. The third input signal $C_{in}$ may enter the second control input port 4330(I3) of the third cFET 4330. The value of the output port 4320(OUT) of the first XOR logic gate is conveyed to the second control pressure 4340(I2) of the fourth cFET 4340. The value of the output port 4340(OUT) of the fourth cFET 4340 may be the sum of the first input signal A, the second input signal B, and the third input signal $C_{in}$.

Thus, in summary, a combination of the third cFET 4330 and fourth cFET 4340 may represent a second XOR logical gate. The input signals to this second XOR logic gate may be the third input signal $C_{in}$ and the output of the first XOR logic gate, which is the exclusive OR of the first and second input signals (A and B). This latter term may be represented by the expression A⊕B or by A XOR B. The net result of the first and second XOR logic gates is the sum of the three input signals: A, B, and $C_{in}$. This sum, S, is conveyed at the output 4340(OUT).

Another possible determination of the fluidic adder device 4300 may be that of a carry out bit $C_{out}$, which may also be referred to as an overflow or excess bit. A carry out bit may refer to the excess contribution over a bit-limited summation. For example, in a binary system, only two digits may be used (e.g., 0 and 1). To represent a sum of three binary numbers, at least two bits may be employed to provide sufficient information to determine the sum, such as a first bit representing a sum output and a second bit that is the carry out bit $C_{out}$. Both the sum output and the carry out bit $C_{out}$ may be used to unambiguously represent a total sum of the three binary numbers.

To achieve a determination of the carry out bit $C_{out}$, two fluidic AND logic gates may be used to perform logical operations followed by an operation of a fluidic OR logic gate. As illustrated in FIG. 43, the fifth cFET 4350 may form a first AND logic gate which may be configured to perform an AND logic operation on the $C_{in}$ input signal with that of the value of the output port 4320(OUT) of the first XOR logic gate (A XOR B). The third input signal $C_{in}$ may be applied to the first inlet 4350(I1) of the fifth cFET 4350. A LOGIC 0 may be input to the second inlet 4350(I4) of the fifth cFET 4350. Additionally, the output 4320(OUT), of the first fluidic XOR logic gate may enter the first control input port 4350(I2) of fifth cFET 4350. This operation may be expressed by the Boolean algebraic notation A⊕B in which the operation of an exclusive OR is performed on the two input signals A and B. Should the value from the (A⊕B) operation exceed the preload pressure that may be presented to the second control input port 4350(I3), then the piston 4356 may inhibit flow from the second inlet 4350(I4) to the output port/channel 4350(OUT) of fifth cFET 4350. Otherwise, the preload pressure of the second control input port 4350(I3) may be sufficient to cause the piston to be in the second position, thus inhibiting flow in the first inlet 4350(I1) from reaching the output 4350(OUT) of the fifth cFET 4350.

In summary, the net result is that the output 4350(OUT) of the fifth cFET 4350 may have a value of (A⊕B)●$C_{in}$, which is a Boolean algebraic expression referring to the result of an AND logic operation (represented in this expression by the dot symbol) performed on the value of the output of the first XOR (represented by the encircled-plus symbol) logic gate with the $C_{in}$ input signal.

Another fluidic AND gate, a sixth cFET 4360, may operate simultaneously with the fifth cFET 4350. The purpose of the sixth cFET may be to perform a logical AND operation on two inputs: the first input signal A that is in fluidic communication with the first inlet 4360(I1) of sixth cFET 4360 and the second input signal B that is in fluidic communication with the first control input port 4360(I2) of sixth cFET 4360. A fluid pressure representing LOGIC 0 is applied to the second inlet 4360(I4) of the sixth cFET. Thus, if the second input signal B is of sufficient strength, the second input signal B may overcome the preload pressure entering the second control input port 4360(I3) and the piston 4366 of the sixth cFET 4360 may then be positioned into its first position, which inhibits flow in the second inlet 4360(I4) of sixth cFET 4360. In this state, a signal from this second inlet 4360(I4) may be prevented from reaching the output port 4360(OUT) of sixth cFET 4360, and the net result may be that an AND operation may be performed between the first input signal A and the second input signal B.

An additional step, which may be in the form of a logic gate, may be required to achieve the value of the carry-out bit $C_{out}$. A value of $C_{out}$ may be obtained by an OR operation performed between the output 4350(OUT) [(A⊕B)●$C_{in}$] with the output 4360(OUT) [(A●B)] from the other fluidic AND gate, the sixth cFET 4360. A seventh cFET 4370 may be used to form an OR logic gate, which may be configured to perform the OR logic operation on the value of the output 4350(OUT) of the fifth cFET 4350 with the value of the output 4360(OUT) of the sixth cFET 4360.

To achieve this, the first inlet 4370(I1) of the seventh cFET 4370 may be configured to convey LOGIC 1. The second inlet 4370(I4) of the seventh cFET 4370 may be configured to accept the value at the output port 4360(OUT) of the sixth cFET 4360, which is represented by the expression A●B, which is the logical AND of the first input signal A with that of the second input signal B. The first control pressure of the seventh cFET 4370 entering the first control input port 4370(I2) is the value of the output 4350(OUT) of the fifth cFET 4350, which is represented by the expression $(A \oplus B) \bullet C_{in}$. The value of the output port 4370(OUT) of the seventh cFET 4370 is represented by the expression $[[(A \oplus B) \bullet C_{in}] + (A \bullet B)]]$, which is the carry out bit $C_{out}$. When both A and B inputs are LOGIC 0, the sum and the carry-out may be LOGIC 0. If either input (A or B) is LOGIC 1, then the sum may be LOGIC 1 and the carry out bit $C_{out}$ may be LOGIC 0. If the two inputs, A and B, are both LOGIC 1, the sum becomes LOGIC 0 and the carry out bit $C_{out}$ becomes LOGIC 1. When A, B, and $C_{in}$ are all LOGIC 1, the sum and the carry out bit $C_{out}$ may be both LOGIC 1. These properties of the fluidic adder device 4300 may be summarized by a truth table 4400, which is illustrated in FIG. 44.

Alternative embodiments for the AND gates (e.g., for fifth cFET and/or sixth cFET) used in the fluidic logic-gate system described above may be that as depicted and described in relation to FIG. 16. Alternative embodiments for the OR gate (e.g., for seventh cFET 3470) used in the fluidic logic-gate system described herein may be that as depicted and described in relation to FIG. 9.

Figure 45:
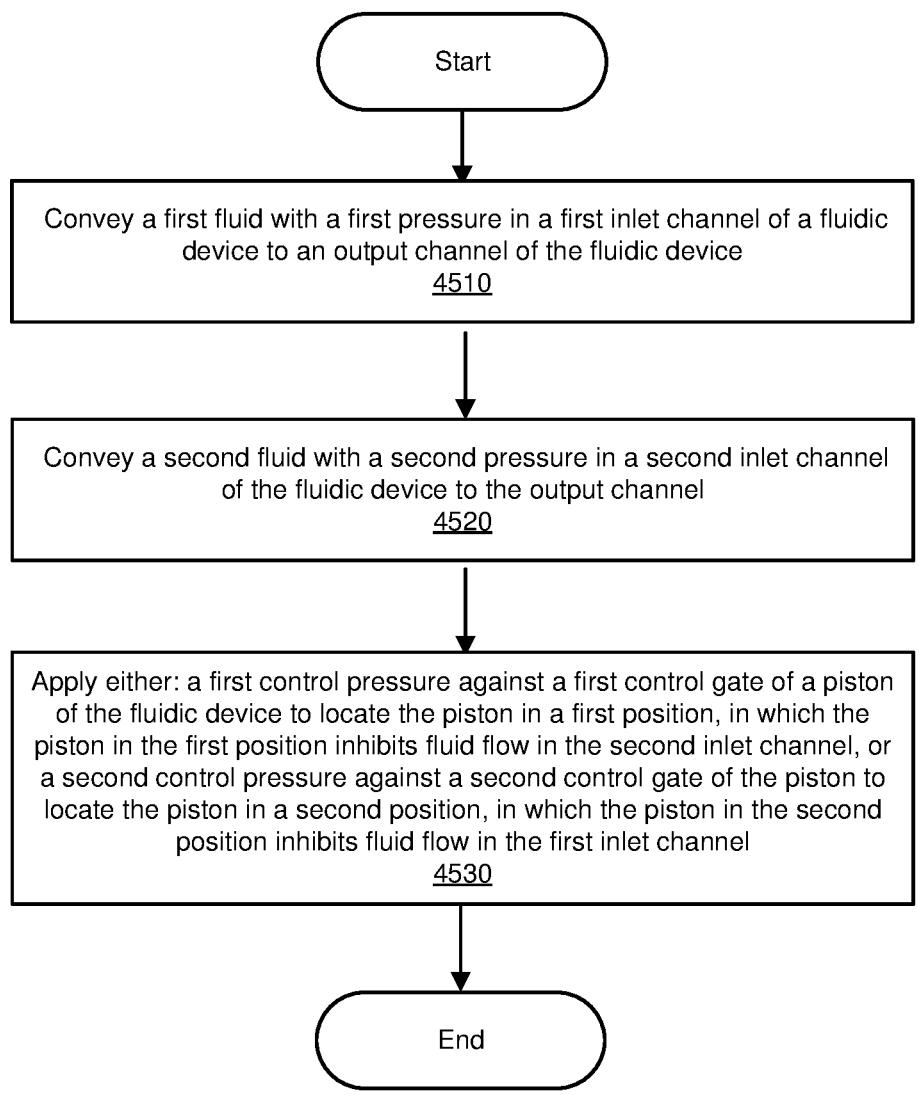
FIG. 45 is a flow diagram of an example method of controlling fluid flows in a fluidic device, according to at least one embodiment of the present disclosure.

In additional embodiments, methods are also disclosed to control (e.g., manipulate) fluid flows in fluidic devices. For example, FIG. 45 is a flow diagram illustrating a method 4500 to manipulate fluid flows in a fluidic device. At operation 4510, the method 4500 may include conveying a first fluid with a first pressure in a first inlet channel to an output port/channel of a fluidic device. At operation 4520, a second fluid with a second pressure in a second inlet channel may be conveyed to the output port/channel of the fluidic device. At operation 4530, either (a) a first control pressure may be applied to a first control gate to locate a piston of the fluidic device in a first position, in which the piston in the first position inhibits fluid flow in the second inlet of the fluidic device, or (b) a second control pressure may be applied to a second control gate of the piston to locate the piston in a second position, in which the piston in the second position inhibits fluid flow in the first inlet of the fluidic device.

In some examples, the method may further include applying an input signal as the first control pressure to select fluid flow to the output channel from the first inlet channel, in which the first control pressure exceeds the second control pressure. Alternatively, the method may further include applying an input signal as the second control pressure to select fluid flow to the output channel from the second inlet channel, in which the second control pressure exceeds the first control pressure.

The method may further include performing an AND logic operation on two input signals, a first and a second. In some examples, the first inlet channel may receive the first input signal, while the second input signal is applied to the first control gate, as a first control pressure. A low pressure may be applied through the second inlet channel and the second control pressure may receive a preload pressure as a second control pressure. This preload pressure may be arranged to position the piston in the second position absent the first control pressure being sufficient to overcome the preload pressure. A result of the AND logic operation is fluidically communicated (e.g., conveyed) to the output channel of the fluidic device.

The method may further include performing an OR logic operation on two input signals, a first and a second. In this example, the first inlet channel may receive a high pressure; the second inlet channel may receive the first input signal; the second input signal is applied to the first control gate, as a first control pressure; and, the second control pressure receives a preload pressure. This preload pressure may be so arranged to position the piston in the second position absent the first control pressure being sufficient to overcome the preload pressure. A result of the OR logic operation is fluidically communicated to the output channel of the fluidic device.

The method may further include inverting an input signal. This further aspect of the method takes an input signal, e.g., LOGIC 0, and inverts it to LOGIC 1. Alternatively, if the input signal is LOGIC 1, then the result will be LOGIC 0. The result is fluidically communicated (e.g., conveyed) to the output channel of the fluidic device.

Alternatively or additionally, the method may further include conveying a third fluid with a third pressure in a third inlet channel of the fluidic device to a second output channel of the fluidic device; conveying a fourth fluid with a fourth pressure in a fourth inlet channel of the fluidic device to the second output channel; and applying at least one of a third control pressure against a third control gate of a second piston of the fluidic device to locate the second piston in a third position, in which the second piston in the third position inhibits fluid flow in the fourth inlet channel, or a fourth control pressure against a fourth control gate of the second piston of the fluidic device to locate the second piston in a fourth position, in which the second piston in the fourth position inhibits fluid flow in the third inlet channel.

The method may further include performing an XOR operation on a first input signal and a second input signal which may include conveying the inverted first input signal to the third inlet channel, in which the first input signal is conveyed to the fourth inlet channel, in which the second input signal is the third control pressure; and selecting one of (a) conveying the third fluid from the third inlet channel to the second output channel when the third control pressure is sufficient to tend to force the second piston to be in the third position, or (b) conveying the fourth fluid from the fourth inlet channel to the second output channel when the fourth control pressure is sufficient to force the second piston to be in the fourth position.

The method may further include performing an XNOR operation on a first input signal and a second input signal which may include conveying an inverted first input signal to the fourth inlet channel, in which the third control pressure is the second input signal, in which the first input signal is conveyed to the third inlet channel, in which the second input signal is the third control pressure; and selecting one of (a) conveying the third fluid from the third inlet channel to the second output channel when the third control pressure is sufficient to tend to force the second piston to be in the third position, or (b) conveying the fourth fluid from the fourth inlet channel to the second output channel when the fourth control pressure is sufficient to force the second piston to be in the fourth position.

The present application has disclosed fluidic devices, systems of such devices, and methods of controlling these devices. Such fluidic devices and methods may be used to transmit information via fluid flows rather than, or in addition, to electronic signals. Such information may be in the form of data and/or commands. The disclosed devices and methods include performing binary logic operations on at least one input signal. Fluidic systems are also disclosed that act as memories which may be a component in a shift register. Also, fluidic systems capable of adding signals are presented.

Embodiments of the present disclosure may include and/or be implemented in conjunction with various types of artificial reality systems. Artificial reality is a form of reality that has been adjusted in some manner before presentation to a user, which may include, e.g., a virtual reality, an augmented reality, a mixed reality, a hybrid reality, or some combination and/or derivative thereof. Artificial-reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs), an example of which is augmented-reality system 4600 in FIG. 46. Other artificial reality systems may include a NED that also provides visibility into the real world (e.g., augmented-reality system 4700 in FIG. 47) or that visually immerses a user in an artificial reality (e.g., virtual-reality system 4800 in FIG. 48). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 46:
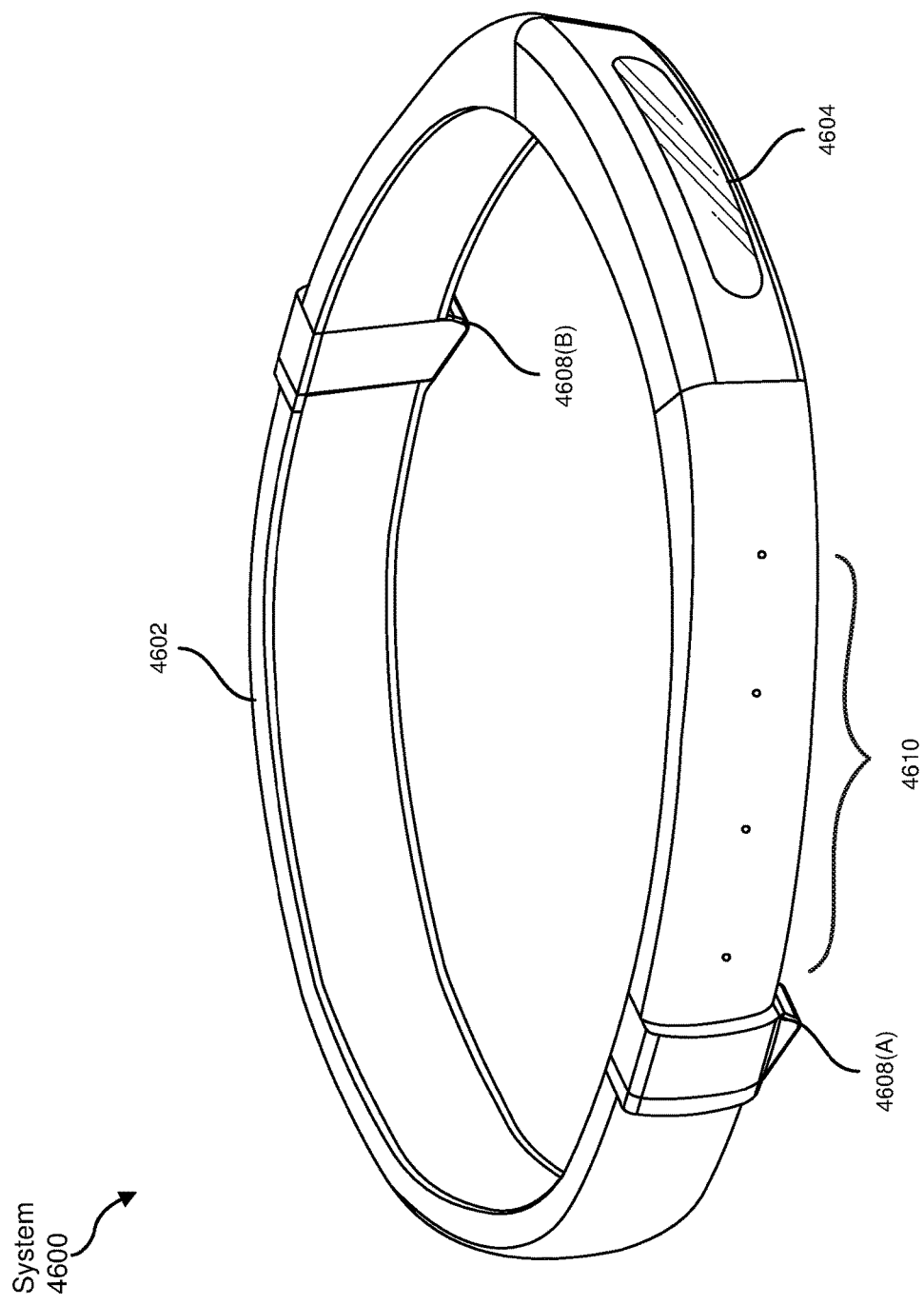
FIG. 46 is an illustration of an example artificial-reality headband that may be used in connection with embodiments of this disclosure.

Turning to FIG. 46, augmented-reality system 4600 generally represents a wearable device dimensioned to fit about a body part (e.g., a head) of a user. As shown in FIG. 46, system 4600 may include a frame 4602 and a camera assembly 4604 that is coupled to frame 4602 and configured to gather information about a local environment by observing the local environment. Augmented-reality system 4600 may also include one or more audio devices, such as output audio transducers 4608(A) and 4608(B) and input audio transducers 4610. Output audio transducers 4608(A) and 4608(B) may provide audio feedback and/or content to a user, and input audio transducers 4610 may capture audio in a user's environment.

As shown, augmented-reality system 4600 may not necessarily include a NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While augmented-reality system 4600 may not include a NED, augmented-reality system 4600 may include other types of screens or visual feedback devices (e.g., a display screen integrated into a side of frame 4602).

Figure 47:
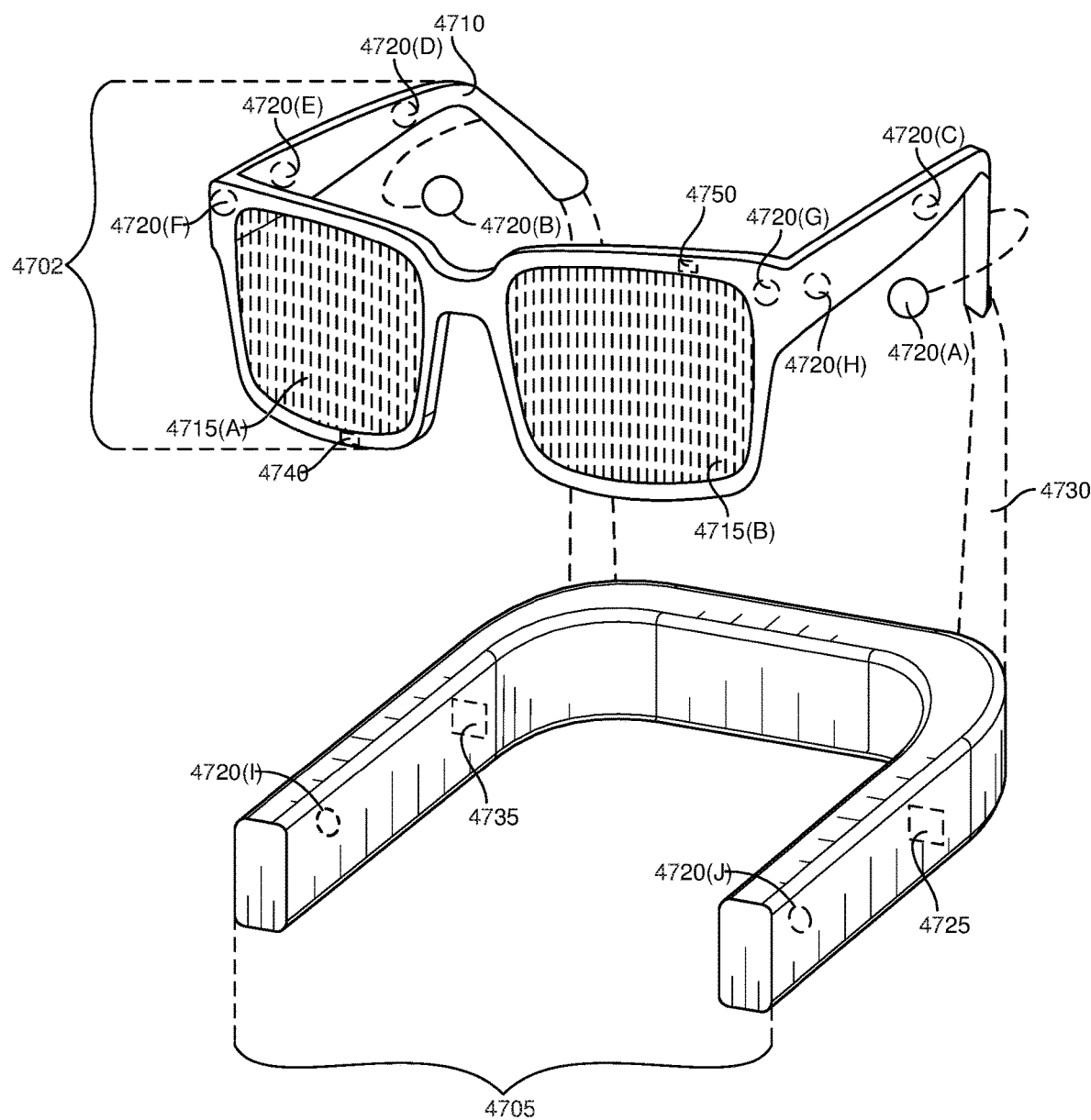
FIG. 47 is an illustration of example augmented-reality glasses that may be used in connection with embodiments of this disclosure.

The embodiments discussed in this disclosure may also be implemented in augmented-reality systems that include one or more NEDs. For example, as shown in FIG. 47, augmented-reality system 4700 may include an eyewear device 4702 with a frame 4710 configured to hold a left display device 4715(A) and a right display device 4715(B) in front of a user's eyes. Display devices 4715(A) and 4715(B) may act together or independently to present an image or series of images to a user. While augmented-reality system 4700 includes two displays, embodiments of this disclosure may be implemented in augmented-reality systems with a single NED or more than two NEDs.

In some embodiments, augmented-reality system 4700 may include one or more sensors, such as sensor 4740. Sensor 4740 may generate measurement signals in response to motion of augmented-reality system 4700 and may be located on substantially any portion of frame 4710. Sensor 4740 may represent a position sensor, an inertial measurement unit (IMU), a depth camera assembly, or any combination thereof. In some embodiments, augmented-reality system 4700 may or may not include sensor 4740 or may include more than one sensor. In embodiments in which sensor 4740 includes an IMU, the IMU may generate calibration data based on measurement signals from sensor 4740. Examples of sensor 4740 may include, without limitation, accelerometers, gyroscopes, magnetometers, other suitable types of sensors that detect motion, sensors used for error correction of the IMU, or some combination thereof. Augmented-reality system 4700 may also include a microphone array with a plurality of acoustic transducers 4720(A)-4720(J), referred to collectively as acoustic transducers 4720. Acoustic transducers 4720 may be transducers that detect air pressure variations induced by sound waves. Each acoustic transducer 4720 may be configured to detect sound and convert the detected sound into an electronic format (e.g., an analog or digital format). The microphone array in FIG. 2 may include, for example, ten acoustic transducers: 47720(A) and 47720(B), which may be designed to be placed inside a corresponding ear of the user, acoustic transducers 4720(C), 4720(D), 4720(E), 4720(F), 4720(G), and 4720(H), which may be positioned at various locations on frame 4710, and/or acoustic transducers 4720(I) and 4720(J), which may be positioned on a corresponding neckband 4705.

In some embodiments, one or more of acoustic transducers 4720(A)-(F) may be used as output transducers (e.g., speakers). For example, acoustic transducers 4720(A) and/or 4720(B) may be earbuds or any other suitable type of headphone or speaker.

The configuration of acoustic transducers 4720 of the microphone array may vary. While augmented-reality system 4700 is shown in FIG. 47 as having ten acoustic transducers 4720, the number of acoustic transducers 4720 may be greater or less than ten. In some embodiments, using higher numbers of acoustic transducers 4720 may increase the amount of audio information collected and/or the sensitivity and accuracy of the audio information. In contrast, using a lower number of acoustic transducers 4720 may decrease the computing power required by the controller 4750 to process the collected audio information. In addition, the position of each acoustic transducer 4720 of the microphone array may vary. For example, the position of an acoustic transducer 4720 may include a defined position on the user, a defined coordinate on frame 4710, an orientation associated with each acoustic transducer, or some combination thereof.

Acoustic transducers 4720(A) and 4720(B) may be positioned on different parts of the user's ear, such as behind the pinna or within the auricle or fossa. Or, there may be additional acoustic transducers on or surrounding the ear in addition to acoustic transducers 4720 inside the ear canal. Having an acoustic transducer positioned next to an ear canal of a user may enable the microphone array to collect information on how sounds arrive at the ear canal. By positioning at least two of acoustic transducers 4720 on either side of a user's head (e.g., as binaural microphones), augmented-reality device 4700 may simulate binaural hearing and capture a 3D stereo sound field around about a user's head. In some embodiments, acoustic transducers 4720(A) and 4720(B) may be connected to augmented-reality system 4700 via a wired connection 4730, and in other embodiments, acoustic transducers 4720(A) and 4720(B) may be connected to augmented-reality system 4700 via a wireless connection (e.g., a Bluetooth connection). In still other embodiments, acoustic transducers 4720(A) and 4720(B) may not be used at all in conjunction with augmented-reality system 4700.

Acoustic transducers 4720 on frame 4710 may be positioned along the length of the temples, across the bridge, above or below display devices 4715(A) and 4715(B), or some combination thereof. Acoustic transducers 4720 may be oriented such that the microphone array is able to detect sounds in a wide range of directions surrounding the user wearing the augmented-reality system 4700. In some embodiments, an optimization process may be performed during manufacturing of augmented-reality system 4700 to determine relative positioning of each acoustic transducer 4720 in the microphone array.

In some examples, augmented-reality system 4700 may include or be connected to an external device (e.g., a paired device), such as neckband 4705. Neckband 4705 generally represents any type or form of paired device. Thus, the following discussion of neckband 4705 may also apply to various other paired devices, such as charging cases, smart watches, smart phones, wrist bands, other wearable devices, hand-held controllers, tablet computers, laptop computers and other external compute devices, etc.

As shown, neckband 4705 may be coupled to eyewear device 4702 via one or more connectors. The connectors may be wired or wireless and may include electrical and/or non-electrical (e.g., structural) components. In some cases, eyewear device 4702 and neckband 4705 may operate independently without any wired or wireless connection between them. While FIG. 47 illustrates the components of eyewear device 4702 and neckband 4705 in example locations on eyewear device 4702 and neckband 4705, the components may be located elsewhere and/or distributed differently on eyewear device 4702 and/or neckband 4705. In some embodiments, the components of eyewear device 4702 and neckband 4705 may be located on one or more additional peripheral devices paired with eyewear device 4702, neckband 4705, or some combination thereof.

Pairing external devices, such as neckband 4705, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 4700 may be provided by a paired device or shared between a paired device and an eyewear device, thus reducing the weight, heat profile, and form factor of the eyewear device overall while still retaining desired functionality. For example, neckband 4705 may allow components that might otherwise be included on an eyewear device to be included in neckband 4705 since users may tolerate a heavier weight load on their shoulders than users would tolerate on their heads. Neckband 4705 may also have a larger surface area over which to diffuse and disperse heat to the ambient environment. Thus, neckband 4705 may allow for greater battery and computation capacity than might otherwise have been possible on a stand-alone eyewear device. Since weight carried in neckband 4705 may be less invasive to a user than weight carried in eyewear device 4702, a user may tolerate wearing a lighter eyewear device and carrying or wearing the paired device for greater lengths of time than a user would tolerate wearing a heavy standalone eyewear device, thereby enabling users to more fully incorporate artificial reality environments into their day-to-day activities.

Neckband 4705 may be communicatively coupled with eyewear device 4702 and/or to other devices. These other devices may provide certain functions (e.g., tracking, localizing, depth mapping, processing, storage, etc.) to augmented-reality system 4700. In the embodiment of FIG. 47, neckband 4705 may include two acoustic transducers (e.g., 4720(I) and 4720(J)) that may be part of the microphone array (or potentially form their own microphone subarray). Neckband 4705 may also include a controller 4725 and a power source 4735.

Acoustic transducers 4720(I) and 4720(J) of neckband 4705 may be configured to detect sound and convert the detected sound into an electronic format (analog or digital). In the embodiment of FIG. 47, acoustic transducers 4720(I) and 4720(J) may be positioned on neckband 4705, thereby increasing the distance between the neckband acoustic transducers 4720(I) and 4720(J) and other acoustic transducers 4720 positioned on eyewear device 4702. In some cases, increasing the distance between acoustic transducers 4720 of the microphone array may improve the accuracy of beamforming performed via the microphone array. For example, if a sound is detected by acoustic transducers 4720(C) and 4720(D) and the distance between acoustic transducers 4720(C) and 4720(D) is greater than, e.g., the distance between acoustic transducers 4720(D) and 4720(E), the determined source location of the detected sound may be more accurate than if the sound had been detected by acoustic transducers 4720(D) and 4720(E).

Controller 4725 of neckband 4705 may process information generated by the sensors on 4705 and/or augmented-reality system 4700. For example, controller 4725 may process information from the microphone array that describes sounds detected by the microphone array. For each detected sound, controller 4725 may perform a direction-of-arrival (DOA) estimation to estimate a direction from which the detected sound arrived at the microphone array. As the microphone array detects sounds, controller 4725 may populate an audio data set with the information. In embodiments in which augmented-reality system 4700 includes an inertial measurement unit, controller 4725 may compute all inertial and spatial calculations from the IMU located on eyewear device 4702. A connector may convey information between augmented-reality system 4700 and neckband 4705 and between augmented-reality system 4700 and controller 4725. The information may be in the form of optical data, electrical data, wireless data, or any other transmittable data form. Moving the processing of information generated by augmented-reality system 4700 to neckband 4705 may reduce weight and heat in eyewear device 4702, making the eyewear more comfortable to the user.

Power source 4735 in neckband 4705 may provide power to eyewear device 4702 and/or to neckband 4705. Power source 4735 may include, without limitation, lithium ion batteries, lithium-polymer batteries, primary lithium batteries, alkaline batteries, or any other form of power storage. In some cases, power source 4735 may be a wired power source. Including power source 4735 on neckband 4705 instead of on eyewear device 4702 may help better distribute the weight and heat generated by power source 4735.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 4800 in FIG. 48, that mostly or completely covers a user's field of view. Virtual-reality system 4800 may include a front rigid body 4802 and a band 4804 shaped to fit around a user's head. Virtual-reality system 4800 may also include output audio transducers 4806(A) and 4806(B). Furthermore, while not shown in FIG. 48, front rigid body 4802 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in augmented-reality system 4800 and/or virtual-reality system 4800 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in augmented-reality system 4700 and/or virtual-reality system 4800 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, augmented-reality system 4600, augmented-reality system 4700, and/or virtual-reality system 4800 may include one or more optical sensors, such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 46 and 48, output audio transducers 4608(A), 4608(B), 4806(A), and 4806(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 4610 may include condenser microphones, dynamic microphones, ribbon microphones, and/or any other type or form of input transducer. In some embodiments, a single transducer may be used for both audio input and audio output.

Figure 48:
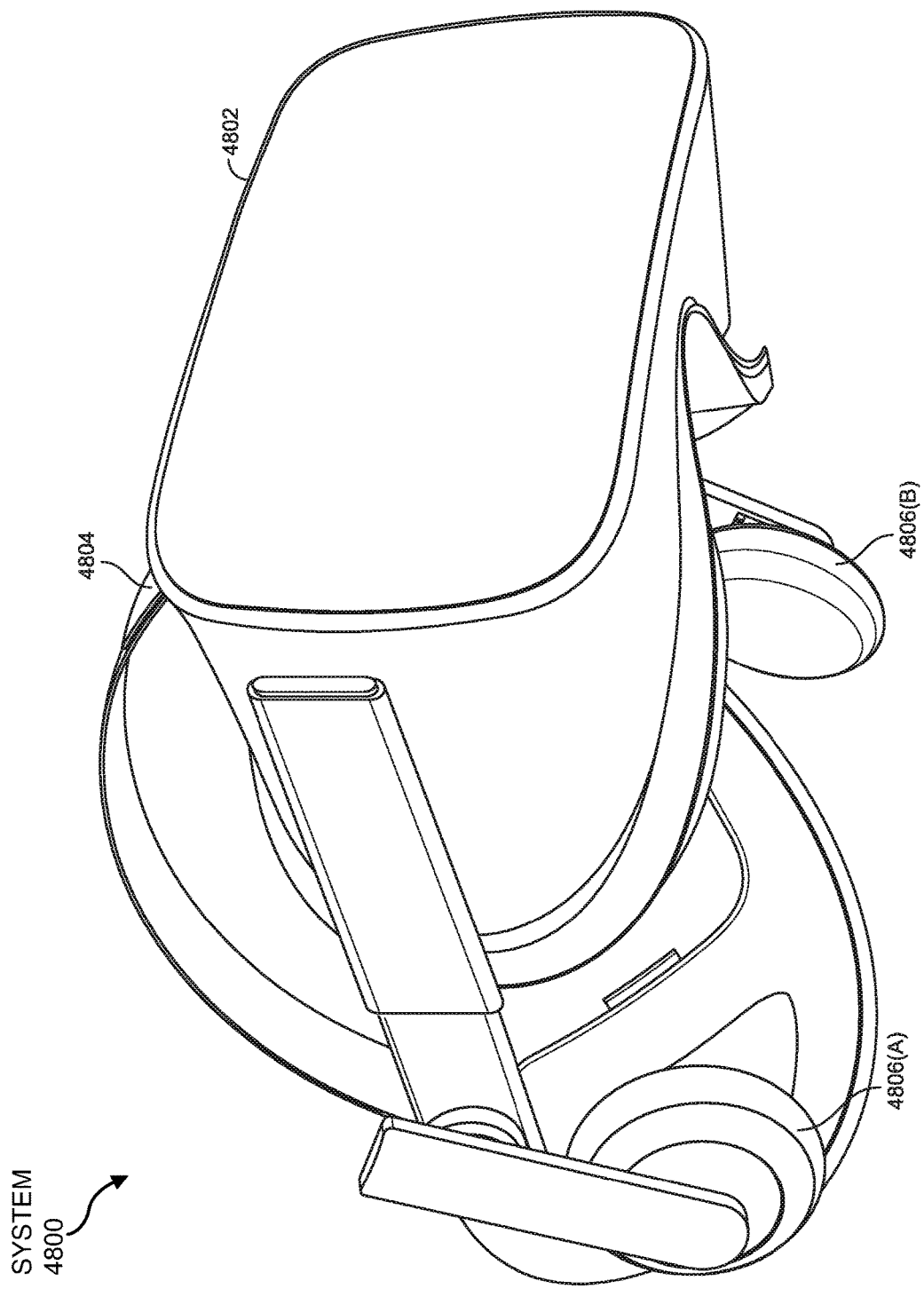
FIG. 48 is an illustration of an example virtual-reality headset that may be used in connection with embodiments of this disclosure.

While not shown in FIGS. 46-48, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

As noted, artificial reality systems 4600, 4700, and 4800 may be used with a variety of other types of devices to provide a more compelling artificial reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 49:
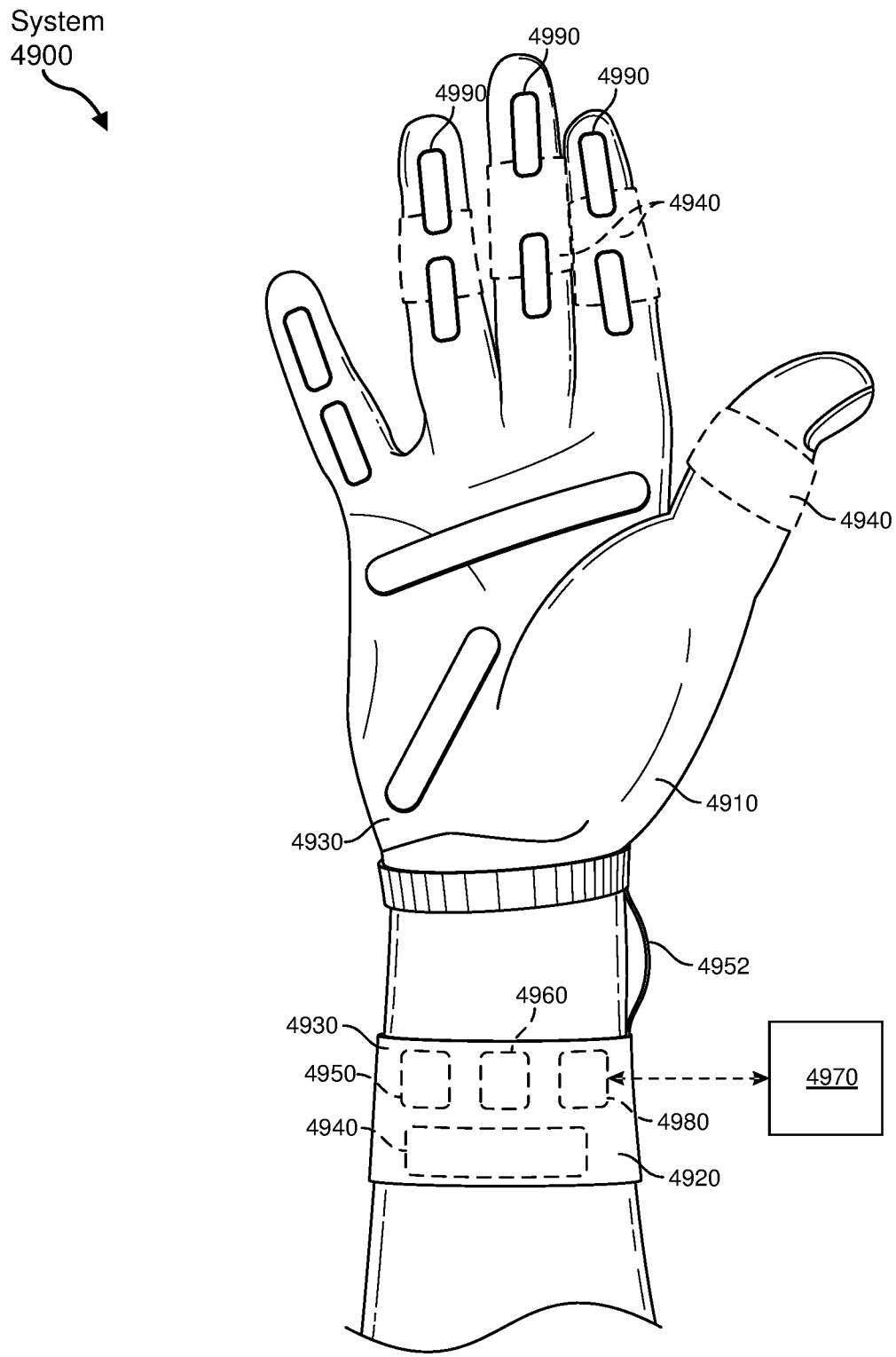
FIG. 49 is an illustration of example haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 49 illustrates a vibrotactile system 4900 in the form of a wearable glove (haptic device 4910) and wristband (haptic device 4920). Haptic device 4910 and haptic device 4920 are shown as examples of wearable devices that include a flexible, wearable textile material 4930 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, nonwoven fabric, leather, cloth, a flexible polymer material, composite materials, etc.

One or more vibrotactile devices 4951 may be positioned at least partially within one or more corresponding pockets formed in textile material 4930 of vibrotactile system 4900. Vibrotactile devices 4951 may be positioned in locations to provide a vibrating sensation (e.g., haptic feedback) to a user of vibrotactile system 4900. For example, vibrotactile devices 4951 may be positioned to be against the user's finger(s), thumb, or wrist, as shown in FIG. 49. Vibrotactile devices 4951 may, in some examples, be sufficiently flexible to conform to or bend with the user's corresponding body part(s).

A power source 4950 (e.g., a battery) for applying a voltage to the vibrotactile devices 4951 for activation thereof may be electrically coupled to vibrotactile devices 4951, such as via conductive wiring 4952. In some examples, each of vibrotactile devices 4951 may be independently electrically coupled to power source 4950 for individual activation. In some embodiments, a processor 4960 may be operatively coupled to power source 4950 and configured (e.g., programmed) to control activation of vibrotactile devices 4951.

Vibrotactile system 4900 may be implemented in a variety of ways. In some examples, vibrotactile system 4900 may be a standalone system with integral subsystems and components for operation independent of other devices and systems. As another example, vibrotactile system 4900 may be configured for interaction with another device or system 4970. For example, vibrotactile system 4900 may, in some examples, include a communications interface 4980 for receiving and/or sending signals to the other device or system 4970. The other device or system 4970 may be a mobile device, a gaming console, an artificial reality (e.g., virtual reality, augmented reality, mixed reality) device, a personal computer, a tablet computer, a network device (e.g., a modem, a router, etc.), a handheld controller, etc. Communications interface 4980 may enable communications between vibrotactile system 4900 and the other device or system 4970 via a wireless (e.g., Wi-Fi, Bluetooth, cellular, radio, etc.) link or a wired link. If present, communications interface 4980 may be in communication with processor 4960, such as to provide a signal to processor 4960 to activate or deactivate one or more of the vibrotactile devices 4951.

Vibrotactile system 4900 may optionally include other subsystems and components, such as touch-sensitive pads 4990, pressure sensors, motion sensors, position sensors, lighting elements, and/or user interface elements (e.g., an on/off button, a vibration control element, etc.). During use, vibrotactile devices 4951 may be configured to be activated for a variety of different reasons, such as in response to the user's interaction with user interface elements, a signal from the motion or position sensors, a signal from the touch-sensitive pads 4990, a signal from the pressure sensors, a signal from the other device or system 4970, etc.

Although power source 4950, processor 4960, and communications interface 4980 are illustrated in FIG. 49 as being positioned in haptic device 4920, the present disclosure is not so limited. For example, one or more of power source 4950, processor 4960, or communications interface 4980 may be positioned within haptic device 4910 or within another wearable textile.

Figure 50:
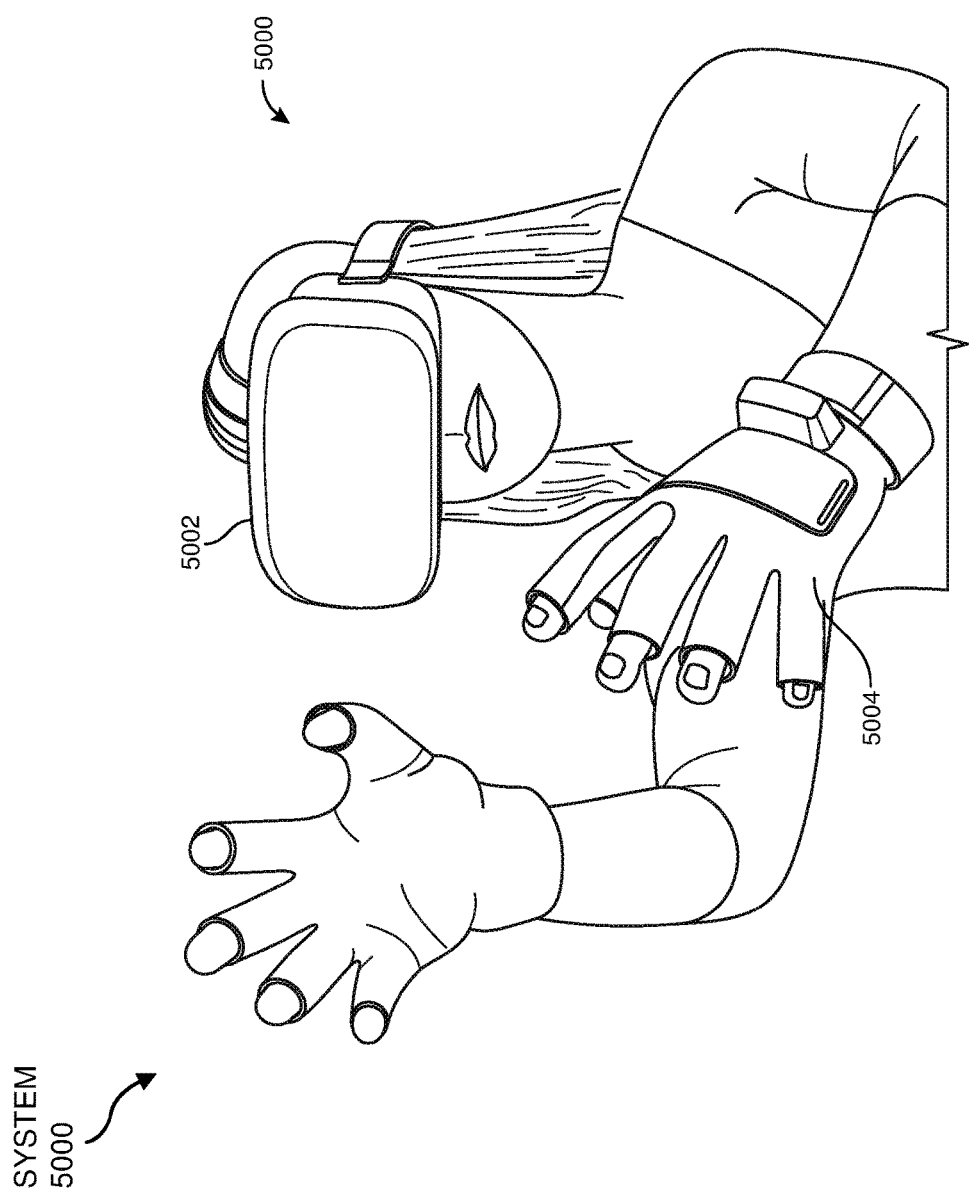
FIG. 50 is an illustration of an example virtual-reality environment according to embodiments of this disclosure.

Haptic wearables, such as those shown in and described in connection with FIG. 49, may be implemented in a variety of types of artificial-reality systems and environments. FIG. 50 shows an example artificial reality environment 5000 including one head-mounted virtual-reality display and two haptic devices (i.e., gloves), and in other embodiments any number and/or combination of these components and other components may be included in an artificial reality system. For example, in some embodiments there may be multiple head-mounted displays each having an associated haptic device, with each head-mounted display and each haptic device communicating with the same console, portable computing device, or other computing system.

Head-mounted display 5002 generally represents any type or form of virtual-reality system, such as virtual-reality system 4800 in FIG. 48. Haptic device 5004 generally represents any type or form of wearable device, worn by a use of an artificial reality system, that provides haptic feedback to the user to give the user the perception that he or she is physically engaging with a virtual object. In some embodiments, haptic device 5004 may provide haptic feedback by applying vibration, motion, and/or force to the user. For example, haptic device 5004 may limit or augment a user's movement. To give a specific example, haptic device 5004 may limit a user's hand from moving forward so that the user has the perception that his or her hand has come in physical contact with a virtual wall. In this specific example, one or more actuators within the haptic advice may achieve the physical-movement restriction by pumping fluid into an inflatable bladder of the haptic device. In some examples, a user may also use haptic device 5004 to send action requests to a console. Examples of action requests include, without limitation, requests to start an application and/or end the application and/or requests to perform a particular action within the application.

Figure 51:
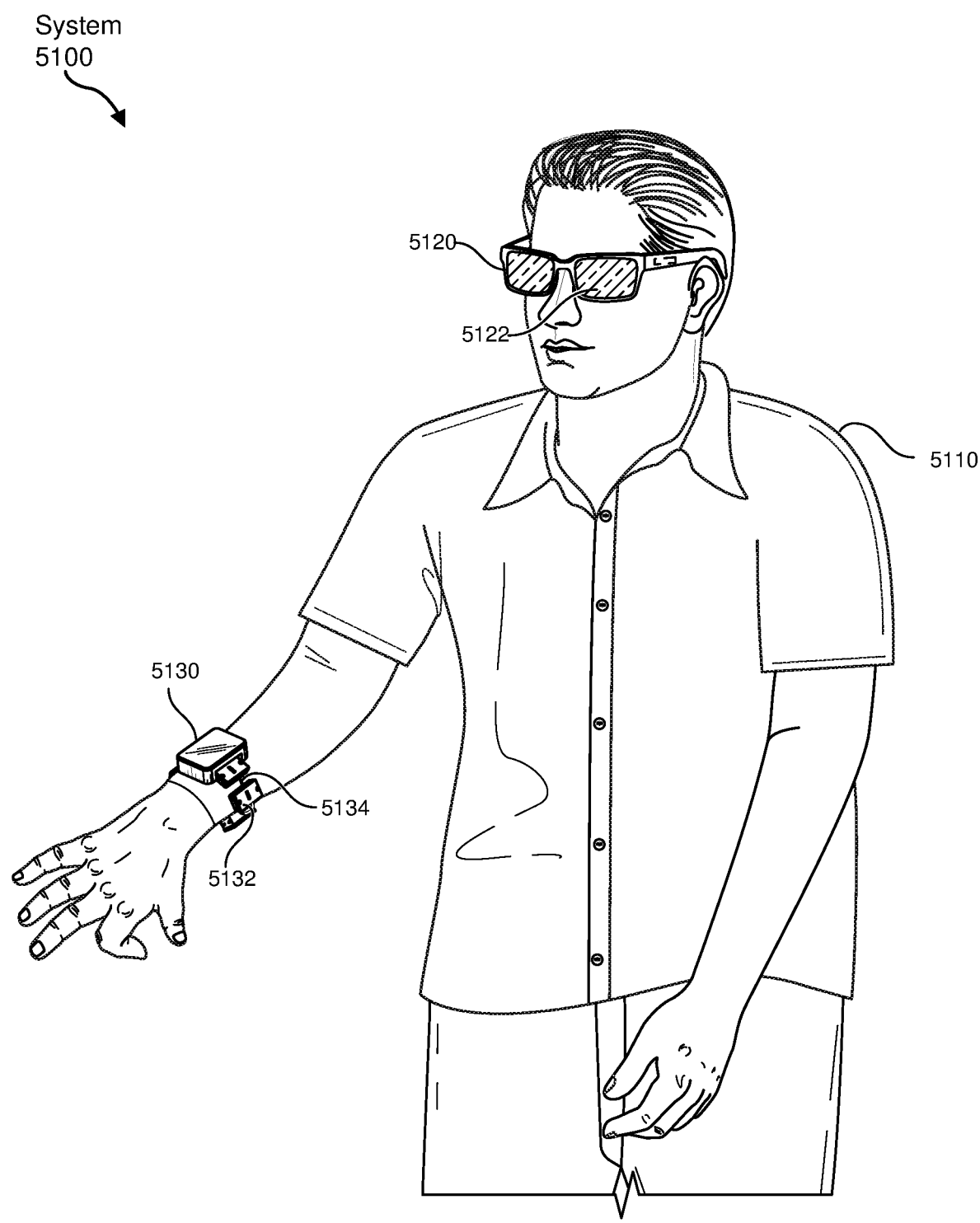
FIG. 51 is an illustration of an example augmented-reality environment according to embodiments of this disclosure.

While haptic interfaces may be used with virtual-reality systems, as shown in FIG. 50, haptic interfaces may also be used with augmented-reality systems, as shown in FIG. 51. FIG. 51 is a perspective view a user 5110 interacting with an augmented-reality system 5100. In this example, user 5110 may wear a pair of augmented-reality glasses 5120 that have one or more displays 5122 and that are paired with a haptic device 5130. Haptic device 5130 may be a wristband that includes a plurality of band elements 5132 and a tensioning mechanism 5134 that connects band elements 5132 to one another.

One or more of band elements 5132 may include any type or form of actuator suitable for providing haptic feedback. For example, one or more of band elements 5132 may be configured to provide one or more of various types of cutaneous feedback, including vibration, force, traction, texture, and/or temperature. To provide such feedback, band elements 5132 may include one or more of various types of actuators. In one example, each of band elements 5132 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 4910, 4920, 5004, and 5130 may include any suitable number and/or type of haptic transducer, sensor, and/or feedback mechanism. For example, haptic devices 4910, 4920, 5004, and 5130 may include one or more mechanical transducers, piezoelectric transducers, and/or fluidic transducers. Haptic devices 4910, 4920, 5004, and 5130 may also include various combinations of different types and forms of transducers that work together or independently to enhance a user's artificial-reality experience. In one example, each of band elements 5132 of haptic device 5130 may include a vibrotactor (e.g., a vibrotactile actuator)

configured to vibrate in unison or independently to provide one or more of various types of haptic sensations to a user.

Embodiments of the present disclosure may include or be implemented in conjunction with an artificial reality system. Artificial reality is a form of reality that has been adjusted in some manner before presentation to a user, which may include, e.g., a virtual reality, an augmented reality, a mixed reality, a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

By way of example and not limitation, example embodiments of the present disclosure include the following:

Example 1: A fluidic device, the device including: a first inlet channel configured to convey a first fluid exhibiting a first pressure into the fluidic device; a second inlet channel configured to convey a second fluid exhibiting a second pressure into the fluidic device; an output channel that is configured to convey one of the first fluid or the second fluid out of the fluidic device; and a piston that is movable between a first position that inhibits fluid flow through the second inlet channel to the output channel and a second position that inhibits fluid flow through the first inlet channel to the output channel, wherein movement of the piston between the first and second positions is determined by a difference between a first control pressure applied against a first control gate of the piston and a second control pressure applied against a second control gate.

Example 2: The fluidic device of example 1, wherein: the first control gate includes a first surface area configured to interface with the first control pressure that, when applied to the first surface area, forces the piston towards the first position, allowing the first inlet channel to convey the first fluid to the output channel and inhibiting fluid flow in the second inlet channel; and the second control gate includes a second surface area configured to interface with the second control pressure that, when applied to the second surface area, forces the piston towards the second position, allowing the second inlet channel to convey the second fluid to the output channel and inhibiting fluid flow in the first inlet channel.

Example 3: The fluidic device of example 2, wherein the first surface area is larger than the second surface area and the second control pressure is a preload pressure configured to position the piston in the second position absent the first control pressure being sufficiently high to overcome the preload pressure.

Example 4: The fluidic device of example 2, wherein the fluidic device is a complementary fluidistor ("cFET"), and a fluidic system includes: the cFET; and an additional cFET including: a third inlet channel configured to convey a third fluid to a second output channel; a fourth inlet channel configured to convey a fourth fluid to the second output channel; and a second piston coupled to a third control gate and a fourth control gate, wherein the second piston is movable between a third position that inhibits fluid flow in the fourth inlet channel to the second output channel and a fourth position that inhibits fluid flow from the third inlet channel to the second output channel, wherein the movement of the second piston between the third and fourth positions is determined by a difference between a third control pressure applied against the third control gate and a fourth control pressure applied against the fourth control gate, wherein the third control gate includes a third surface area configured to interface with the third control pressure that, when applied to the third surface area, forces the second piston towards the third position, wherein the fourth control gate includes a fourth surface area configured to interface with a fourth control pressure that, when applied to the fourth surface area, forces the second piston towards the fourth position, and wherein the output channel is configured to convey at least one of the first fluid or the second fluid to one of the third inlet channel, the fourth inlet channel, the third control gate, or the fourth control gate.

Example 5: A fluidic logic-gate system including: a plurality of fluidically interconnected complementary fluidistors ("cFETs"), each cFET including: a first inlet channel configured to convey fluid flow to an output channel; a second inlet channel configured to convey fluid flow to the output channel; and a piston that is movable between a first position that inhibits fluid flow through the second inlet channel and a second position that inhibits fluid flow through the first inlet channel, wherein movement of the piston between the first and second positions is determined by a difference between a first control pressure applied against a first surface area of a first control gate of the piston and a second control pressure applied against a second surface area of a second control gate of the piston.

Example 6: The fluidic logic-gate system of example 5, wherein each piston of each cFET of the plurality of cFETs further includes: a first restricting gate transmission element of the first control gate configured to inhibit fluid flow through the first inlet channel when the piston is in the second position; and a second restricting gate transmission element of the second control gate configured to inhibit fluid flow through the second inlet channel when the piston is in the first position.

Example 7: The fluidic logic-gate system of example 6, wherein the logic-gate system further includes: a set of cFETs including a first cFET, a second cFET, and a third cFET, wherein the first surface area of each cFET of the set of cFETs is larger than the second surface area of that cFET and the second control pressure is a preload pressure configured to position the piston in the second position absent the first control pressure being sufficiently high to overcome the preload pressure; a fourth cFET, wherein the first surface area of the fourth cFET is smaller than the second surface area of the fourth cFET and the first control pressure is a preload pressure configured to position the piston in the first position absent the second control pressure being sufficiently high to overcome the preload pressure; the fluidic logic-gate system is configured to transfer a first input signal to the output channel of the second cFET resulting from a second input signal transiting from low pressure to high pressure, wherein the first inlet channel of the first cFET is configured to receive the first input signal, wherein the first inlet channel of the second cFET and the first inlet channel of the third cFET are each configured to receive high pressure, wherein the first control gate of the first cFET and the second control gate of the fourth cFET are each configured to receive the second input signal, wherein the second inlet channel of the second cFET and the second inlet channel of the third cFET each are configured to receive low pressure, wherein the first control gate of the second cFET is configured to receive fluid flow from the output channel of the first cFET, and wherein the second inlet channel of the first cFET and first inlet channel of the fourth cFET are each configured to receive fluid flow from the output channel of the second cFET; and the fluidic logic-gate system is further configured to convey the first input signal from the output channel of the second cFET to the output channel of the third cFET resulting from the second input signal transiting from high pressure to low pressure, wherein the first control gate of the third cFET is configured to receive fluid flow from the output channel of the fourth cFET; and wherein the second inlet channel of the fourth cFET is configured to be in fluidic communication with the output channel of the third cFET.

Example 8: The fluidic logic-gate system of example 6, wherein the logic-gate system further includes: a set of cFETs of the plurality of cFETs includes: a first cFET, a second cFET, a third cFET, a fourth cFET, a fifth cFET, a sixth cFET, and a seventh cFET; wherein: the first cFET and the second cFET are configured to form a first XOR logic gate to perform a first XOR logic operation on a first input signal and a second input signal with a result of the first XOR logic operation conveyed to the output channel of the second cFET; the third cFET and the fourth cFET are configured to form a second XOR logic gate to perform a second XOR logic operation on the result of the first XOR logic operation with a third input signal yielding a result that is conveyed to the output channel of the fourth cFET, the result being the sum of the first, second, and third input signals; the fifth cFET is configured to form a first AND logic gate to perform a first AND logic operation on the third input signal and the result of the first XOR logic operation yielding a result of the first AND logic operation that is conveyed to the output channel of the fifth cFET; the sixth cFET is configured to form a second AND logic gate to perform a second AND logic operation with the first and second input signals yielding a result of the second AND logic operation that is conveyed to the output channel of the sixth cFET; and the seventh cFET is configured to form an OR logic gate to perform an OR logic operation on the result of the first AND logic operation with the result of the second AND logic operation yielding a result that is an excess carry bit.

Example 9: The fluidic logic-gate system of example 8, wherein: the first inlet channel of the first cFET is configured to receive low pressure; the second inlet channel of the first cFET is configured to receive high pressure; the first inlet channel of the second cFET is configured to receive fluid flow from the output channel of the first cFET; the first control pressure applied to the second cFET is the first input signal; the second inlet channel of the second cFET is configured to receive the second input signal; the first control pressure applied to the first cFET is the second input signal; and the second control pressures of the first and second cFETs are preload pressures configured to position each respective piston in the respective second position absent the first control pressures of each of the first and second cFETs being sufficiently high to overcome their respective preload pressures.

Example 10: The fluidic logic-gate system of example 9, wherein: the first inlet channel of the third cFET is configured to receive high pressure; the second inlet channel of the third cFET is configured to receive low pressure; the first inlet channel of the fourth cFET is configured to receive fluid flow from the second input signal; the second inlet channel of the fourth cFET is configured to receive fluid flow from the output channel of the third cFET; the second control pressure applied to the third cFET is the third input signal; the second control pressure applied to the fourth cFET is from the output channel of the second cFET; and the first control pressures applied to the third and fourth cFETs are preload pressures configured to position each respective piston of the third and fourth cFETs in their respective first positions absent the second control pressures of the third and fourth cFETs being each respectively sufficiently high to overcome their respective preload pressures.

Example 11: The fluidic logic-gate system of example 10, wherein: the first inlet channel of the fifth cFET is configured to receive the third input signal; the first control pressure applied to the fifth cFET originates from the output channel of the second cFET; the second inlet channel of the fifth cFET is configured to receive low pressure; and the second control pressure applied to the fifth cFET is a preload pressure configured to position the piston in the second position absent the first control pressure being sufficiently high to overcome the preload pressure.

Example 12: The fluidic logic-gate system of example 11, wherein: the first inlet channel of the sixth cFET is configured to receive the first input signal; the first control pressure applied to the sixth cFET is the second input signal; the second inlet channel of the sixth cFET is configured to receive low pressure; and the second control pressure applied to the sixth cFET is a preload pressure configured to position the piston in the second position absent the first control pressure being sufficiently high to overcome the preload pressure.

Example 13: The fluidic logic-gate system of example 12, wherein: the first inlet channel of the seventh cFET is configured to receive high pressure; the second inlet channel of the seventh cFET is configured to receive fluid flow from the output channel of the sixth cFET; the first control pressure applied to the seventh cFET is from the output channel of the fifth cFET; and the second control pressure applied to the seventh cFET is a preload pressure configured to position the piston in the second position absent the first control pressure being sufficiently high to overcome the preload pressure.

Example 14: A method to manipulate fluid flows in a fluidic device including: conveying a first fluid with a first pressure in a first inlet channel of the fluidic device to an output channel of the fluidic device; conveying a second fluid with a second pressure in a second inlet channel of the fluidic device to the output channel; and applying at least one of: (a) a first control pressure against a first control gate of a piston of the fluidic device to locate the piston in a first position, wherein the piston in the first position inhibits fluid flow in the second inlet channel; or (b) a second control pressure against a second control gate of the piston of the fluidic device to locate the piston in a second position, wherein the piston in the second position inhibits fluid flow in the first inlet channel.

Example 15: The method of example 14 further including: performing, by the fluidic device, an AND logic operation between a first input signal and a second input signal, wherein the first pressure is the first input signal, wherein the second pressure is a low pressure, wherein the first control pressure is the second input signal, and wherein the second control pressure is a preload pressure, the preload pressure configured to position the piston in the second position absent the first control pressure being sufficient to overcome the preload pressure; and conveying a result of the AND logic operation to the output channel.

Example 16: The method of example 14 further including: performing, by the fluidic device, an OR logic operation between a first input signal and a second input signal, wherein the first pressure is a high pressure, wherein the second pressure is the first input signal, wherein the first control pressure is the second input signal, and wherein the second control pressure receives a preload pressure, the preload pressure configured to position the piston in the second position absent the first control pressure being sufficient to overcome the preload pressure; and conveying a result of the OR logic operation to the output channel.

Example 17: The method of example 14 further including: inverting an input signal into an inverted input signal, wherein the first pressure is a low pressure, wherein the second pressure is a high pressure, and wherein the first control pressure is the input signal; and conveying the inverted input signal to the output channel.

Example 18: The method of example 17 further including: conveying a third fluid with a third pressure in a third inlet channel of the fluidic device to a second output channel of the fluidic device; conveying a fourth fluid with a fourth pressure in a fourth inlet channel of the fluidic device to the second output channel; and applying at least one of: (a) a third control pressure against a third control gate of a second piston of the fluidic device to locate the second piston in a third position, wherein the second piston in the third position inhibits fluid flow in the fourth inlet channel, or (b) a fourth control pressure against a fourth control gate of the second piston of the fluidic device to locate the second piston in a fourth position, wherein the second piston in the fourth position inhibits fluid flow in the third inlet channel.

Example 19: The method of example 18 further including: performing an XOR logic operation by the fluidic device between the input signal and a second input signal by applying one of: (a) conveying the third fluid from the third inlet channel to the second output channel when the third control pressure is sufficient to force the second piston to be in the third position, or (b) conveying the fourth fluid from the fourth inlet channel to the second output channel when the fourth control pressure is sufficient to force the second piston to be in the fourth position, wherein the third control pressure is the second input signal, wherein the input signal is conveyed to the fourth inlet channel, and wherein the inverted input signal is conveyed to the third inlet channel.

Example 20: The method of example 18 further including: performing an XNOR logic operation by the fluidic device between the input signal and a second input signal by applying one of: (a) conveying the third fluid from the third inlet channel to the second output channel when the third control pressure is sufficient to force the second piston to be in the third position, or (b) conveying the fourth fluid from the fourth inlet channel to the second output channel when the fourth control pressure is sufficient to force the second piston to be in the fourth position, wherein the third control pressure is the second input signal, wherein the input signal is conveyed to the third inlet channel, and wherein the inverted input signal is conveyed to the fourth inlet channel.

The process parameters and sequence of the steps described and/or illustrated herein are given by way of example only and may be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations may be possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:
1. A fluidic device, the device comprising:
   a first complementary fluidistor ("cFET"), comprising:
      a first inlet channel configured to convey a first fluid into first cFET;
      a second inlet channel configured to convey a second fluid into the first cFET;
      at least one first output channel that is configured to convey one of the first fluid or the second fluid out of the first cFET; and
      a first piston that is movable between a first position that inhibits fluid flow through the second inlet channel to the at least one first output channel and a second position that inhibits fluid flow through the first inlet channel to the at least one first output channel, wherein movement of the first piston between the first and second positions is determined by a difference between a first control pressure applied against a first control gate of the first piston and a second control pressure applied against a second control gate of the first piston; and
   a second cFET fluidically coupled to the at least one first outlet of the first cFET, the second cFET comprising:
      a third inlet channel configured to convey a third fluid into the second cFET;
      a fourth inlet channel configured to convey a fourth fluid into the second cFET;
      at least one second output channel that is configured to convey one of the third fluid or the fourth fluid out of the second cFET; and
      a second piston coupled to a third control gate and a fourth control gate, wherein the second piston is movable between a third position that inhibits fluid flow from the fourth inlet channel to the at least one second output channel and a fourth position that inhibits fluid flow from the third inlet channel to the at least one second output channel, wherein the movement of the second piston between the third and fourth positions is determined by a difference between a third control pressure applied against the third control gate and a fourth control pressure applied against the fourth control gate.

2. The fluidic device of claim 1, wherein:
the first control gate comprises a first surface area configured to interface with the first control pressure that, when applied to the first surface area, forces the first piston towards the first position, allowing the first inlet channel to convey the first fluid to the at least one first output channel and inhibiting fluid flow in the second inlet channel; and
the second control gate comprises a second surface area configured to interface with the second control pressure that, when applied to the second surface area, forces the first piston towards the second position, allowing the second inlet channel to convey the second fluid to the at least one first output channel and inhibiting fluid flow in the first inlet channel.

3. The fluidic device of claim 2, wherein the first surface area is different from the second surface area and the second control pressure is a preload pressure configured to position the piston in the second position absent the first control pressure being sufficiently high to overcome the preload pressure.

4. The fluidic device of claim 2, wherein:
the third control gate comprises a third surface area configured to interface with the third control pressure that, when applied to the third surface area, forces the second piston towards the third position;
the fourth control gate comprises a fourth surface area configured to interface with a fourth control pressure that, when applied to the fourth surface area, forces the second piston towards the fourth position; and
the at least one first output channel is configured to convey at least one of the first fluid or the second fluid to at least one of: the third inlet channel, the fourth inlet channel, the third control gate, or the fourth control gate.

5. A fluidic logic-gate system comprising:
a plurality of fluidically interconnected complementary fluidistors ("cFETs"), each cFET comprising:
a first inlet channel configured to convey fluid flow to an output channel;
a second inlet channel configured to convey fluid flow to the output channel; and
a piston that is movable between a first position that inhibits fluid flow through the second inlet channel and a second position that inhibits fluid flow through the first inlet channel, wherein movement of the piston between the first and second positions is determined by a difference between a first control pressure applied against a first surface area of a first control gate of the piston and a second control pressure applied against a second surface area of a second control gate of the piston.

6. The fluidic logic-gate system of claim 5,
wherein each piston of each cFET of the plurality of cFETs further comprises:
a first restricting gate transmission element of the first control gate configured to inhibit fluid flow through the first inlet channel when the piston is in the second position; and
a second restricting gate transmission element of the second control gate configured to inhibit fluid flow through the second inlet channel when the piston is in the first position.

7. The fluidic logic-gate system of claim 6, wherein the fluidic logic-gate system further comprises:
a set of cFETs comprising a first cFET, a second cFET, and a third cFET, wherein the first surface area of each cFET of the set of cFETs is larger than the second surface area of that cFET and the second control pressure is a preload pressure configured to position the piston in the second position absent the first control pressure being sufficiently high to overcome the preload pressure;
a fourth cFET, wherein the first surface area of the fourth cFET is smaller than the second surface area of the fourth cFET and the first control pressure is a preload pressure configured to position the piston in the first position absent the second control pressure being sufficiently high to overcome the preload pressure;
the fluidic logic-gate system is configured to transfer a first input signal to the output channel of the second cFET resulting from a second input signal transiting from low pressure to high pressure,
wherein the first inlet channel of the first cFET is configured to receive the first input signal,
wherein the first inlet channel of the second cFET and the first inlet channel of the third cFET are each configured to receive high pressure,
wherein the first control gate of the first cFET and the second control gate of the fourth cFET are each configured to receive the second input signal,
wherein the second inlet channel of the second cFET and the second inlet channel of the third cFET each are configured to receive low pressure,
wherein the first control gate of the second cFET is configured to receive fluid flow from the output channel of the first cFET, and
wherein the second inlet channel of the first cFET and first inlet channel of the fourth cFET are each configured to receive fluid flow from the output channel of the second cFET; and
the fluidic logic-gate system is further configured to convey the first input signal from the output channel of the second cFET to the output channel of the third cFET resulting from the second input signal transiting from high pressure to low pressure,
wherein the first control gate of the third cFET is configured to receive fluid flow from the output channel of the fourth cFET, and
wherein the second inlet channel of the fourth cFET is configured to be in fluidic communication with the output channel of the third cFET.

8. The fluidic logic-gate system of claim 6, wherein the fluidic logic-gate system further comprises:
a set of cFETs of the plurality of cFETs comprises: a first cFET, a second cFET, a third cFET, a fourth cFET, a fifth cFET, a sixth cFET, and a seventh cFET; wherein:
the first cFET and the second cFET are configured to form a first XOR logic gate to perform a first XOR logic operation on a first input signal and a second input signal with a result of the first XOR logic operation conveyed to the output channel of the second cFET;
the third cFET and the fourth cFET are configured to form a second XOR logic gate to perform a second XOR logic operation on the result of the first XOR logic operation with a third input signal yielding a result that is conveyed to the output channel of the fourth cFET, the result being the sum of the first, second, and third input signals;
the fifth cFET is configured to form a first AND logic gate to perform a first AND logic operation on the third input signal and the result of the first XOR logic operation yielding a result of the first AND logic operation that is conveyed to the output channel of the fifth cFET;

the sixth cFET is configured to form a second AND logic gate to perform a second AND logic operation with the first and second input signals yielding a result of the second AND logic operation that is conveyed to the output channel of the sixth cFET; and the seventh cFET is configured to form an OR logic gate to perform an OR logic operation on the result of the first AND logic operation with the result of the second AND logic operation yielding a result that is an excess carry bit.

9. The fluidic logic-gate system of claim 8, wherein:
the first inlet channel of the first cFET is configured to receive low pressure;
the second inlet channel of the first cFET is configured to receive high pressure;
the first inlet channel of the second cFET is configured to receive fluid flow from the output channel of the first cFET;
the first control pressure applied to the second cFET is the first input signal;
the second inlet channel of the second cFET is configured to receive the second input signal;
the first control pressure applied to the first cFET is the second input signal; and
the second control pressures of the first and second cFETs are preload pressures configured to position each respective piston in the respective second position absent the first control pressures of each of the first and second cFETs being sufficiently high to overcome their respective preload pressures.

10. The fluidic logic-gate system of claim 9, wherein:
the first inlet channel of the third cFET is configured to receive high pressure;
the second inlet channel of the third cFET is configured to receive low pressure;
the first inlet channel of the fourth cFET is configured to receive fluid flow from the second input signal;
the second inlet channel of the fourth cFET is configured to receive fluid flow from the output channel of the third cFET;
the second control pressure applied to the third cFET is the third input signal;
the second control pressure applied to the fourth cFET is from the output channel of the second cFET; and
the first control pressures applied to the third and fourth cFETs are preload pressures configured to position each respective piston of the third and fourth cFETs in their respective first positions absent the second control pressures of the third and fourth cFETs being each respectively sufficiently high to overcome their respective preload pressures.

11. The fluidic logic-gate system of claim 10, wherein:
the first inlet channel of the fifth cFET is configured to receive the third input signal;
the first control pressure applied to the fifth cFET originates from the output channel of the second cFET;
the second inlet channel of the fifth cFET is configured to receive low pressure; and
the second control pressure applied to the fifth cFET is a preload pressure configured to position the piston in the second position absent the first control pressure being sufficiently high to overcome the preload pressure.

12. The fluidic logic-gate system of claim 11, wherein:
the first inlet channel of the sixth cFET is configured to receive the first input signal;
the first control pressure applied to the sixth cFET is the second input signal;
the second inlet channel of the sixth cFET is configured to receive low pressure; and
the second control pressure applied to the sixth cFET is a preload pressure configured to position the piston in the second position absent the first control pressure being sufficiently high to overcome the preload pressure.

13. The fluidic logic-gate system of claim 12, wherein:
the first inlet channel of the seventh cFET is configured to receive high pressure;
the second inlet channel of the seventh cFET is configured to receive fluid flow from the output channel of the sixth cFET;
the first control pressure applied to the seventh cFET is from the output channel of the fifth cFET; and
the second control pressure applied to the seventh cFET is a preload pressure configured to position the piston in the second position absent the first control pressure being sufficiently high to overcome the preload pressure.

14. A method to manipulate fluid flows in a fluidic device, the method comprising:
conveying a first fluid with a first pressure in a first inlet channel a first complementary fluidistor ("cFET") to an output channel of first cFET;
conveying a second fluid with a second pressure in a second inlet channel of the first cFET to the output channel;
applying at least one of:
(a) a first control pressure against a first control gate of a piston of the first cFET to locate the piston in a first position, wherein the piston in the first position inhibits fluid flow in the second inlet channel; or
(b) a second control pressure against a second control gate of the piston of the first cFET to locate the piston in a second position, wherein the piston in the second position inhibits fluid flow in the first inlet channel; and
conveying the first fluid from the first inlet channel or the second fluid from the second inlet channel through the outlet channel of the first cFET to at least one of: a third inlet channel, a fourth inlet channel, a third control gate, or a fourth control gate of a second cFET.

15. The method of claim 14, the method further comprising:
performing, by the fluidic device, an AND logic operation between a first input signal and a second input signal, wherein the first pressure is the first input signal, wherein the second pressure is a low pressure, wherein the first control pressure is the second input signal, and wherein the second control pressure is a preload pressure, the preload pressure configured to position the piston in the second position absent the first control pressure being sufficient to overcome the preload pressure; and
conveying a result of the AND logic operation to the output channel.

16. The method of claim 14, the method further comprising:
performing, by the fluidic device, an OR logic operation between a first input signal and a second input signal, wherein the first pressure is a high pressure,
wherein the second pressure is the first input signal,
wherein the first control pressure is the second input signal, and
wherein the second control pressure receives a preload pressure, the preload pressure configured to position the piston in the second position absent the first control pressure being sufficient to overcome the preload pressure; and
conveying a result of the OR logic operation to the output channel.

17. The method of claim 14, the method further comprising:
inverting an input signal into an inverted input signal,
wherein the first pressure is a low pressure,
wherein the second pressure is a high pressure, and
wherein the first control pressure is the input signal; and
conveying the inverted input signal to the output channel.

18. The method of claim 14, wherein the method further comprises:
conveying a third fluid in the third inlet channel of the second cFET to an output channel of the second cFET;
conveying a fourth fluid in a fourth inlet channel of the second cFET to the output channel of the second cFET; and
applying at least one of:
(a) a third control pressure against the third control gate of a piston of the second cFET to locate the piston of the second cFET in a third position, wherein the piston of the second cFET in the third position inhibits fluid flow in the fourth inlet channel, or
(b) a fourth control pressure against the fourth control gate of the piston of the second cFET to locate the piston of the second cFET in a fourth position, wherein the piston of the second cFET in the fourth position inhibits fluid flow in the third inlet channel.

19. The method of claim 14, the method further comprising:
performing an XOR logic operation by the fluidic device between first input signal and a second input signal by conveying one of:
(a) the third fluid from the third inlet channel to the output channel of the second cFET when the third control pressure is sufficient to force the piston of the second cFET to be in the third position, or
(b) the fourth fluid from the fourth inlet channel to the output channel of the second cFET when the fourth control pressure is sufficient to force the piston of the second cFET to be in the fourth position,
wherein the third control pressure is the second input signal,
wherein the first input signal is conveyed to the fourth inlet channel, and
wherein an inverted first input signal from the first cFET is conveyed to the third inlet channel.

20. The method of claim 14, the method further comprising:
performing an XNOR logic operation by the fluidic device between first signal and a second input signal by conveying one of:
(a) the third fluid from the third inlet channel to the output channel of the second cFET when the third control pressure is sufficient to force the piston of the second cFET to be in the third position, or
(b) the fourth fluid from the fourth inlet channel to the output channel of the second cFET when the fourth control pressure is sufficient to force the piston of the second cFET to be in the fourth position,
wherein the third control pressure is the second input signal,
wherein the first input signal is conveyed to the third inlet channel, and
wherein an inferted first input signal from the first cFET is conveyed to the fourth inlet channel.

\* \* \* \* \*

UNITED STATES PATENT AND TRADEMARK OFFICE
CERTIFICATE OF CORRECTION

PATENT NO. : 11,131,331 B2  
APPLICATION NO. : 16/507788  
DATED : September 28, 2021  
INVENTOR(S) : Andrew Arthur Stanley et al.

Page 1 of 1

It is certified that error appears in the above-identified patent and that said Letters Patent is hereby corrected as shown below:

In the Claims

In Column 52, Line 30, Claim 1, delete "into" and insert -- into the --, therefor.

In Column 56, Line 29, Claim 14, delete "channel" and insert -- channel of --, therefor.

In Column 56, Line 30, Claim 14, delete "of" and insert -- of the --, therefor.

In Column 58, Line 2, Claim 19, delete "between" and insert -- between a --, therefor.

In Column 58, Line 22, Claim 20, delete "between" and insert -- between a --, therefor.

Signed and Sealed this  
Twenty-fifth Day of January, 2022

Drew Hirshfeld  
*Performing the Functions and Duties of the*  
*Under Secretary of Commerce for Intellectual Property and*  
*Director of the United States Patent and Trademark Office*